Nov. 14, 1950 K. C. BUGG 2,530,113
LIQUID DISPENSING APPARATUS
Original Filed Sept. 4, 1941 25 Sheets-Sheet 1
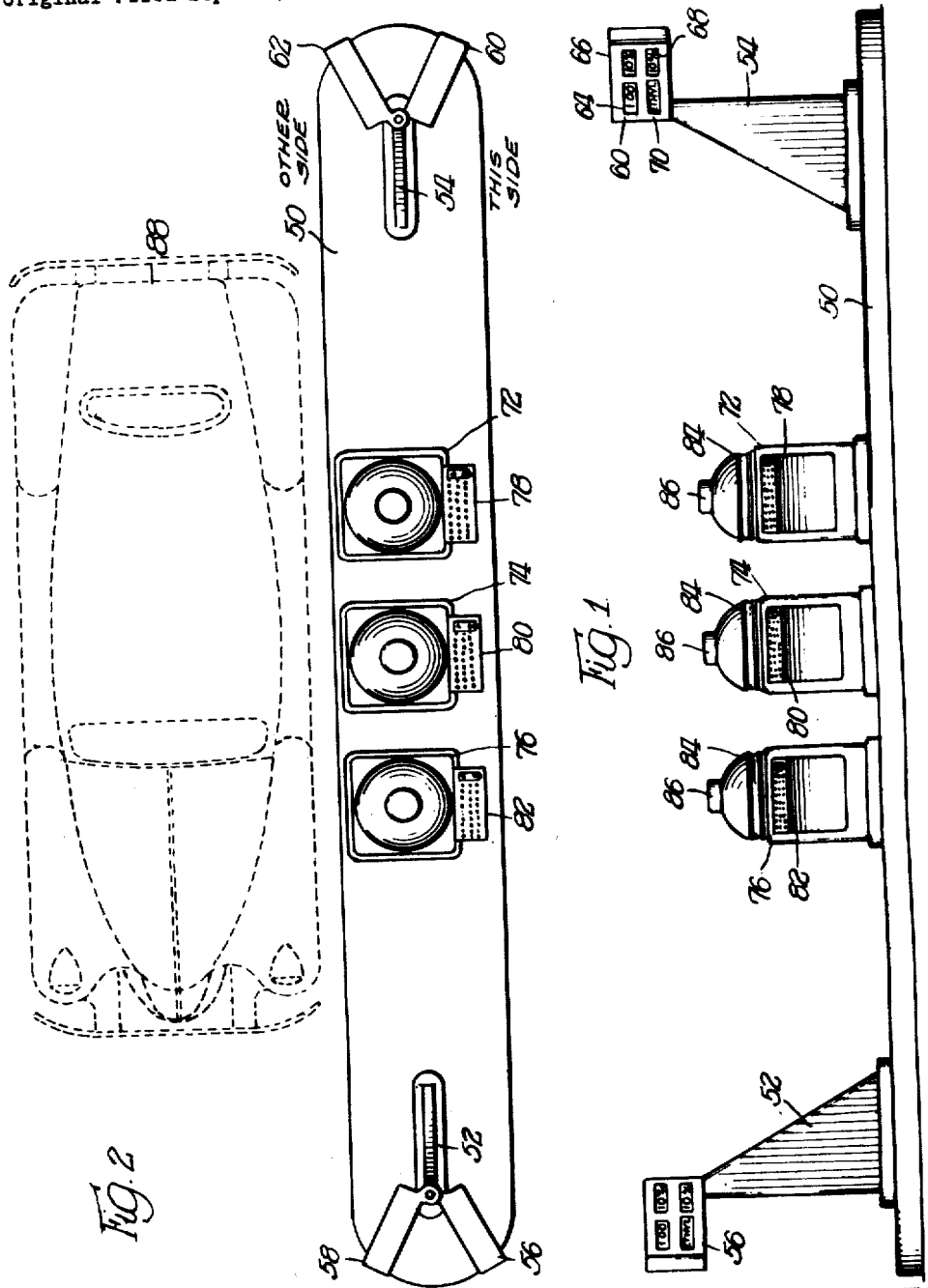
INVENTOR.
Henly C. Bugg,
BY

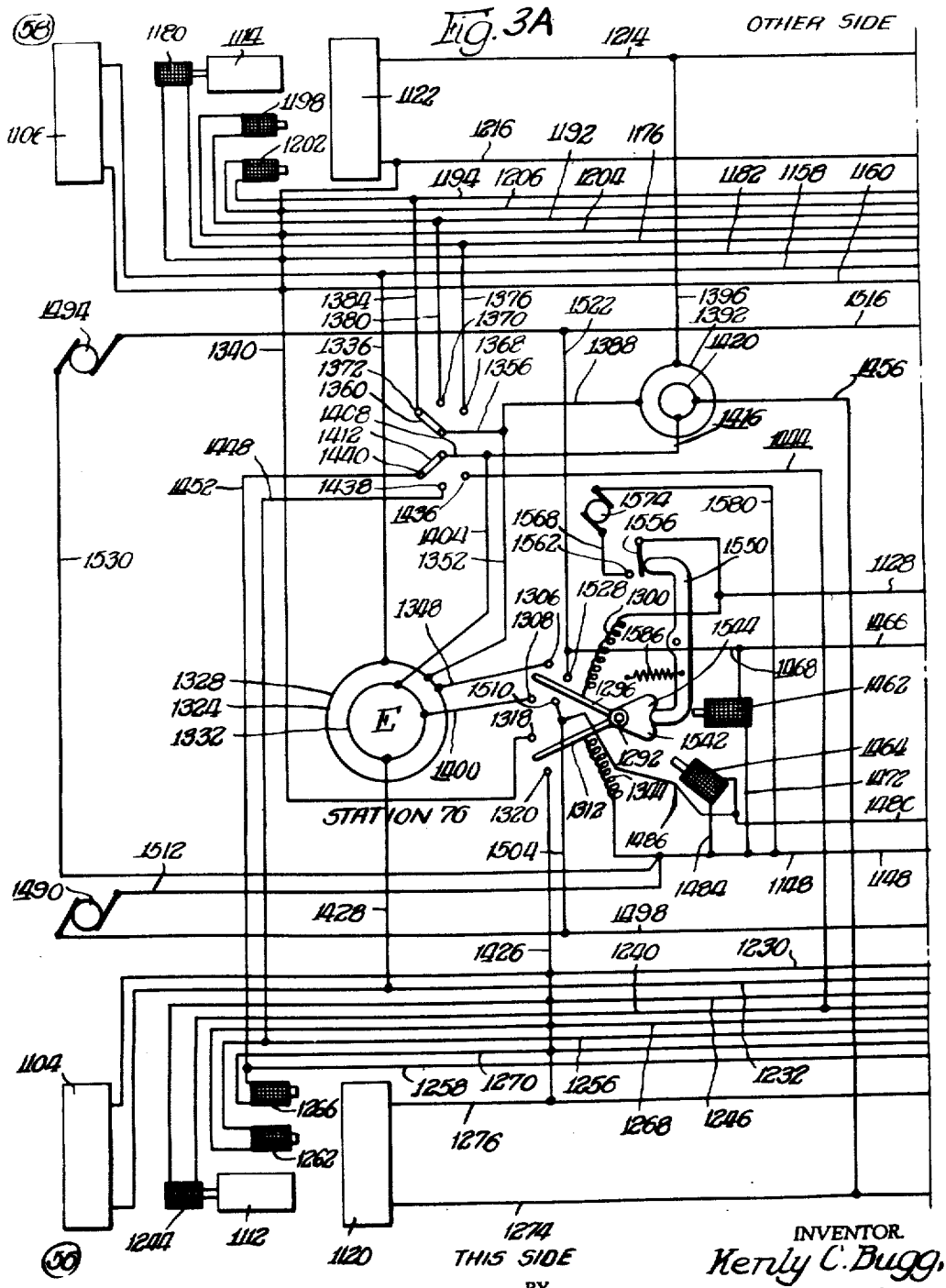

Nov. 14, 1950     K. C. BUGG     2,530,113
LIQUID DISPENSING APPARATUS

Original Filed Sept. 4, 1941     25 Sheets-Sheet 3

INVENTOR.
Kenly C. Bugg,

Nov. 14, 1950 K. C. BUGG 2,530,113
LIQUID DISPENSING APPARATUS
Original Filed Sept. 4, 1941 25 Sheets-Sheet 4
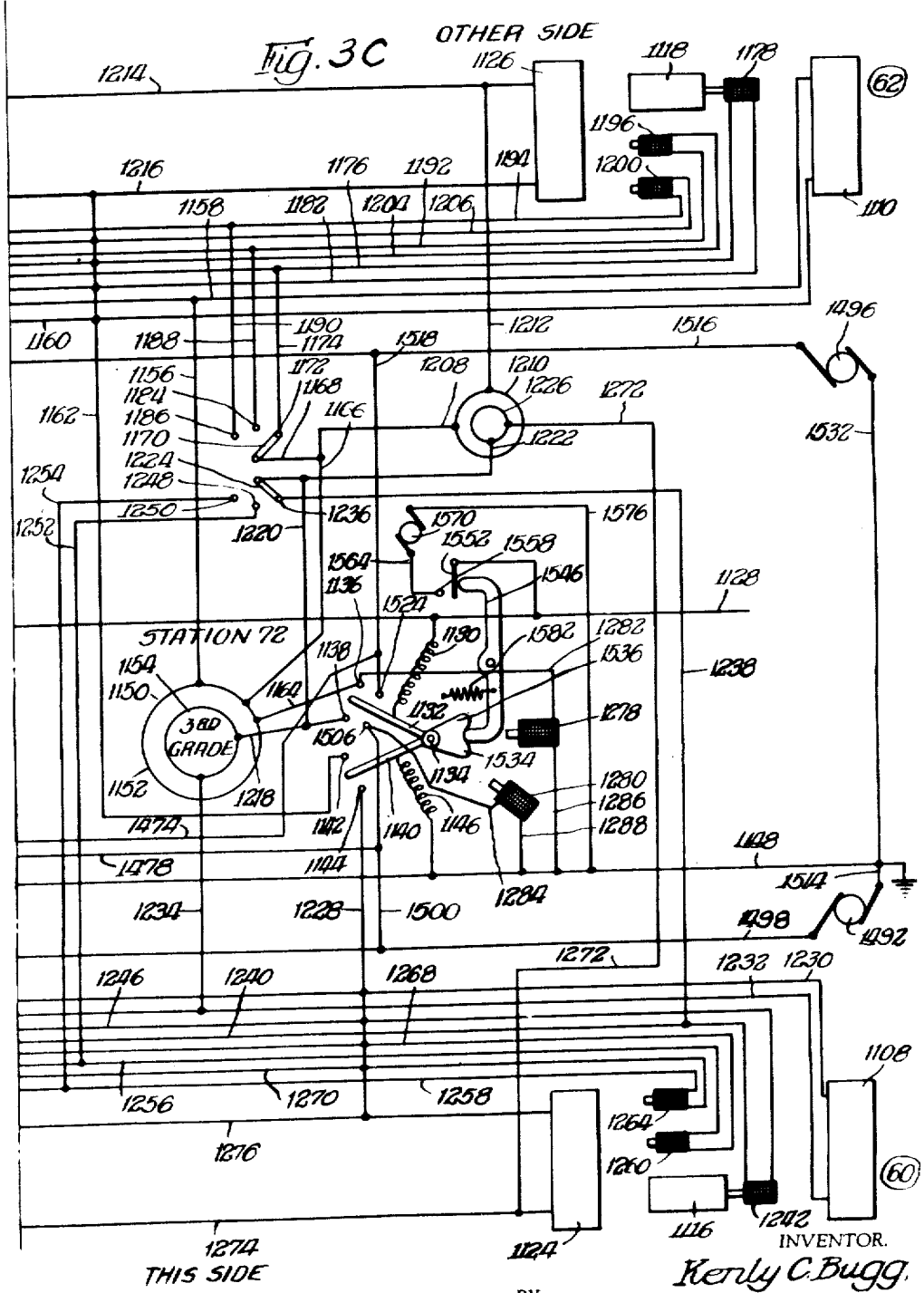
INVENTOR.
Kenly C. Bugg
BY
Anderson, Healy, Byrne, Knight
attys.

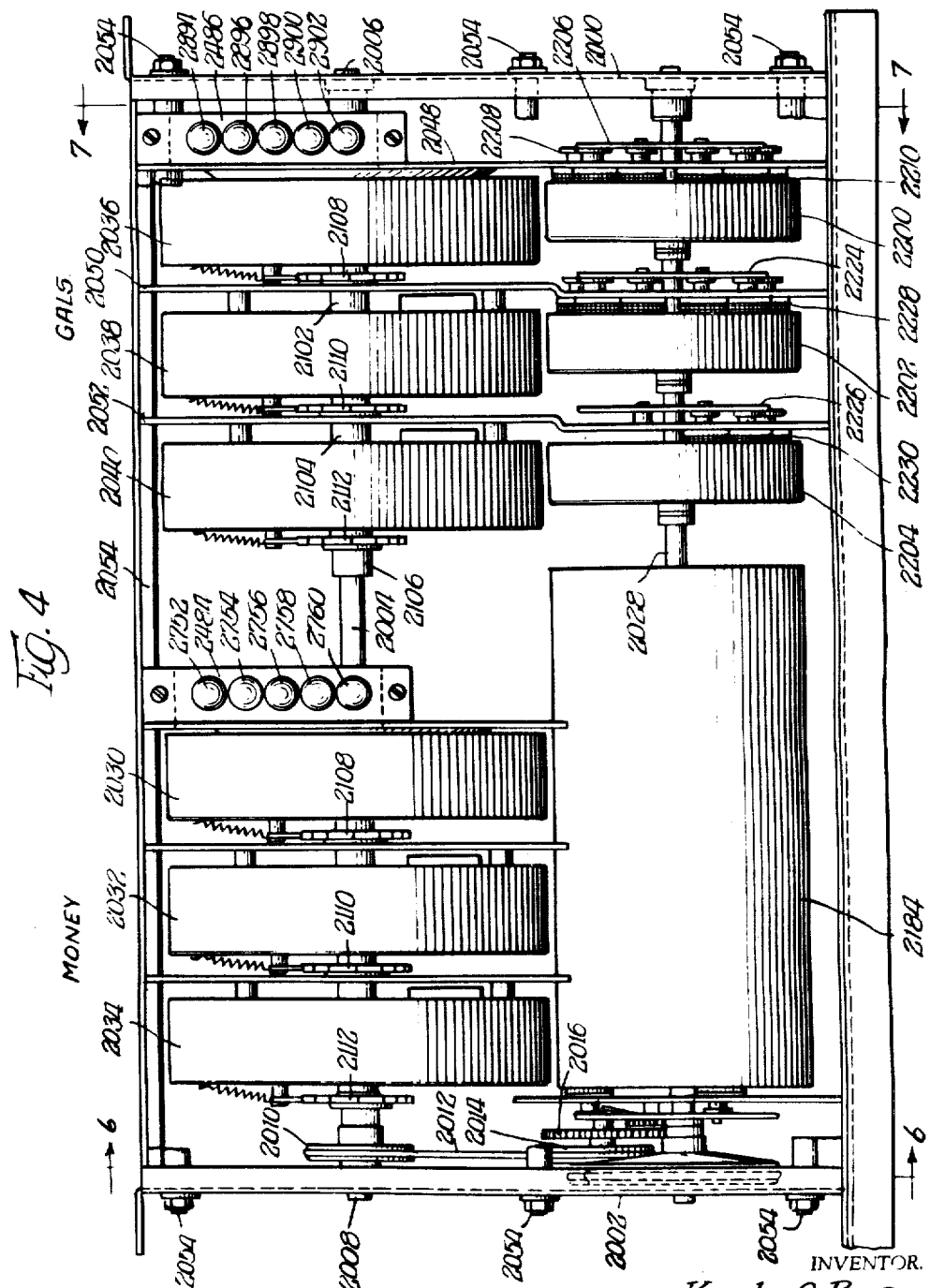

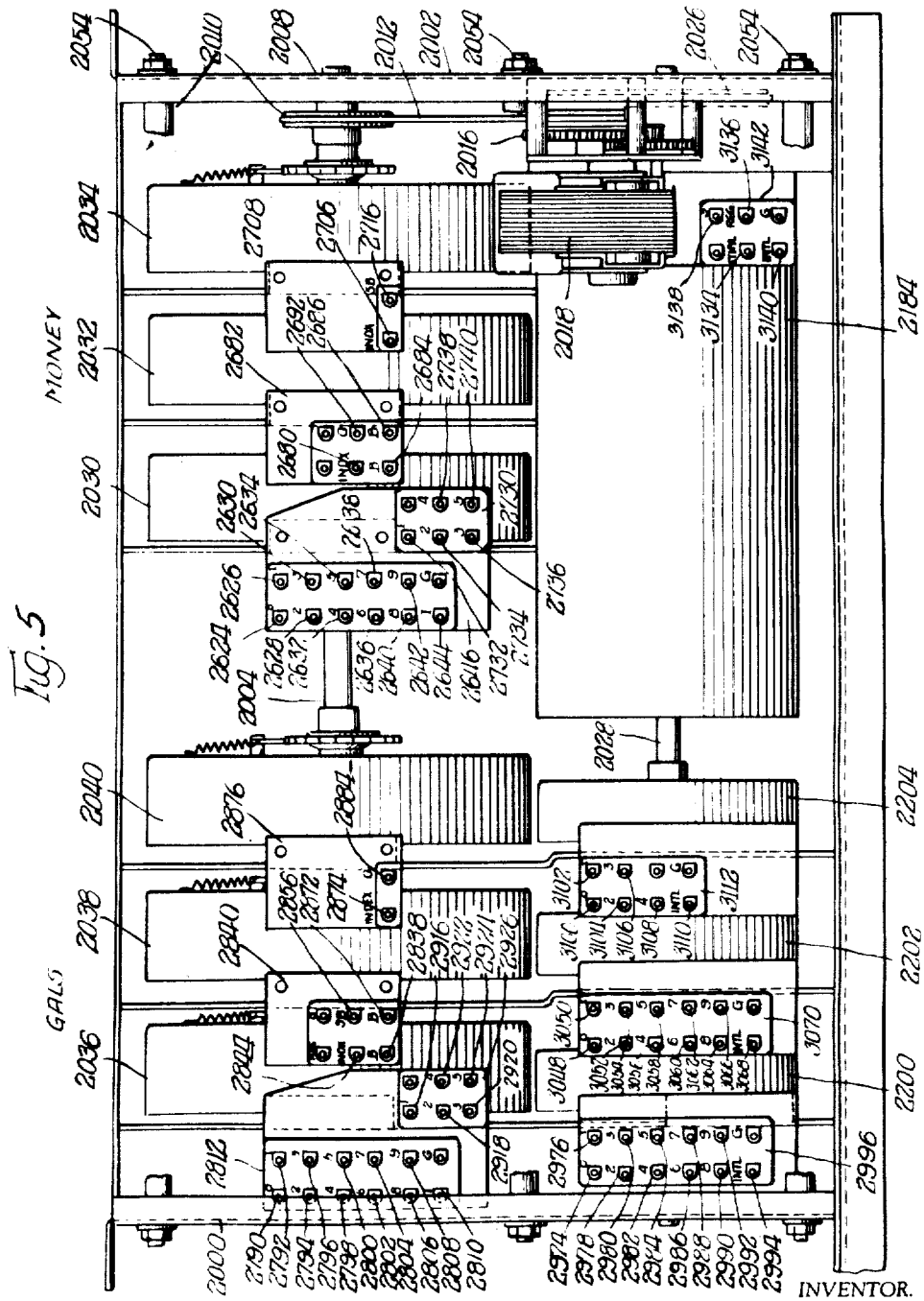

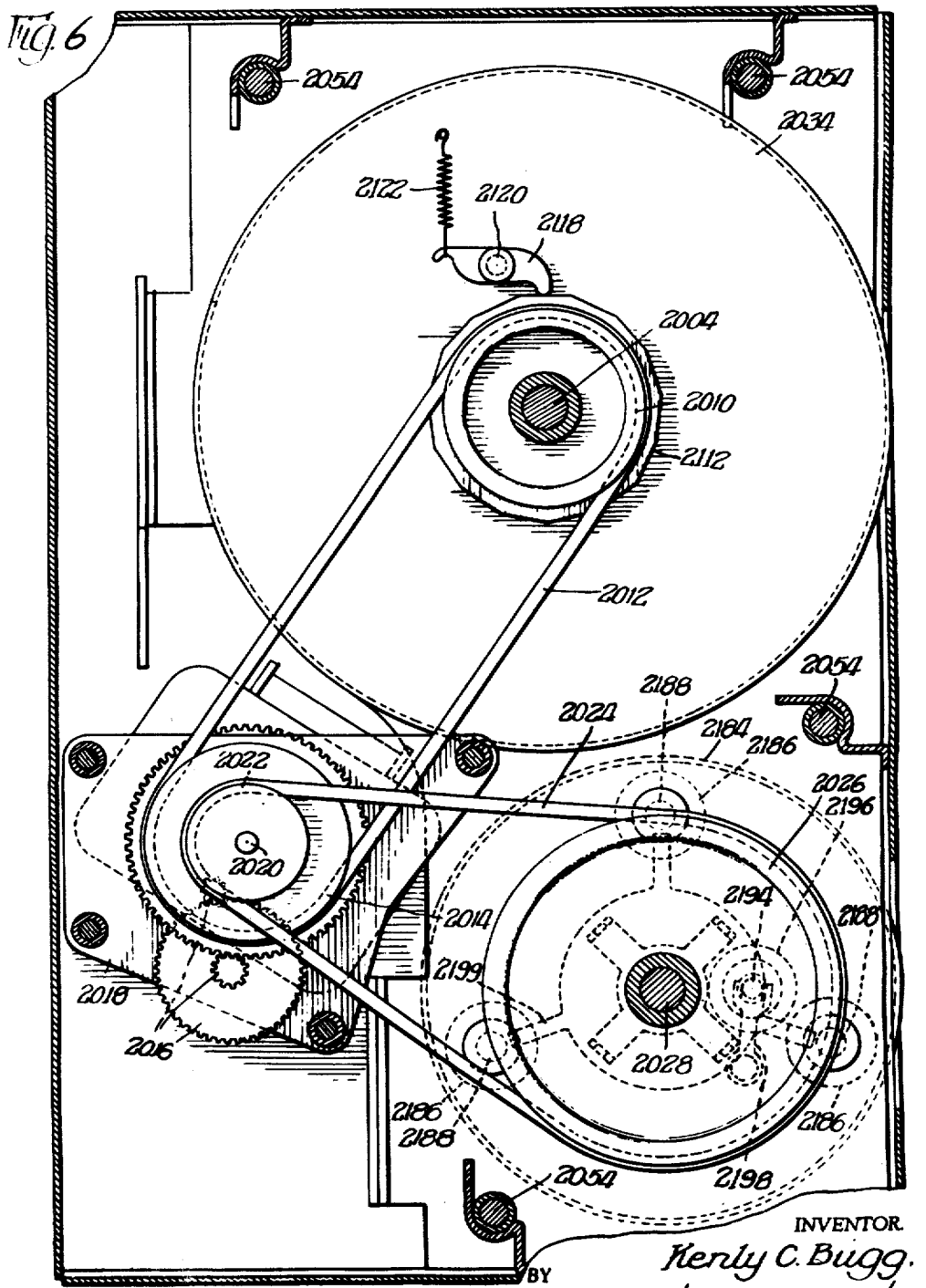

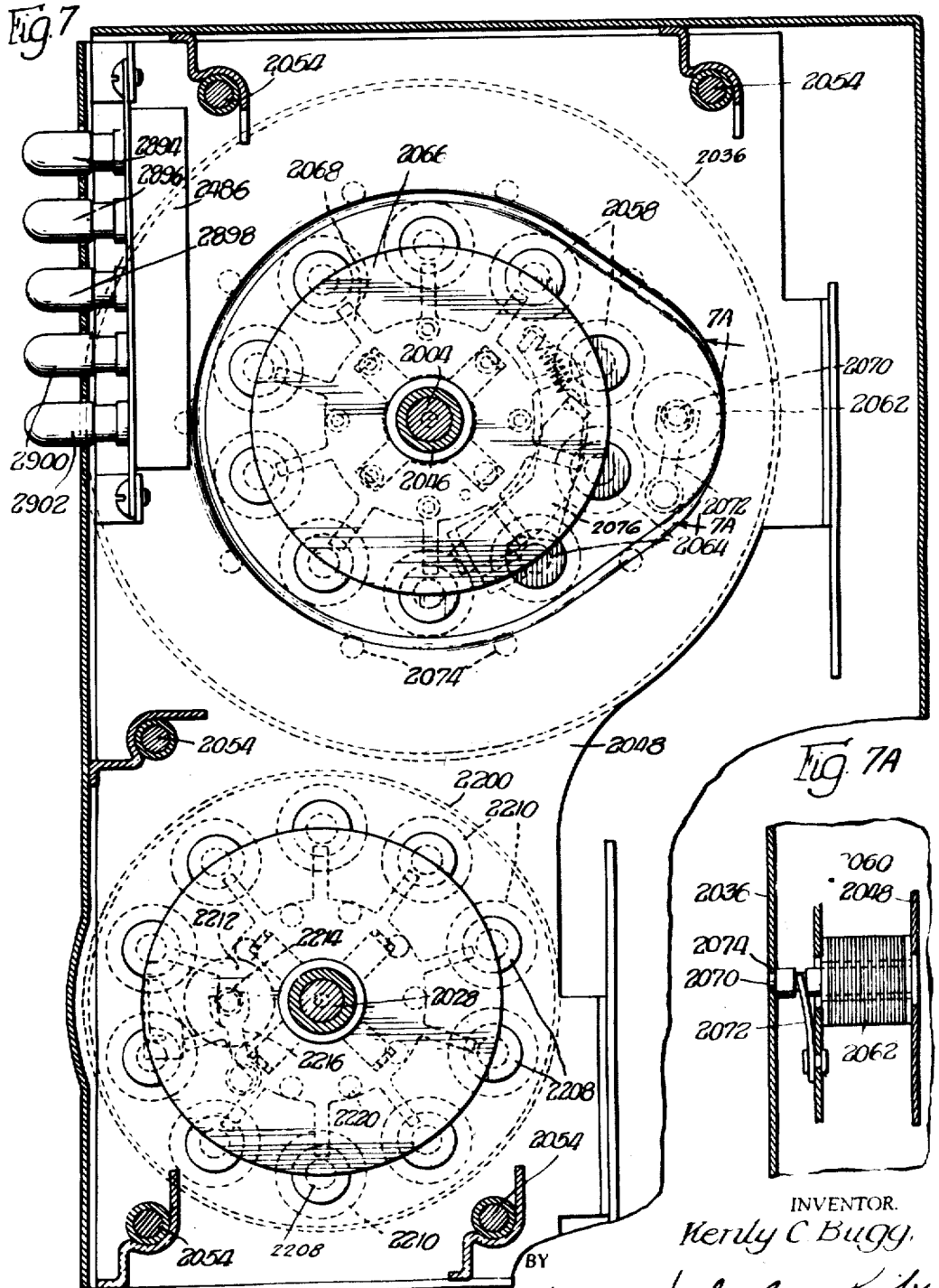

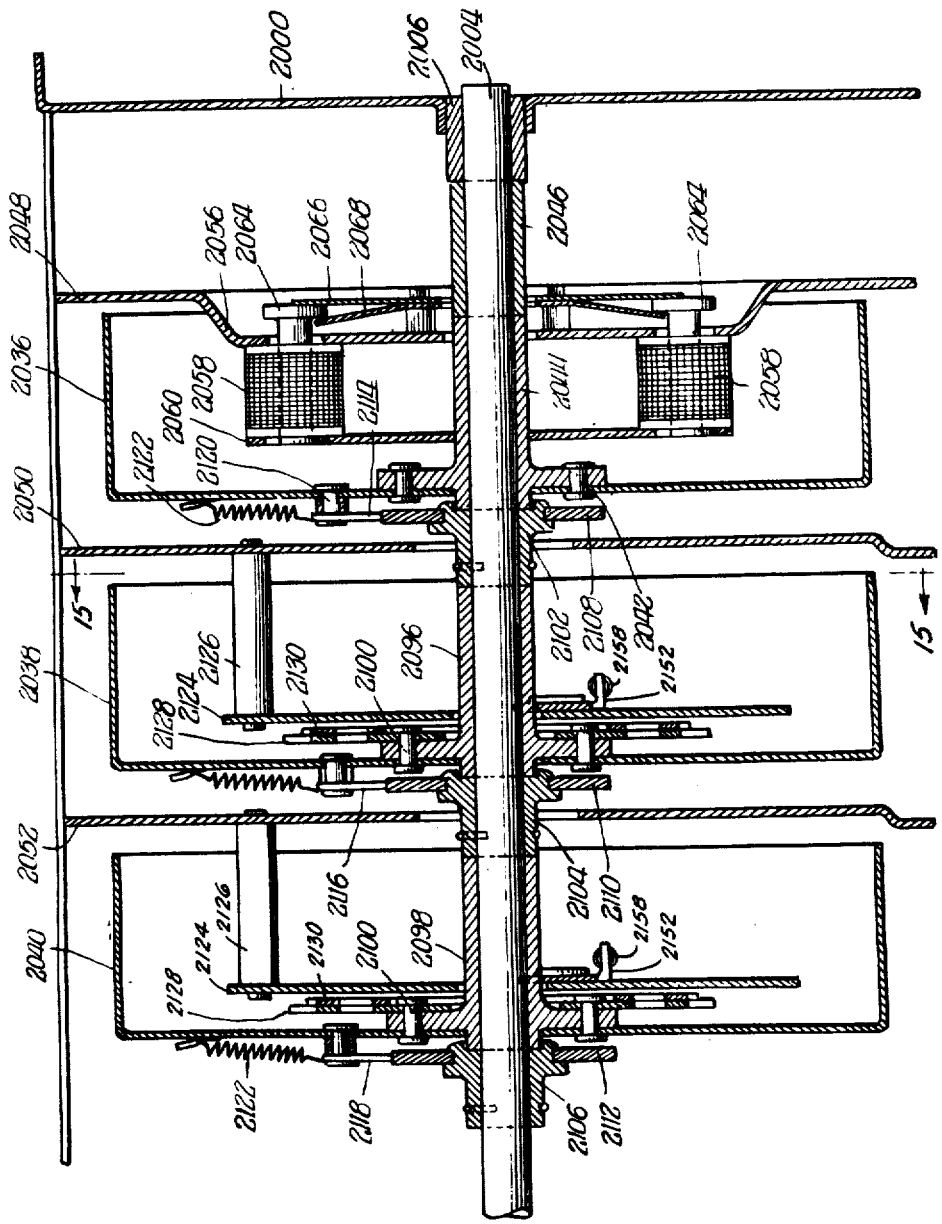

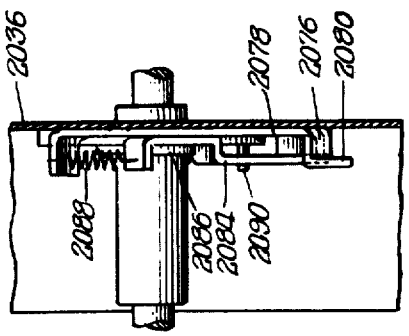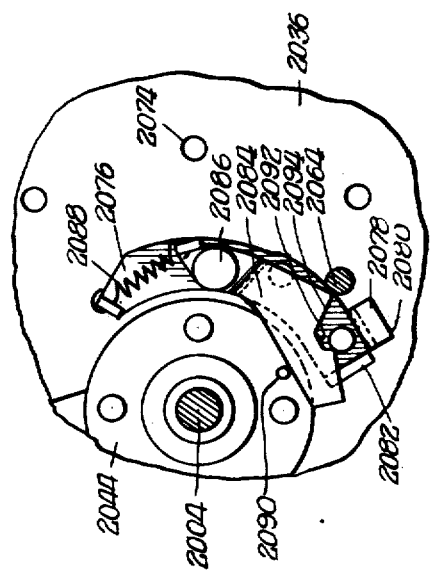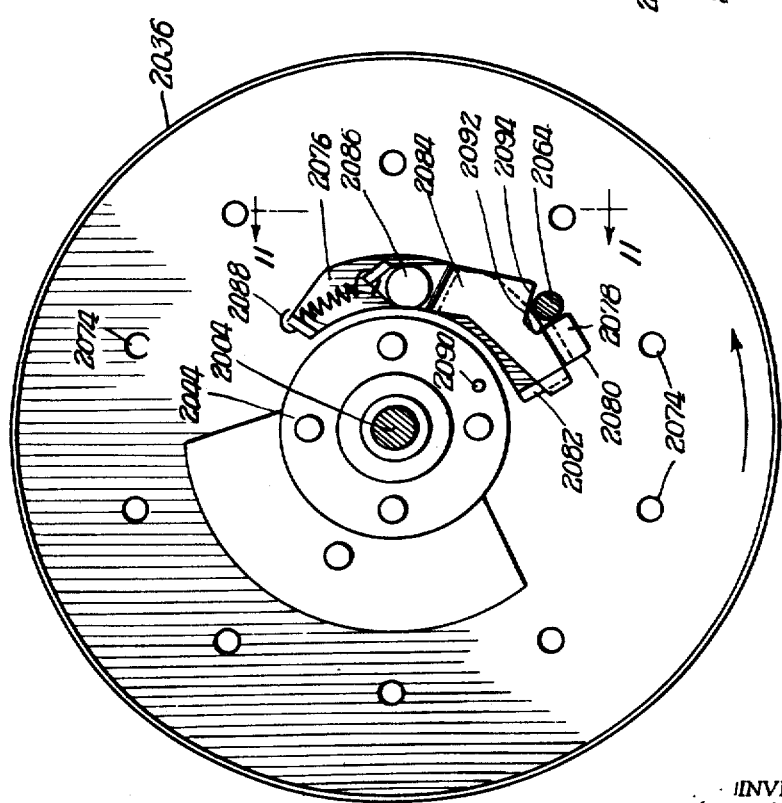

Nov. 14, 1950 K. C. BUGG 2,530,113
LIQUID DISPENSING APPARATUS
Original Filed Sept. 4, 1941 25 Sheets—Sheet 11
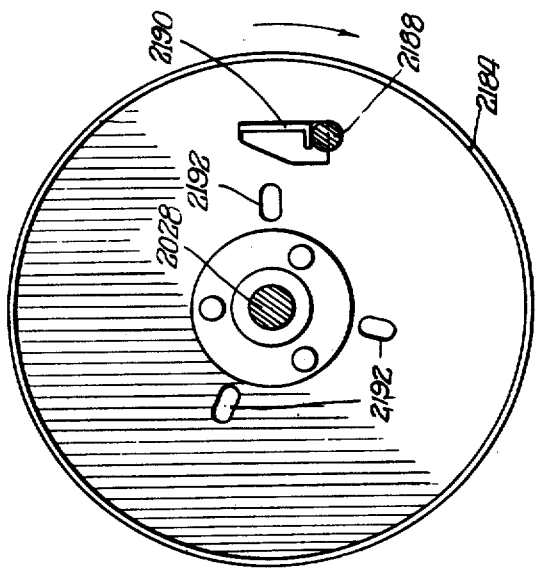
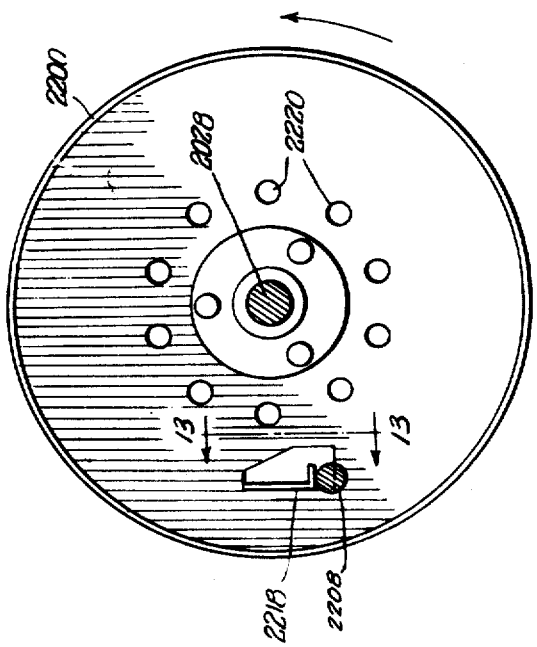
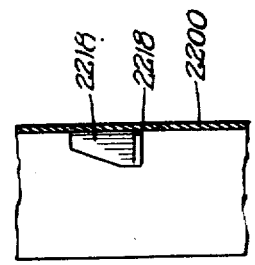
INVENTOR.
Henry C. Bugg,
BY Nov. 14, 1950 K. C. BUGG 2,530,113
LIQUID DISPENSING APPARATUS
Original Filed Sept. 4, 1941 25 Sheets-Sheet 12
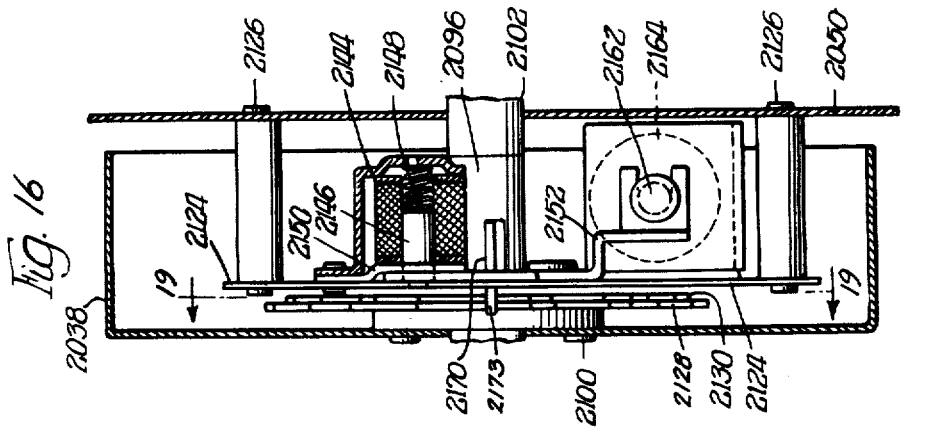
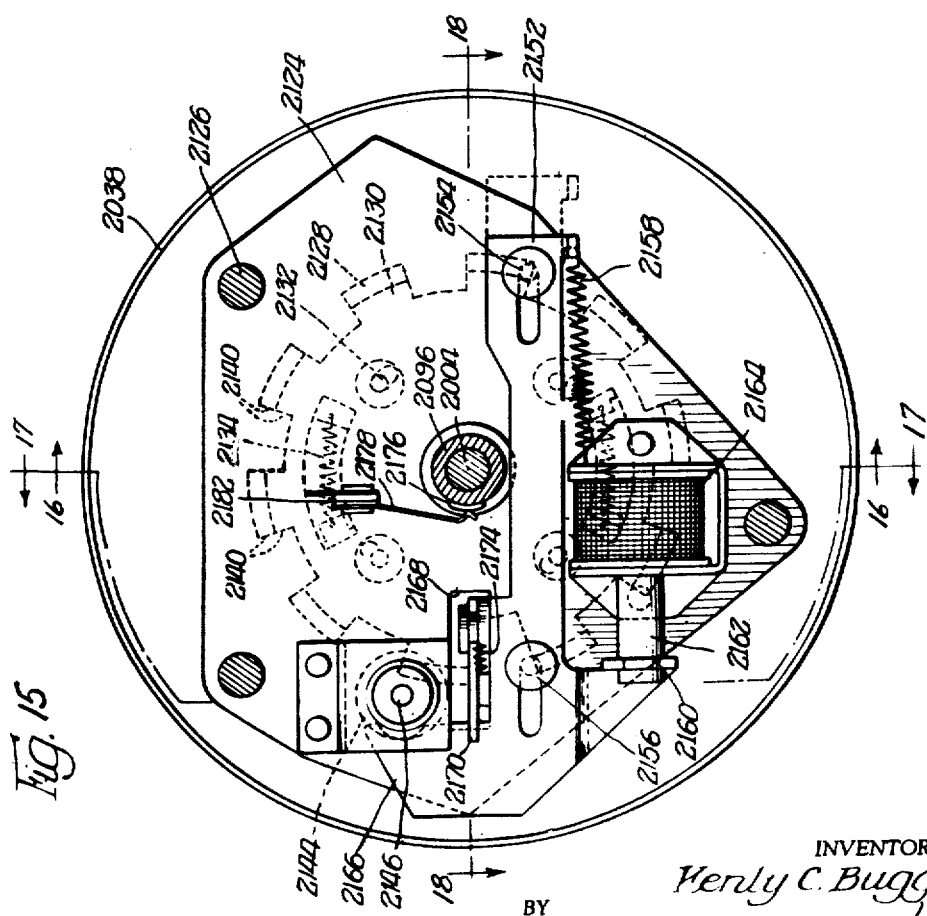
INVENTOR.
Kenly C. Bugg
BY
Attys.

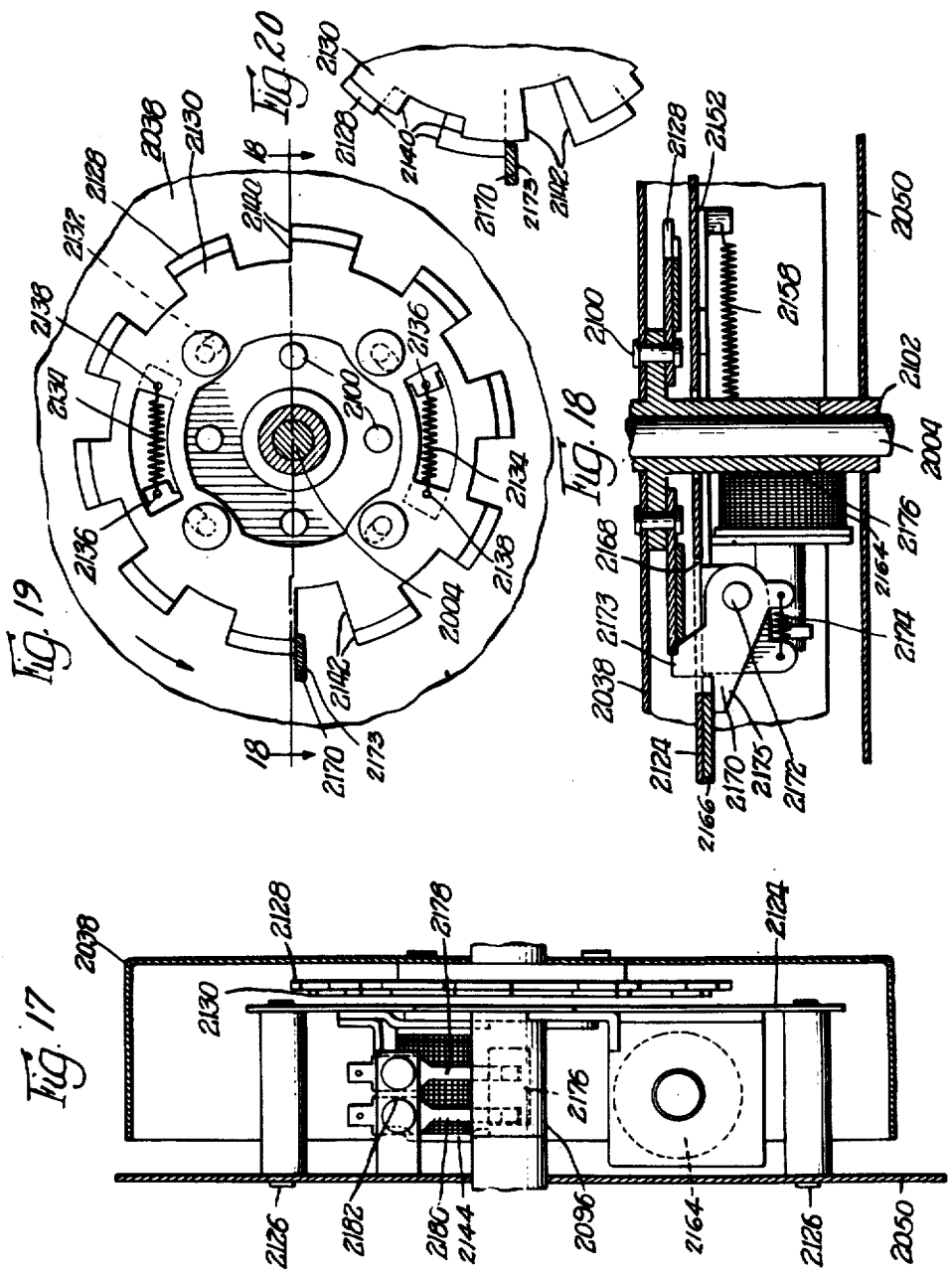

Nov. 14, 1950 K. C. BUGG 2,530,113
LIQUID DISPENSING APPARATUS
Original Filed Sept. 4,'1941 25 Sheets-Sheet 14
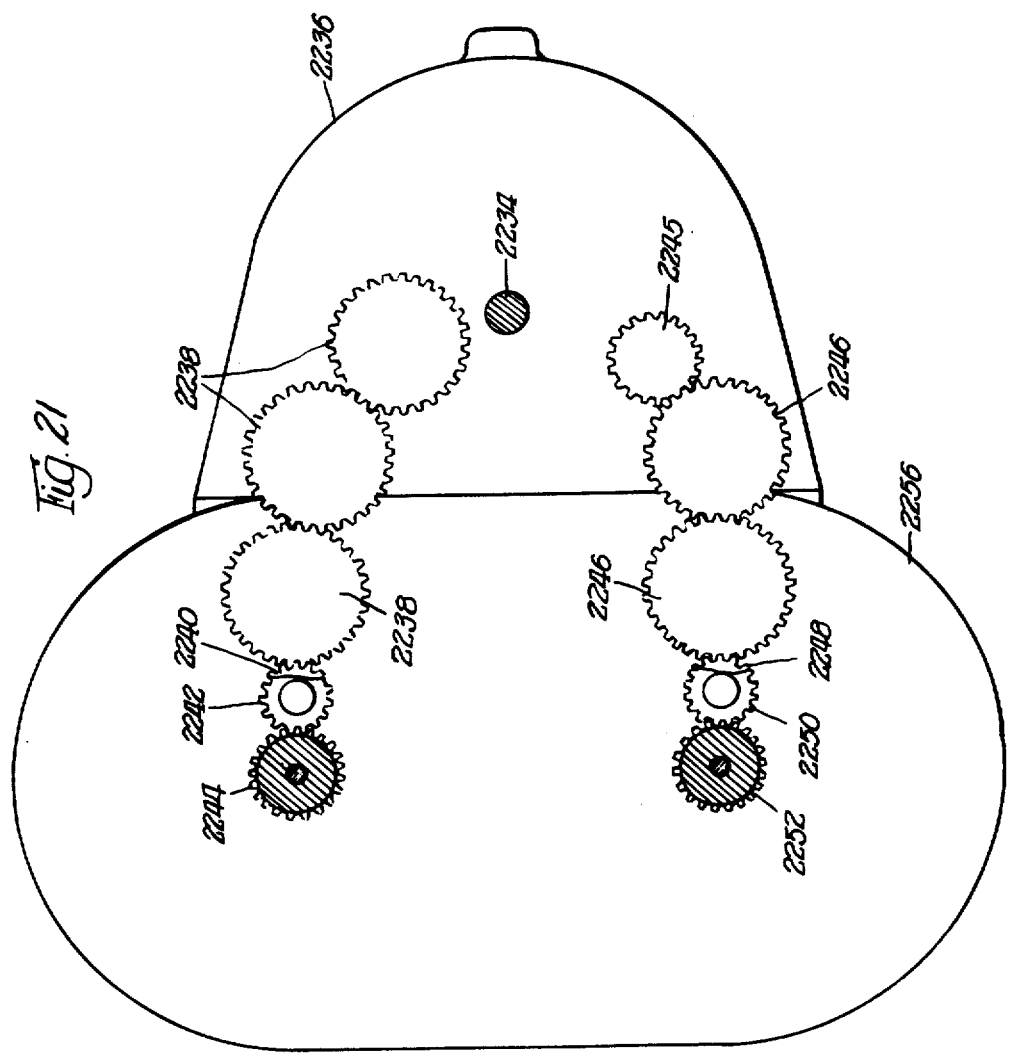
INVENTOR.
*Kenly C. Bugg,*
BY

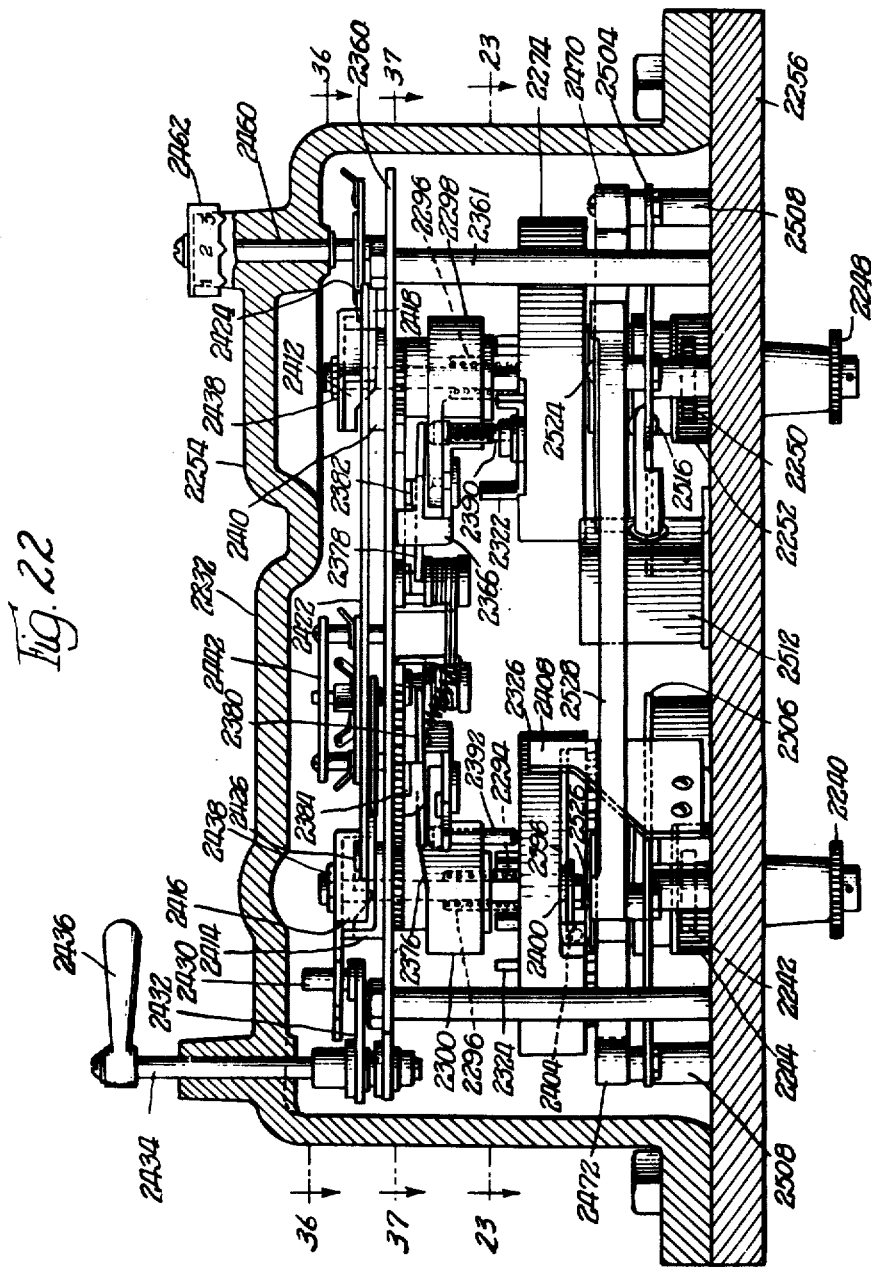

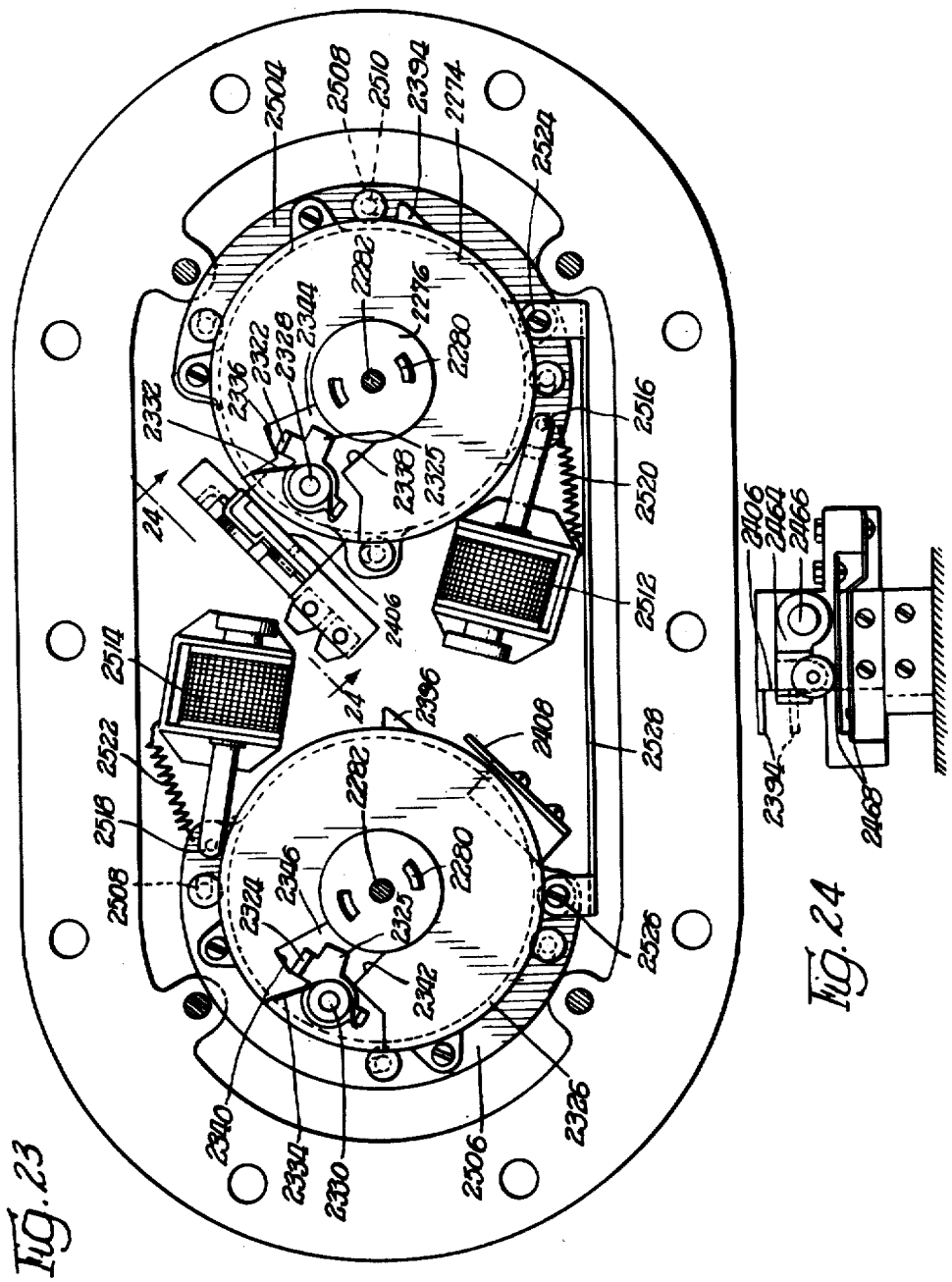

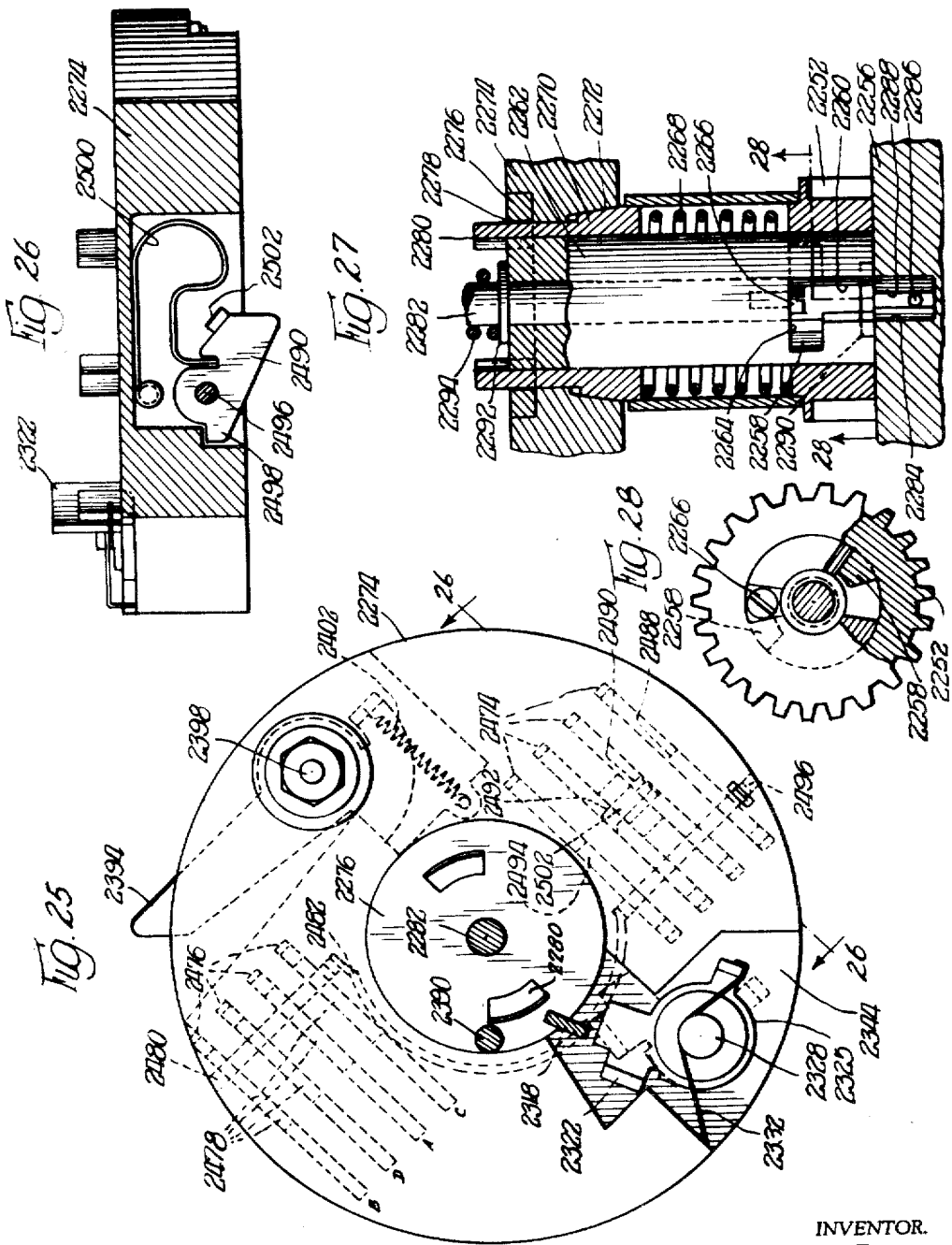

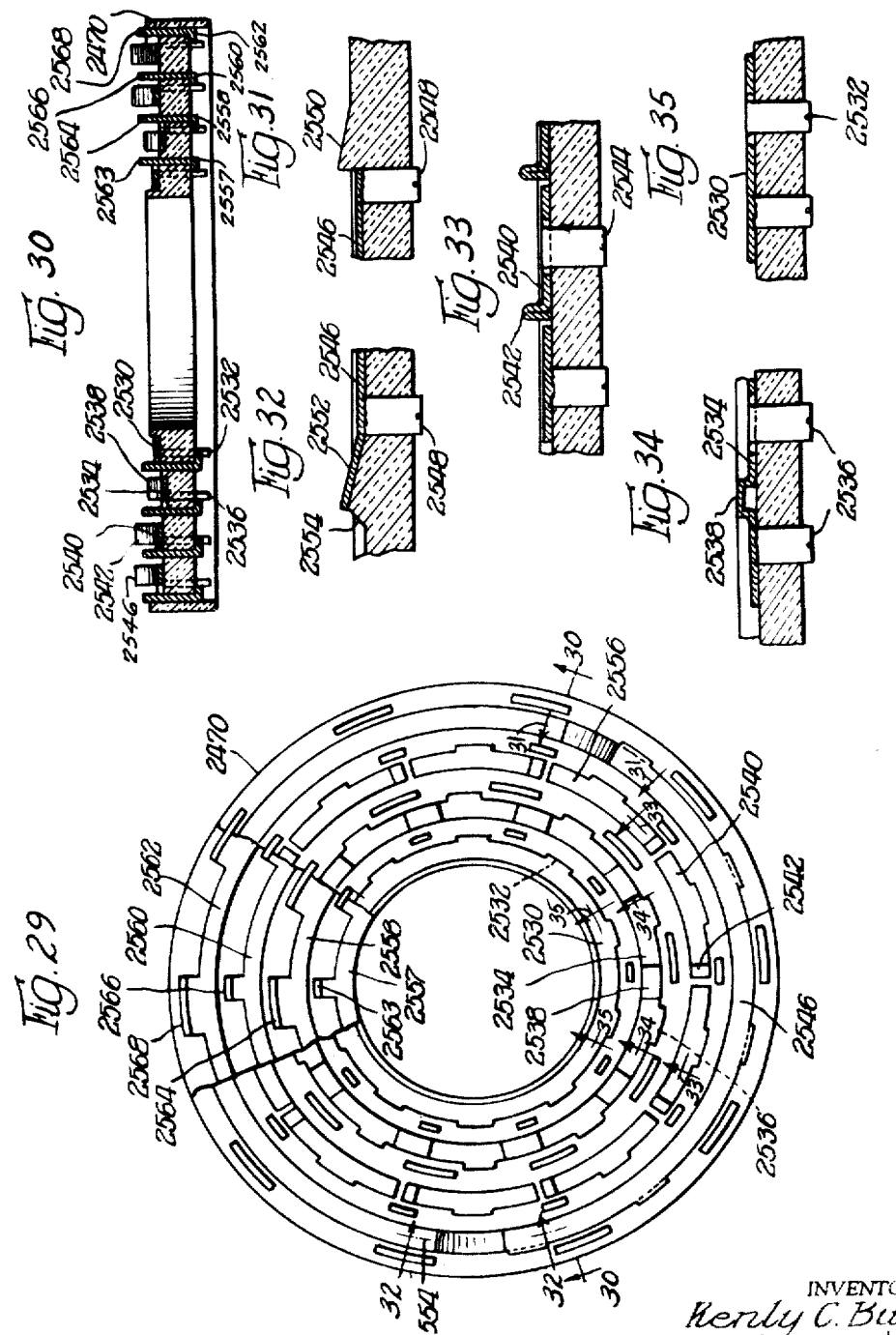

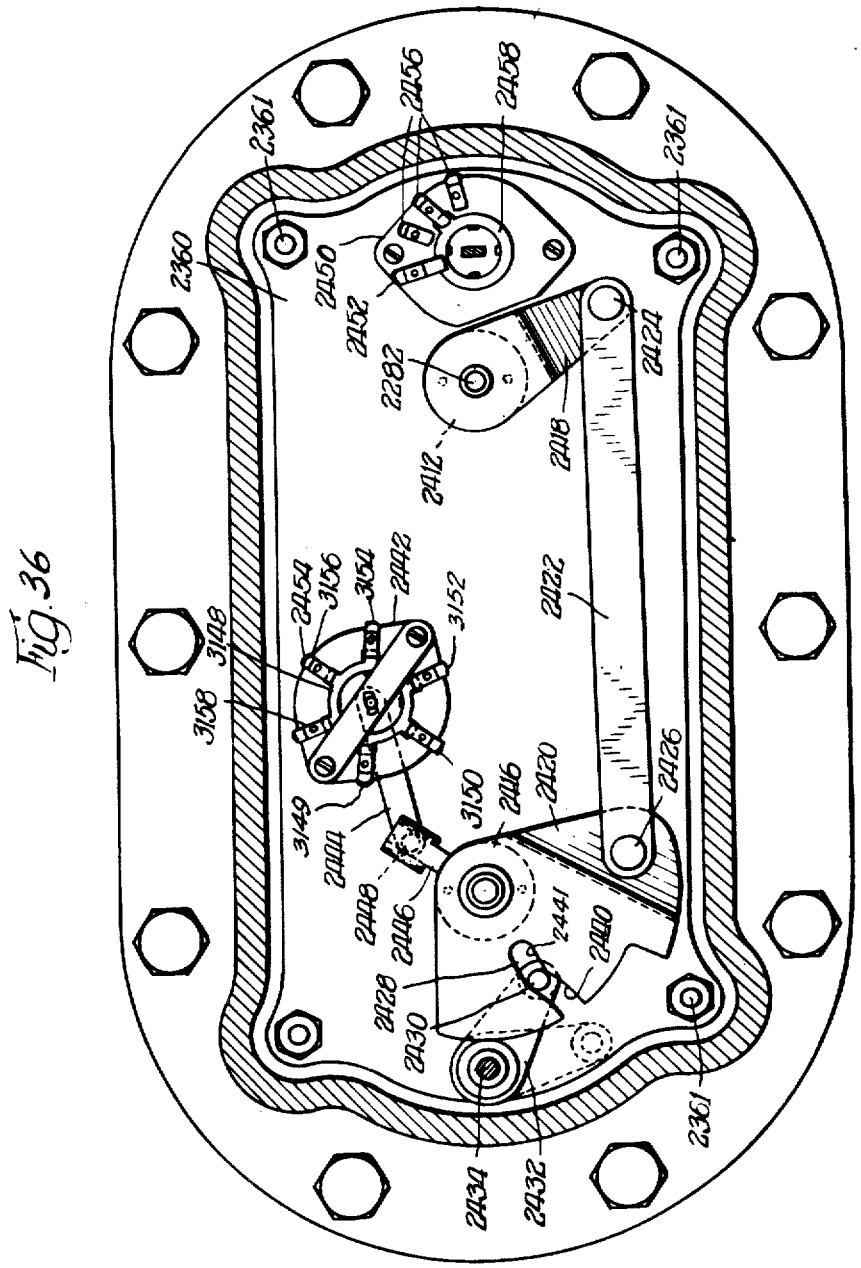

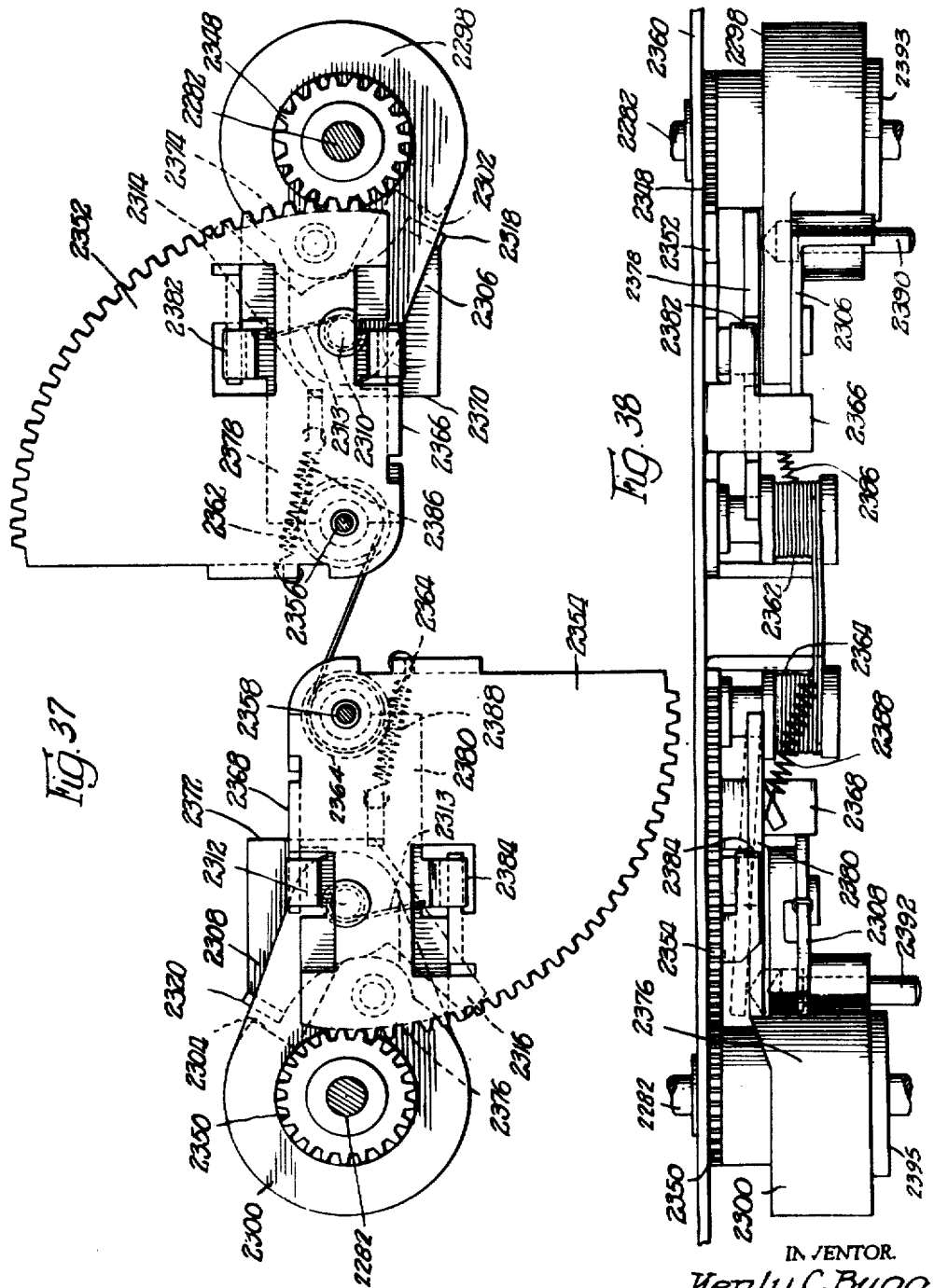

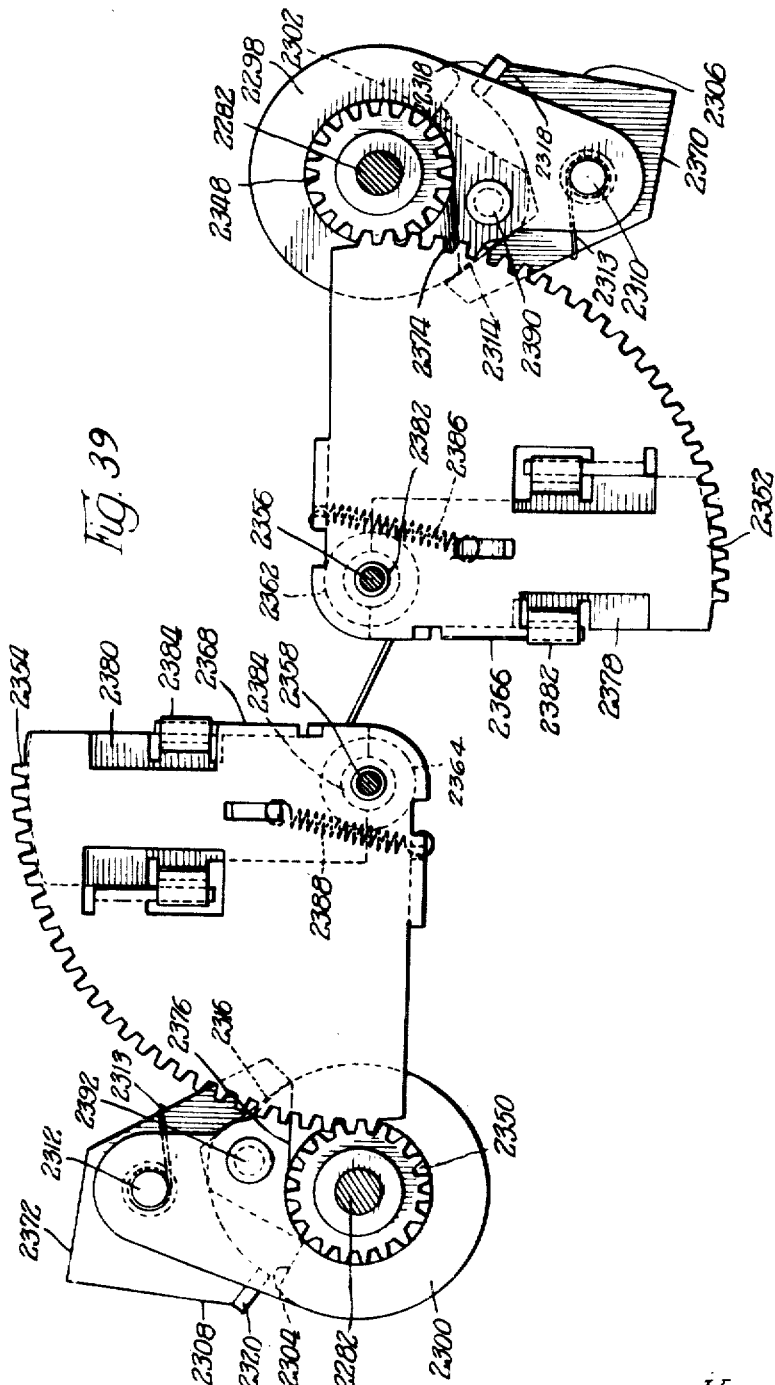

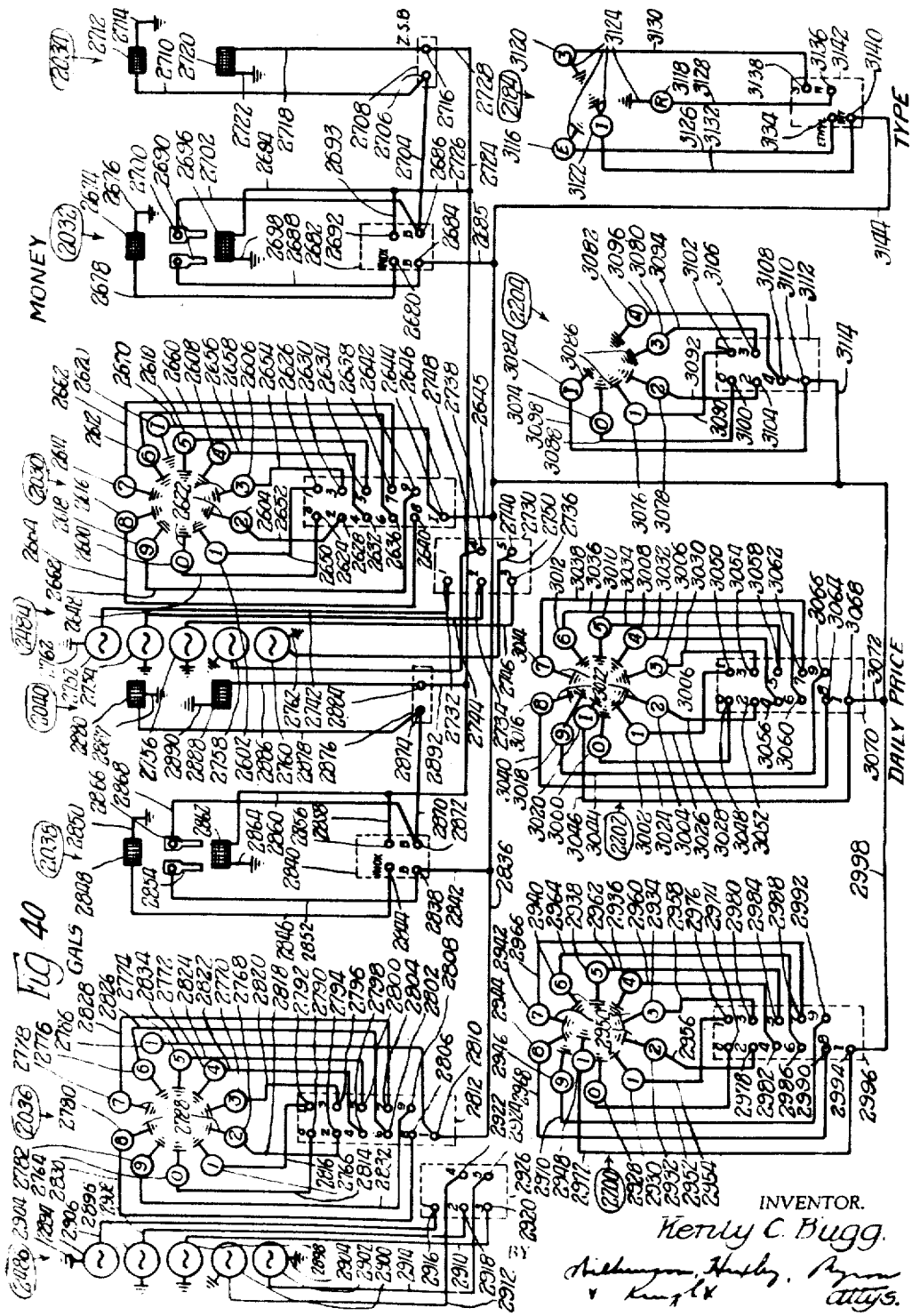

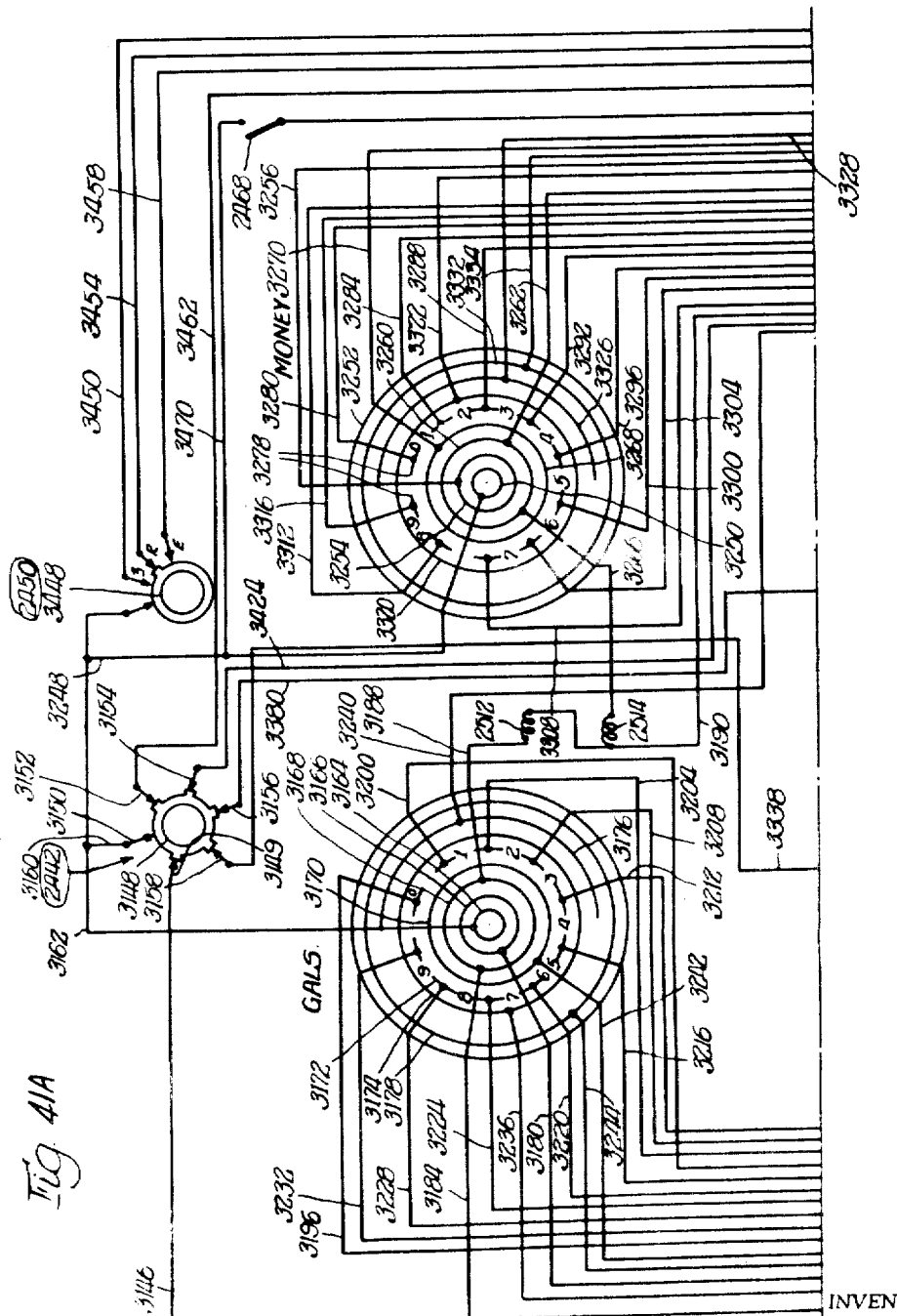

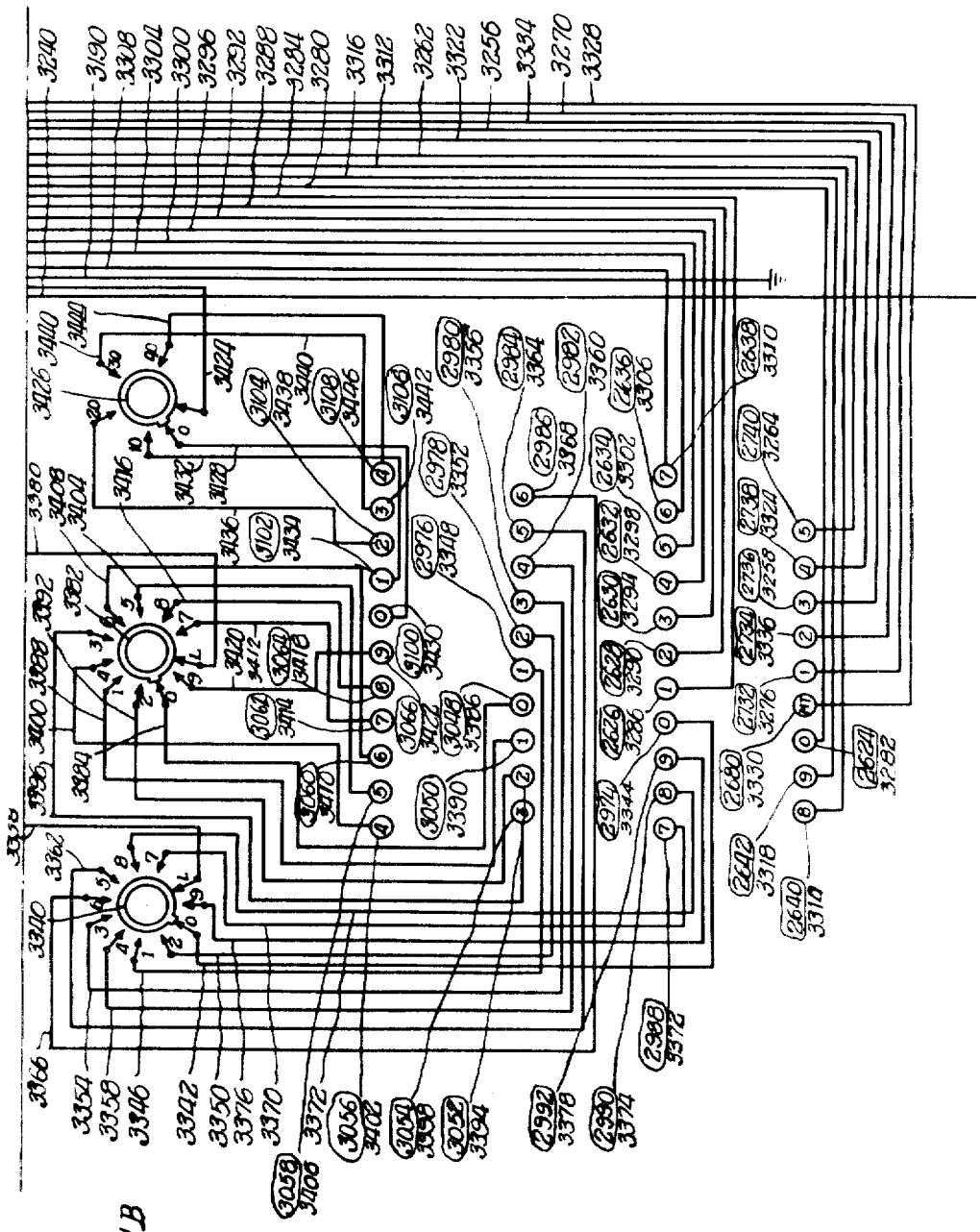

Nov. 14, 1950   K. C. BUGG   2,530,113
LIQUID DISPENSING APPARATUS
Original Filed Sept. 4, 1941   25 Sheets-Sheet 25
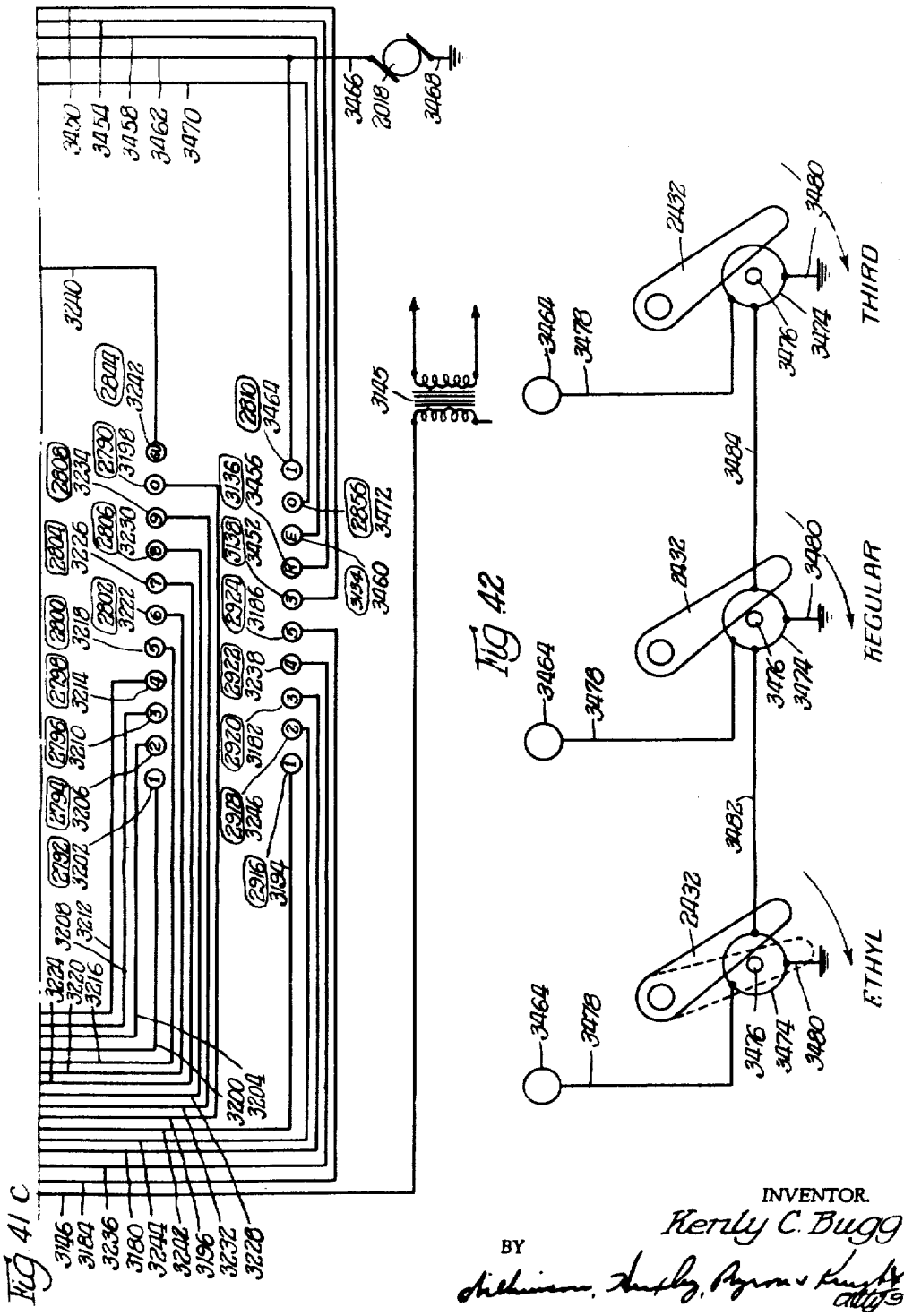
INVENTOR.
Kenly C. Bugg Patented Nov. 14, 1950

2,530,113

UNITED STATES PATENT OFFICE 2,530,113

LIQUID DISPENSING APPARATUS

Kenly C. Bugg, Fort Wayne, Ind.

Original application September 4, 1941, Serial No. 409,570, now Patent No. 2,379,785, July 3, 1945. Divided and this application May 24, 1943, Serial No. 488,155

17 Claims. (Cl. 222—26)

This invention pertains to electrical computing and registering mechanisms and to liquid dispensing apparatus embodying the same.

It is an object of this invention to provide an electrical registering mechanism and computing device.

Still another object is to provide reset means for a register which may be disposed remotely therefrom.

Yet another object is to provide distributing means for controlling a register provided with mechanism for insuring proper and positive change or compensation in transferring certain indications to other higher indications.

A different object is to provide resetting means for a register which is effective to set the register to a predetermined number, as zero, without the necessity of operating the set-back means or the register through a full cycle.

Another different object is to provide set-back mechanism for a register wherein no dead center position can be maintained.

Still a different object is to provide a registering system wherein a plurality of registering mechanisms may be selectively operated and controlled from a single control means.

Yet a different object is to provide a registering mechanism wherein the numeral wheels or indicating means therefor are positively operated and controlled by electrical means, and wherein no backlash can be introduced.

Another different object is to provide distributor means for an electrical computing head wherein positive transfer mechanism may be used, but one wherein the distributor and transfer mechanism is readily and quickly reset.

Still another different object is to provide a liquid dispensing apparatus having mechanism therein fulfilling all the objects enumerated herein.

Another object of the invention is to provide an electrical computing and registering mechanism wherein the speed of computation (such as the speed of operating mechanism) cannot affect the exact registration.

Another object of the invention is to provide registering means adapted to show different characteristics of measure of selected commodities such as weight or amount and computed price thereof, said registering means being remote from the points of delivery of the selected commodities, and said registering means being so constructed and arranged as to selectively show the type of the selected commodity and the unit price thereof.

Another object of the invention is to provide registering mechanism embodying a numeral wheel or wheels driven to registering positions and arrested at said positions, said registering mechanism being so constructed and arranged that the numeral wheel or wheels may be of any size without the usual inherent inertia difficulties being present in said registering mechanism.

Another object of the invention is to provide registering mechanism having indicating means therein adapted to transfer between predetermined positions, said registering mechanism being provided with additional indicating means showing through a sequence of operations, approaching increments between transfers.

Another object of the invention is to provide registering mechanism having indicating means adapted to transfer between predetermined positions, said indicating means being operated by distributing mechanism, means being provided for automatically correcting for transfer movements, said means being controlled by said distributing mechanism.

Another object of the invention is to provide registering mechanism which includes control means for controlling the operation of a part of said registering mechanism when said registering mechanism is being operated to indicating positions, said control means being so constructed and arranged that it may be selectively operated to cause said registering mechanism to move to a predetermined position, such as the zero position.

Another object of the invention is to provide registering mechanism controlled by distributing mechanism, said distributing mechanism being adapted to be conditioned to reset said registering mechanism to zero, or to a predetermined position, after said distributing mechanism has been operated from said zero or predetermined position.

Another object of the invention is to provide electrical computing means including registering mechanism, and distributing mechanism for controlling operation of said registering mechanism, and wherein set-back means is provided which renders the distributing mechanism inoperative (deenergized) when said set-back means is operated to zeroize said registering mechanism and whereby the electrical computing means is thereby rendered inoperative and the electrical system thereof deenergized during the set-back cycle.

Another object of the invention is to provide an electrical computing and dispensing system, said system including a plurality of dispensing stations and a plurality of registering mechanisms adapted selectively to be connected to any one station, said system being so constructed and arranged that no other station can be connected to said registering mechanisms when one of said stations is connected to said registering mechanisms.

Another object of the invention is to provide an electrical counting and/or computing system particularly adapted for use in liquid dispensing apparatus or in scales and the like, the mechanism of said system being controllable to indicate characteristics of registry and computation, and utilizing a system susceptible of high speed operation and one in which no relays are used, thus permitting rapid operation and long life with low maintenance.

With these and various other objects in view, the invention may consist of certain novel features of construction and operation as will be more fully described and particularly pointed out in the specification, drawings and claims appended hereto.

In the drawings, which illustrate an embodiment of the device, and wherein like reference characters are used to designate like parts—

Figure 1 is an elevation of an island of a fuel (such as gasoline) dispensing service station, showing the arrangement of the dispensing and registering units embodying the invention;

Figure 2 is a top plan view of the island and units illustrated in Figure 1;

Figure 3B:
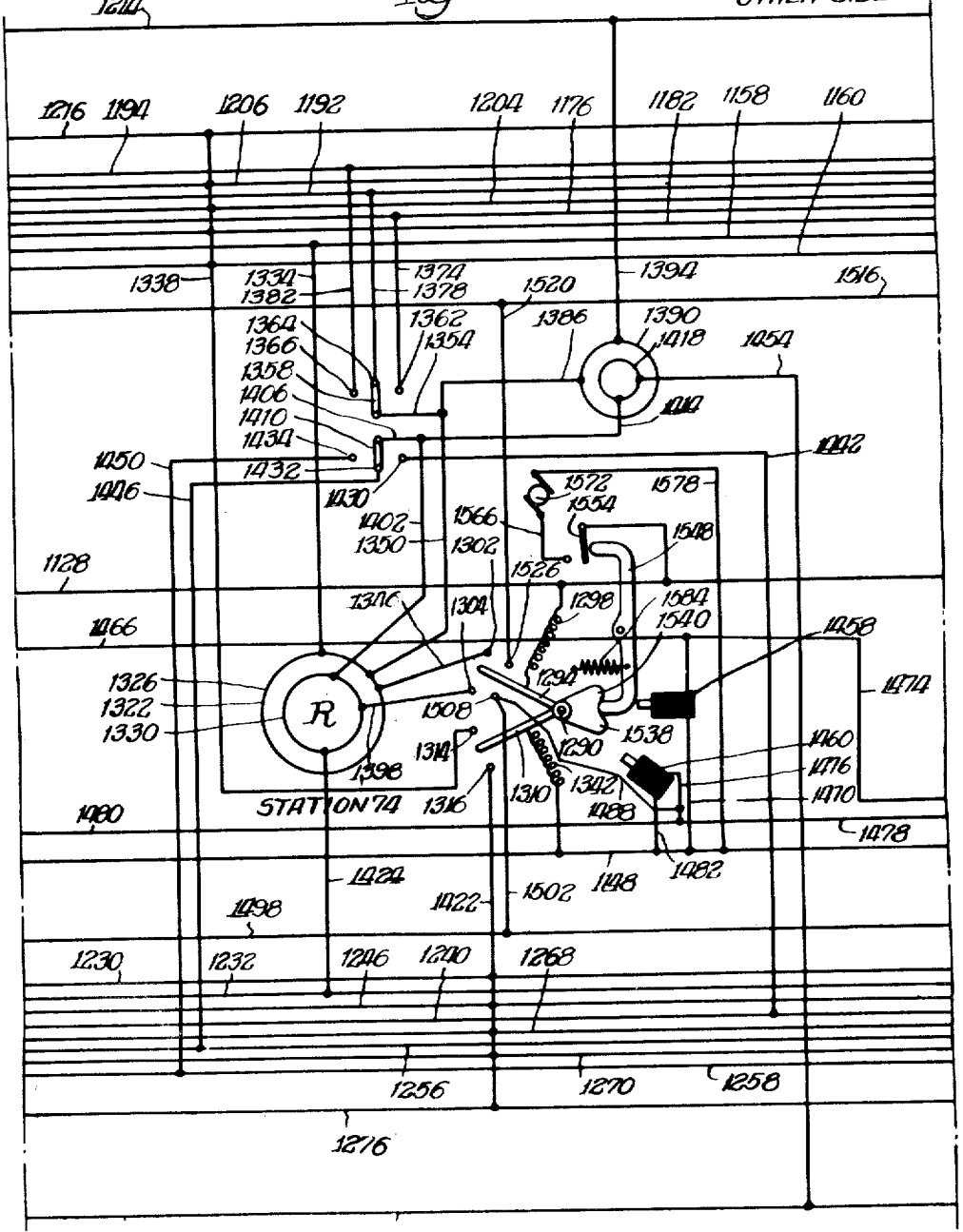

Figure 3A, to be read particularly with Figures 3B and 3C, is a portion of a wiring diagram showing the selective circuits for multiple control of the registering mechanism (with certain of the parts of the registering mechanism omitted for the sake of clearness), said figure showing the wiring for the Ethyl station and the wiring to the Regular and Third Grade stations;

Figure 3B, to be read particularly with Figures 3A and 3C, is a portion of a wiring diagram showing the selective circuits for multiple control of the registering mechanism (with certain of the parts of the registering mechanism omitted, when referred to Figures 3A and 3C, for the sake of clearness), said figure showing the wiring for the Regular station and the wiring to the Ethyl and Third Grade stations;

Figure 3C, to be read particularly with Figures 3A and 3B, is a portion of a wiring diagram showing the selective circuits for multiple control of the registering mechanism (with certain of the parts of the registering mechanism omitted for the sake of clearness), said figure showing the wiring for the Third Grade station, and the wiring to the Ethyl and Regular stations;

Figure 4 is an enlarged elevation of a modified form of registering mechanism embodying the invention, the same being taken from the dial side, with the dial plate omitted;

Figure 5 is an elevation of the modified form of registering mechanism illustrated in Figure 4, the same being taken from the opposite side (inside) of said mechanism to that shown in Figure 4;

Figure 6 is an enlarged transverse sectional elevation taken substantially in the plane as indicated by the line 6—6 of Figure 4, the same showing the power drive for the numeral wheels and type indicating means, the numeral wheel indicated being that of the hundreds money counter;

Figure 7 is an enlarged transverse sectional elevation taken substantially in the plane as indicated by the line 7—7 of Figure 4, the same showing the fractions gallons registering wheel, the fractions daily price wheel, and the running lights progressively operative for substantially the last half revolution of the fractions numeral wheel, and operative between the change of fractions to show the approach to a full fraction;

Figure 7A is a fragmentary sectional elevation taken substantially in the plane as indicated by the line 7A—7A of Figure 7, showing an interlock solenoid for the fractions amount (gallons) registering wheel;

Figure 8 is an enlarged fragmentary sectional elevation of the gallons numeral wheels, the same being taken substantially in a vertical plane through the power drive shaft;

Figure 9 is a plan view showing the stop pawl mechanism for the fraction gallons and the unit money registering wheels, the same being in fully stopped position;

Figure 10 is a fragmentary plan view corresponding to Figure 9 showing the stop pawl mechanism for the fraction gallons and the unit money registering wheels, the same being in released position to permit movement of the registering wheel;

Figure 11 is a fragmentary elevation showing the stop mechanism illustrated in Figure 9, the same being taken substantially in the plane as indicated by the line 11—11 of Figure 9;

Figure 12 is a plan view showing the stop mechanism for the daily price numeral wheel;

Figure 13 is a fragmentary sectional elevation taken substantially in the plane as indicated by the line 13—13 of Figure 12;

Figure 14 is an end elevation showing the stop mechanism for the type indicating means;

Figure 15 is a plan view of the index control mechanism for the units, gallons or amount registering wheel, the same being taken substantially in the plane as indicated by the line 15—15 of Figure 8, it being understood that the construction of the index control mechanism for the tens money registering wheel is similar;

Figure 16 is a sectional elevation taken substantially in the plane as indicated by the line 16—16 of Figure 15;

Figure 17 is a sectional elevation taken substantially in the plane as indicated in the line 17—17 of Figure 15;

Figure 18 is a fragmentary sectional top plan view taken substantially in the plane as indicated by the line 18—18 of Figures 15 and 19;

Figure 19 is a fragmentary plan view of the fixed and movable plate index members, the same being taken substantially in the plane as indicated by the line 19—19 of Figure 16, and showing the plate members just after the associated numeral wheel has been moved to counting position;

Figure 20 is a fragmentary plan view corresponding to Figure 19, showing the position of the plate index members just prior to the movement of the associated numeral wheel to counting position;

Figure 21 is a top plan view showing the drive from the meter shaft and from the variator to the distributor mechanism;

Figure 22 is a sectional elevation through the distributor mechanism for operating the registering mechanism illustrated in Figures 4 to 20, inclusive;

Figure 23 is a top plan view of the distributor mechanism illustrated in Figure 22 with the case removed, the same being taken substantially in the plane as indicated by the line 23—23 of Figure 22;

Figure 24 is an elevation of the zeroizing switch for the units and tens numeral wheels for the gallon side of the register, and the tens and hundreds numeral wheels for the money side of the register, the same looking in the direction of the arrows 24—24 shown in Figure 23;

Figure 25 is a top plan view of the rotatable distributor heads for the distributing mechanism illustrated in Figure 22, it being understood that the distributor heads for both money and gallons are of the same construction;

Figure 26 is a sectional elevation through the rotatable distributor head shown in Figure 25, the same being taken substantially in the plane as indicated by the line 26—26 of Figure 25;

Figure 27 is an enlarged sectional elevation through the distributor drive gear and the driving and reset clutch for the rotatable distributor heads;

Figure 28 is a bottom plan view, partly in section, of the driving gear for the distributor heads, the same being taken substantially in the plane as indicated by the line 28—28 of Figure 27;

Figure 29 is a top plan view of the distributor contact face member having a portion broken-away to show the bottom contact rings, it being understood that said distributor face member for both the money side of the registering mechanism and the gallon or amount side are of the same construction;

Figure 30 is a sectional elevation through the distributor contact face member, the same being taken substantially in the plane as indicated by the line 30—30 of Figure 29;

Figure 31 is a fragmentary sectional elevation of a portion of the distributor contact face member showing the entrance to the money tens or the gallons units contact ring for the indexing solenoid magnet, the same being taken substantially in the plane as indicated by the line 31—31 of Figure 29;

Figure 32 is an enlarged fragmentary sectional elevation showing the exit from the contact ring illustrated in Figure 31, the same being taken substantially in the plane as indicated in line 32—32 of Figure 29;

Figure 33 is an enlarged fragmentary sectional elevation showing the fractions of gallons or units of money contact shoes, the same being taken substantially in the plane as indicated by line 33—33 of Figure 29;

Figure 34 is a fragmentary sectional elevation showing the continuous ring for the distributor correcting magnets for both the money and gallon side of the register, the same being taken substantially in the plane as indicated by the line 34—34 of Figure 29;

Figure 35 is a fragmentary sectional elevation showing the lead ring for circuiting the movable distributor head, the same being taken substantially in the plane as indicated by the line 35—35 of Figure 29;

Figure 36 is a top plan view through the distributor mechanism as illustrated in Figure 22, the same being taken substantially in the plane as indicated by the line 36—36 of Figure 22;

Figure 37 is a fragmentary top plan view of the reset cocking mechanism showing the position of the parts where the reset cocking mechanism is in wound and locked position before the distributors have been reset to zero, the same being taken substantially in the plane as indicated by the line 37—37 of Figure 22;

Figure 38 is a side elevation of the reset cocking mechanism shown in Figure 37, the same corresponding to the view as shown in Figure 22;

Figure 39 is a fragmentary top plan view of the reset cocking mechanism shown in Figure 37 wherein said mechanism is in unwound and unlocked condition by virtue of the distributor having moved to zero, as after a reset operation, the same being taken substantially in the plane as indicated by the line 37—37 of Figure 22;

Figure 40 is a wiring diagram of the registering mechanism illustrated in Figures 4 to 20 inclusive, showing the terminals for electrical connection to the wiring diagram shown in Figures 41A, 41B and 41C.

Figure 41A is a wiring diagram showing the circuit breaker switch, the type switch and the money and amount distributors to be used with the constructions shown in Figures 4 to 39 inclusive, the completed circuits for connection to the wiring diagram shown in Figure 40 to be read with Figures 41B and 41C;

Figure 41B is a continuation of the wiring diagram shown in Figures 41A and 41C, showing the switches for setting the daily price indicating means, and showing terminal connections therefor, the terminal designating numerals which are, not enclosed, indicating terminals of Figures 41A, 41B and 41C, and the terminal designating numerals enclosed (and adjacent said first referred to terminal designating numerals) corresponding to the terminals of Figure 40, to which said first named terminals are connected;

Figure 41C is a continuation of the wiring diagram shown in Figures 41A and 41B, showing the power drive motor for the registering mechanism and certain terminals for the wiring diagram shown in said Figures 41A and 41B, the terminal designating numerals which are not enclosed, indicating terminals of Figures 41A, 41B and 41C, and the terminal designating numerals enclosed (and adjacent said first referred to terminal designating numerals) corresponding to the terminals of Figure 40, to which said first named terminals are connected;

Figure 42 is a more or less diagrammatic representation of a portion of the reset means, showing interlock means for preventing dispensing actuation of more than one station at a time;

This application is a continuation-in-part of applicant's copending application, Serial No. 305,757, filed November 24, 1939, now abandoned, for Registering Mechanism and Computing Device, and is a division of Patent No. 2,379,785, granted July 3, 1945, for Liquid Dispensing Apparatus.

*Island arrangement of registering and dispensing mechanism (Figures 1 and 2)*

Referring first of all more particularly to Figures 1 and 2, said figures illustrate an adaptation of the registering and dispensing mechanism to an island of a liquid dispensing service station showing how the mechanism embodying the invention makes it possible to redesign said island for more convenient operation, though it is of course understood that the herein contemplated registering mechanism and computing device is adapted for other installations such as an installation where no island may be used, or for other uses such as computing scales, cash registers and the like.

The island 50 is adapted to be provided, for example, with supports 52 and 54 which may be conveniently located adjacent the ends thereof, and said supports are provided with a plurality of registering mechanisms 56 and 58, and 60 and 62, which may be pivoted to said supports so that they may be moved arcuately to convenient positions for visibility. In order to conveniently designate these registering mechanisms, the registering mechanisms 56 and 60 are designated as those on "this side," while the registering mechanisms 58 and 62 are designated as those on the "other side."

Each registering mechanism is provided with a window 64 for showing the computed price of the commodity dispensed, and a window 66 for showing the amount of the commodity dispensed. A window 68 is also provided for showing the prevailing or posted price, or the price at which the device is set to compute as controlled by any one of the three stations 72, 74 and 76, which stations, for example, are adapted to provide means for dispensing the different types of gasoline such as third grade, regular and Ethyl. The registering mechanisms are also provided with a window 70 for showing which station is used, that is, which type of gasoline will be dispensed, and is controlled from the selected station. In the embodiment shown, the stations are provided with preselecting and control mechanism 78, 80 and 82, and each is provided with a horizontal hose reel 84 wherein the dispensing hose may be withdrawn from the storage position and moved to any position around the station without contacting the casing of the station, the visigauges 86 being disposed at a high point in each of the stations. Preselecting mechanism is shown and described in application Serial No. 305,757, filed November 24, 1939, and the horizontal hose reel arrangement is shown in United States Letters Patent No. 2,397,267, granted March 26, 1946.

With an arrangement of this character a vehicle such as the automobile 88 can be driven to either side of the island, and the driver can select which type of gasoline he desires. If, for example, the driver drives to the "other side" and he desires Ethyl gasoline, the station 76 will be used, and the operator, through a mechanism to be later described, can connect said station 76 to the registering mechanisms 58 and 62. He can also preselect either the amount or the cost of the gasoline to be delivered, and can withdraw the hose from the horizontal hose reel to dispense said liquid to said vehicle in the well known manner. In the meantime, should another vehicle be driven up to "this side" of the island and desire Regular gasoline, the operator can connect the station 74 to each of the registering mechanisms 56 and 60 and again can preselect, if desired, and dispense Regular gasoline. Thus it will be seen that both the operators and the purchasers can view their respective purchases, and neither will interfere with the other.

In the first instance the prevailing price of Ethyl gasoline will appear in the windows 68 of the registering mechanisms 58 and 62, and the fact that Ethyl gasoline was being bought will appear in the windows 70 of said mechanisms 58 and 62, while in the second instance, the prevailing price of Regular gasoline will appear in the windows 68 of the registering mechanisms 56 and 60. While the word Regular will appear in the windows 70 of said registering mechanisms 56 and 60.

The registering mechanism herein contemplated is shown and described in detail in applicant's said Patent No. 2,379,785, and it will be understood, if the second motorist had desired Ethyl gasoline, he need only wait until the first motorist had received his gasoline. The station 76 could then be connected to the mechanisms 58 and 60, and the second motorist may receive his desired amount after said mechanisms 56 and 60 have been reset to zero, but the registering mechanisms 58 and 62 will remain at the last purchased price until a station (72, 74 or 76) is connected to said registering mechanisms 58 and 62, and said registering mechanisms are then reset for dispensing from said stations.

The registering mechanisms shown as at 56, 58, 60 and 62 in Figures 1 and 2, may be suitably encased, and comprise the construction such as shown and described in detail in Figures 3 to 11, inclusive, of applicant's said Patent No. 2,379,785, and may be operated by distributor mechanism such as shown and described in detail in Figures 12 to 26, inclusive, in said Patent No. 2,379,785. The electrical connections for the distributor mechanism of Figures 12 to 26 of said Patent No. 2,379,785 and said registering mechanism of Figures 3 to 11 of said Patent No. 2,379,785 are shown and described in detail with respect to Figures 27, 28 and 29 of said Patent No. 2,379,785. However, other forms of registering mechanism and distributor mechanism may be used such as otherwise shown and described in detail in said Patent No. 2,379,785, and shown and described in detail herein.

Further variating mechanism such as particularly shown and described in United States Letters Patent No. 2,323,374, granted July 6, 1943 for Computing Mechanism may be used operating the calibrating solenoids, the setting mechanism and the other mechanism of the herein described mechanism, and that shown and described in said Patent No. 2,379,785.

The relation, construction and operation of the registering mechanism, distributor mechanism and variator of Figures 3 to 29, of Patent No. 2,379,785 is all shown and described in detail in said patent.

*Circuit for plurality of dispensing stations*

Referring now to the wiring diagram illustrated in Figures 3A, 3B and 3C, there is illustrated a circuit whereby it is possible to select any station 72, 74 or 76, and to connect the selected station to the registering mechanisms on "this side" or the "other side," the selection of the particular station determining the operation of the daily price numeral wheels and the type mechanism to indicate on the selected registering mechanisms the setting of the variator in the selected station and the type of gasoline dispensed from that station. In the illustration, let it be assumed that the stations 72, 74 and 76, such as shown in Figures 1 and 2, dispense different types of gasoline, as, for example, Third Grade, Regular, and Ethyl, respectively, and mounted within the stations are the variators and distributors therefor.

Only one numeral wheel 1104, 1106, 1108 and 1110 need be shown for the respective registers 56, 58, 60 and 62, and only one connection from the distributors to said numeral wheels need be shown as the construction, wiring and operation of the numeral wheels and distributors have already been shown particularly and described.

The type signs or indicating means are shown at 1112, 1114, 1116, 1118, similar to that shown at 118 (Figures 3 and 4 in said Patent 2,379,785) and one daily price wheel for each register is illustrated at 1120, 1122, 1124 and 1126, similar to that shown at 152 in Figure 3 of said Patent No. 2,379,785, it being understood, of course, that operating means therefor, such as described in said Patent No. 2,379,785, is provided. Also similar mechanism such as shown and described in Figures 3A to 20, inclusive, herein may be used.

The conductor or lead 1128 is electrically connected to a suitable source of current supply and said conductor is adapted to supply current for the operation of the mechanisms of stations 72, 74 and 76. Said lead 1128 is electrically connected as at 1130 to one arm 1132 of the selector switch 1134 of the station 72. The arm 1132 is adapted to be moved between two contacts 1136 and 1138, and the switch 1134 is also provided with the arm 1140 insulated from the arm 1132 but movable therewith between contacts 1142 and 1144. That is, when arm 1132 is in engagement with contact 1136, arm 1140 is in engagement with contact 1142 and when arm 1132 is in engagement with contact 1138, arm 1140 is in engagement with the contact 1144. The arm 1140 is connected through conductor 1146 to the ground lead 1148, shown also as the ground lead for stations 74 and 76.

The distributor 1150 of station 72 is represented as having the controls for the registers on the "other side" on the outer ring 1152, and the controls for the register for "this side" on the inner ring 1154. The outer ring 1152 is connected through the conductor 1156 to the conductor 1158 which is connected to suitable solenoids of the numeral wheels 1106 and 1110. The circuit from said solenoids is completed by the conductor 1160 which is connected to the conductor 1162 which in turn is connected to the contact 1142 whereby the conductor 1160 will be grounded when switch arm 1140 engages contact 1142.

The outer ring 1152 is connected through the conductor 1164 to contact 1136 whereby current is supplied to the outer ring when switch arm 1132 engages contact 1136. The outer ring 1152 is connected through the conductor 1166 to the conductor 1168 connected to the type switch 1170 for the registers for the "other side." This type switch for station 72 is adapted to be moved into engagement with the contact 1172 which is connected through the conductor 1174 to the conductor 1176, which in turn is connected to the Third Grade solenoids 1178 and 1180 of the type indicating means 1118 and 1114. These solenoids are electrically connected through the conductor 1182 to the conductor 1162 whereby they may be grounded.

The type switch 1170 is also provided with contacts 1184 and 1186 connected through the conductors 1188 and 1190 to the conductors 1192 and 1194 which are electrically connected respectively to the Regular solenoids 1196 and 1198, and the Ethyl solenoids 1200 and 1202 of the type indicating means 1118 and 1114 respectively. The solenoids 1196 and 1198 are connected through the conductor 1204 to the conductor 1162, and the solenoids 1200 and 1202 are connected through the conductor 1206 to said conductor 1162 whereby these circuits may be grounded.

The conductor 1166 is connected through the conductor 1208 to the outer ring 1210 which represents the daily price switch for the registers on the "other side," and said outer ring 1210 is connected through the conductor 1212 to the conductor 1214 which in turn is connected to the proper solenoids of the daily price indicating means 1122 and 1126. The circuits of these solenoids are completed through conductors 1216 and 1162 whereby they may be grounded. The inner ring 1154 of the distributor 1150 is connected through the conductor 1218 to the contact 1138 and is also connected through the conductor 1220 to the conductor 1222 connected to the switch arm 1224 of the type switch for "this side" and to the inner ring 1226 which represents the daily price switch for "this side."

The contact 1144 is connected through the conductor 1228 to the conductor 1230, the latter being connected to suitable solenoids of the numeral wheels 1108 and 1104. The solenoid circuits are connected through the conductor 1232 to the conductor 1234 which is connected to the inner ring 1154 of the distributor 1150 of station 72. Thus when switch arm 1132 has been moved to engage the contact 1138, the lead 1128 is connected through conductor 1130, switch arm 1132, and conductor 1218 to the inner ring 1154 of the distributor for "this side." Said distributor is then connected through said conductor 1234 to the numeral wheels 1108 and 1104, and the solenoids of said numeral wheels are grounded through conductors 1230 and 1228, contact 1144, switch arm 1140, and conductors 1146 and 1148.

As station 72 represents Third Grade gasoline, the type switch 1224 is in position where said switch engages the contact 1236 which is connected through the conductor 1238 to the conductor 1240, which in turn is connected to the Third Grade solenoids 1242 and 1244 of the type indicating means for the registering mechanism on "this side." The solenoids are connected through the conductor 1246 to the conductor 1228 whereby they may be grounded. The switch 1224 is also provided with the contacts 1248 and 1250 connected through the conductors 1252 and 1254 to the conductors 1256 and 1258 extending respectively to the Regular solenoids 1260 and 1262, and the Ethyl solenoids 1264 and 1266. The solenoids 1260 and 1262 are connected through the conductor 1268 to the conductor 1228, and the solenoids 1264 and 1266 are connected through the conductor 1270 to the conductor 1228, whereby the circuits of said solenoids may be respectively grounded.

The inner ring 1226 of the daily price switch is connected through the conductor 1272 to the conductor 1274, which in turn is connected to proper solenoids of the daily price wheels 1124 and 1120. The circuits of said solenoids are completed by the conductor 1276 which is electrically connected to the conductor 1228 whereby said circuits may be grounded. The switch arms 1132 and 1140 are provided with interlock solenoids 1278 and 1280. The interlock solenoid 1278 is so arranged that when it is energized (and solenoid 1280 is deenergized) switch arm 1132 cannot be moved to engage contact 1136, and of course switch arm 1140 cannot be moved to engage contact 1142. Switch arms 1132 and 1140 can, however, respectively be moved to engage contacts 1138 and 1144. When interlock solenoid 1280 is energized (and solenoid 1278 is deenergized) switch arms 1132 and 1140 cannot be moved to engage contacts 1138 and 1144 respectively, but can be moved to engage contacts 1136 and 1142, respectively. When both solenoids 1278 and 1280 are energized, switch arms 1132 and 1140 cannot be moved to engage any contacts and station 72 is inoperative. Of course, when both solenoids 1278 and 1280 are inoperative, the switch arms may be selectively moved to engage contacts 1136 and 1142, or contacts 1138 and 1144. The solenoid 1278 is connected through the conductor 1282 to the contact 1136 and the solenoid 1280 is connected through the conductor 1284 to the contact 1138. Solenoids 1278 and 1280 are provided with the conductors 1286 and 1288 respectively, which are connected to the ground lead 1148.

Stations 74 and 76 are provided with selector switches 1290 and 1292, respectively, similar to switch 1134, said switches being provided with arms 1294 and 1296 connected as at 1298 and 1300 to the lead 1128. Arms 1294 and 1296 are adapted to be moved between contacts 1302 and 1304, and 1306 and 1308, respectively. Switches 1290 and 1292 are also provided with arms 1310 and 1312, respectively insulated from the arms 1294 and 1296, respectively, but movable therewith between contacts 1314 and 1316, and 1318 and 1320, respectively. That is, when arms 1294 and 1296 are in engagement with contacts 1302 and 1306, arms 1310 and 1312 are in engagement with contacts 1314 and 1318, respectively, and when said arms 1294 and 1296 are moved into engagement with the contacts 1304 and 1308, respectively, arms 1310 and 1312 are moved into engagement with the contacts 1316 and 1320, respectively.

The distributors 1322 and 1324 for the Regular station 74 and Ethyl station 76 are provided with the controls for the registers on the "other side" represented by the outer rings 1326 and 1328, respectively, and are represented as having the controls for the registers on "this side" on inner rings 1330 and 1332 respectively. The outer rings 1326 and 1328 are connected, respectively, through conductors 1334 and 1336 to the conductor 1158, which is connected to the suitable solenoids of the numeral wheels 1106 and 1110. The circuits to the stations 74 and 76 from said solenoids are completed by the conductor 1160 being connected to the conductors 1338 and 1340 respectively, said conductors being connected to the contacts 1314 and 1318, whereby the conductor will be grounded when the switch arms 1310 and 1312 engage the contacts 1314 and 1318, inasmuch as the switch arms 1310 and 1312 are connected to the ground lead 1148 through the conductors 1342 and 1344, respectively.

The outer rings 1326 and 1328 are connected through the conductors 1346 and 1348 to contacts 1302 and 1306, respectively, whereby current is supplied to the outer rings when the switch arms 1294 and 1296 engage contacts 1302 and 1306. The outer rings 1326 and 1328 are connected through the conductors 1350 and 1352 to the conductors 1354 and 1356 which are connected to the type switches 1358 and 1360 for the registers on the "other side."

Type switch 1358 for station 74 is provided with contacts 1362, 1364 and 1366, and type switch 1360 for station 76 is provided with contacts 1368, 1370 and 1372. Contacts 1362 and 1368 are connected through the conductors 1374 and 1376 to the conductor 1176 of the Third Grade type solenoids 1178 and 1180. The conductor 1182 of said solenoids is connected to the conductors 1338 and 1340 in order that the ground connections may be completed through the stations 74 and 76. Contacts 1364 and 1370 are connected through the conductors 1378 and 1380 to the conductor 1192 of the Regular type solenoids 1196 and 1198, and the conductor 1204 of said solenoids is electrically connected to the conductors 1338 and 1340 in order to provide for their respective ground connections through the stations 74 and 76. Contacts 1366 and 1372 are connected through conductors 1382 and 1384 to the conductor 1194 of the Ethyl solenoids 1200 and 1202, and the conductor 1206 of said solenoids is connected to the conductors 1338 and 1340 in order to provide for their ground connections through the stations 74 and 76.

Inasmuch as station 74 has been assumed to dispense Regular gasoline, switch 1358 has been moved to engage contact 1364, and inasmuch as station 76 has been assumed to dispense Ethyl gasoline, switch 1360 has been moved to engage contact 1372. The conductors 1350 and 1352 from the outer rings 1326 and 1328 of the distributors are connected through conductors 1386 and 1388 to the outer rings 1390 and 1392 which represent the daily price switches for the registers on the "other side," and the outer rings 1390 and 1392 are connected through conductors 1394 and 1396 to the conductor 1214, which in turn is connected to the proper solenoids of the daily price indicating means 1122 and 1126. The circuits for these solenoids for stations 74 and 76 are completed by electrical connection between the conductor 1216 and conductors 1338 and 1340.

The inner rings 1330 and 1332 of the distributors are connected through conductors 1398 and 1400 to contacts 1304 and 1308 and are also connected through conductors 1402 and 1404, respectively, to the conductors 1406 and 1408 connected to the switch arms 1410 and 1412 of the type switches for the registers on "this side," and said conductors 1402 and 1404 are connected through conductors 1414 and 1416 to the inner rings 1418 and 1420 which represent the daily price switches for the registers on "this side."

Contacts 1315 and 1320 are connected through conductors 1422 and 1426 to the conductors 1230, 1246, 1268, 1270 and 1276, the conductor 1230 being connected to the suitable solenoids of the numeral wheels 1108 and 1104. The solenoid circuits are connected through the conductor 1232 to the conductors 1424 and 1428, which are connected to the inner rings 1330 and 1332 of the distributors of stations 74 and 76.

Type switches 1410 and 1412 of the stations 74 and 76 are provided with the contacts 1430, 1432, 1434, and 1436, 1438, 1440, respectively. Contacts 1430 and 1436 are connected to conductors 1442 and 1444, said conductors being connected to the conductor 1240 of the Third Grade solenoids 1242 and 1244. The circuits of the solenoids 1242 and 1244 are completed through conductor 1246 as said conductor is connected to conductors 1422 and 1426.

Contacts 1432 and 1438 are connected through conductors 1446 and 1448 to the conductor 1256 of the Regular solenoids 1260 and 1262, and the conductor 1268 of said solenoids is connected through the conductors 1422 and 1424 to contacts 1316 and 1320. Contacts 1434 and 1440 are connected through conductors 1450 and 1452 to the conductor 1258 of the Ethyl solenoids 1264 and 1266, the circuit of said solenoids being completed through connection between conductor 1270 and conductors 1422 and 1426, respectively. As the station 74 has been assumed to dispense Regular gasoline, switch 1410 has been moved to engage contact 1432, and as station 76 has been assumed to dispense Ethyl gasoline, switch 1412 has been moved to engage contact 1440.

The inner rings 1418 and 1420 of the daily price switches are connected through conductors 1454 and 1456 with the conductor 1274, which in turn is connected to the proper solenoids of the daily price wheels 1124 and 1126. The circuits of said solenoids are completed by the conductor 1276 which is electrically connected to the conductors 1422 and 1426 whereby the circuits may be grounded.

The switch arms 1294 and 1310 are provided with the interlock solenoids 1458 and 1460, and switch arms 1296 and 1312 are provided with the interlock solenoids 1462 and 1464. The interlock solenoids 1458 and 1462 are so arranged that when they are energized (and solenoids 1460 and 1464 are deenergized) switch arms 1294 and 1296 cannot be moved to engage contacts 1302 and 1306, and of course switch arms 1310 and 1312 cannot be moved to engage contacts 1314 and 1318. Switch arms 1294 and 1310, and 1296 and 1312, however, can be moved respectively to engage contacts 1304 and 1316, and 1308 and 1320. When interlock solenoids 1460 and 1464 are energized (and solenoids 1458 and 1462 are deenergized) switch arms 1294 and 1310, and 1296 and 1312 cannot be moved to engage contacts 1304 and 1316, and 1308 and 1320, respectively, but can be moved to engage contacts 1302 and 1314, and 1306 and 1318, respectively. When the solenoids 1458 and 1460, and 1462 and 1464 are energized, the switch arms of the selector switches 1290 and 1292 cannot be moved to engage any contacts and the stations 74 and 76 are inoperative. Of course, when both solenoids are inoperative the switch arms of the selector switches may be selectively moved to engage the contacts for the registers for "this side" or the "other side."

The solenoids 1458 and 1462 are electrically connected by means of a conductor 1466, said conductor being electrically connected to the contact 1302 through the conductor 1467. Solenoid 1462 is connected through conductor 1468 to the contact 1306. Solenoids 1458 and 1462 are grounded through conductors 1470 and 1472 which are electrically connected to the ground lead 1148. Solenoid 1458 is connected to the conductor 1474 which is connected to the contact 1136 through the conductor 1164.

Solenoid 1460 is connected through conductors 1476 and 1478 to the contact 1138 through the conductor 1218; and solenoid 1464 is connected through conductor 1480 to the conductor 1478 and is connected through conductor 1481 to contact 1304 through conductor 1398. Solenoids 1460 and 1464 are grounded by conductors 1482 and 1484, which are connected to the ground lead 1148, and solenoid 1464 is connected to the contact 1308 through conductor 1486, while solenoid 1460 is connected to contact 1304 through conductor 1488.

As has already been pointed out, each of the registers 56, 58, 60 and 62 is power driven by motors 126 provided in each of said registers. In Figures 3A, 3B and 3C, the power drive motors for the registers on "this side" are shown at 1490 and 1492, and the power drive motors for the registers on the "other side" are shown at 1494 and 1496. One side of said motors 1490 and 1492 is connected by the conductor 1498, and conductor 1498 is electrically connected through conductors 1500, 1502 and 1504 to the contacts 1506, 1508 and 1510, respectively, of the selector switches 1134, 1290 and 1292. The other side of said motors 1490 and 1492 is grounded through connection between conductors 1512 and 1514, respectively, with the ground lead 1148.

One side of the register power drive motors 1494 and 1496 is electrically connected through the conductor 1516, and said conductor is connected through the conductors 1518, 1520 and 1522 to contacts 1524, 1526 and 1528, respectively of the selector switches 1134, 1290 and 1292. The other side of said motors 1494 and 1496 is grounded through connection of the conductors 1530 and 1532 to the ground lead 1148.

Each of the stations 72, 74 and 76 is provided with dispensing means such as a motor operated pump, and the hose and nozzle assemblies 84 (Figure 1), and the selector switches 1134, 1290 and 1292 are provided with spaced cams 1534, 1536; 1538, 1540; and 1542, 1544. Upon movement of the selector switches in either direction, the cams will cause a rocking movement of the pivoted levers 1546, 1548 or 1550. Rocking movement of these levers will cause the motor control switches 1552, 1554 or 1556 to engage contacts 1558, 1560 or 1562, whereby current will be supplied from the lead 1128 through said switches, said contacts, and the conductors 1564, 1566 or 1568 to the respective dispensing motors 1570, 1572 or 1574, energizing said motors to cause operation of the pumping units, the circuit being completed through the conductors 1576, 1578 or 1580 to the ground 1148. The levers 1546, 1548 and 1550 are biased toward switch open position, that is, in a position to follow said cams by means of the springs 1582, 1584 and 1586. Movement of the selector switches to open position of course causes opening of the switches 1552, 1554 or 1556, whereby the respective dispensing motors are rendered inoperative.

It will be seen that stations 72, 74 and 76 are inoperative where the selector switches 1134, 1290 and 1292 are open. Let it be assumed that type switch 1224 is in engagement with contact 1236, that type switch 1170 is in engagement with contact 1172, that type switch 1410 is in engagement with contact 1432, that type switch 1358 is in engagement with contact 1364, that type switch 1412 is in engagement with contact 1440, and that type switch 1360 is in engagement with contact 1372. The three stations are then set respectively for dispensing Third Grade, Regular and Ethyl gasoline, and it is to be assumed that the variators of said stations have been suitably set so that the daily price switches 1210 and 1226; 1390 and 1418; and 1392 and 1420 are properly set to control the respective solenoids of the daily price indicating means such as represented by the numeral wheels 1120, 1122, 1124 and 1126, and as more particularly described in said Patent 2,323,374.

In the event a customer should drive up to the station 72 desiring Third Grade gasoline, and his vehicle is so disposed that it is on "this side," the attendant moves the selector switch 1134 to a position where the switch arm 1132 engages contacts 1138 and 1506, and the switch arm 1140 engages contact 1144. Current will then be supplied through lead 1128, conductor 1130, switch arm 1132, to contacts 1138 and 1506. Current passing through the contact 1506 passes through conductors 1500 and 1498, energizing motors 1490 and 1492, and the current will pass through conductors 1512 and 1514 to the ground lead 1148. Current supplied to the contact 1138 will pass through conductor 1218, conductors 1478 and 1476, to solenoid 1460, energizing said solenoid, the current passing through conductor 1482 to the ground lead 1148. The solenoid 1460 being energized will prevent the switch 1290 from being moved to a position where it would engage contacts 1304, 1508 and 1316. Current will also pass through the conductor 1480 to solenoid 1464, energizing said solenoid, the current then passing through conductor 1484 to the ground lead 1148. Operation of solenoid 1464 therefore will prevent the selector switch 1292 from being moved to a position where contact will be established with the contacts 1308, 1510 and 1320. Thus stations 74 and 76 will be inoperative to dispense on "this side" for so long as switch 1134 is in position where the switch arm 1132 engages the contacts 1138, 1506 and 1144.

Movement of the selector switch 1134 to closed position, as above described, causes the motor switch 1552 in station 72 to be closed, starting operation of the dispensing motor 1570 and the associated pump, permitting liquid to be dispensed in the usual manner through the hose and nozzle of station 72. Operation of the dispensing pump causes liquid to pass through the meter (not shown) operating the variator and amount or gallon distributors in a manner already described. Operation of the variator causes operation of the cost distributors in a manner already described. Current will pass through the conductor 1218, through the distributor represented at 1154, through conductors 1234 and 1232 to the proper solenoids of the registers represented by the numeral wheels 1104 and 1108, the circuit being completed by passing through conductors 1230, 1228, contact 1144, switch arm 1140, and through conductor 1146 to the ground lead 1148. As long as the variator and consequently the distributors of station 72 operate, registry will be effected on the registering mechanism, and when dispensing operation ceases, the registering mechanism will indicate the cost and amount of the liquid dispensed as has already been described.

Current will also pass through conductor 1218 to conductors 1220 and 1222 to the daily price switch of the variator of station 72 represented at 1226. Current passing through the daily price switch 1226 passes through conductors 1272 and 1274 to the proper solenoids of the daily price wheels indicated at 1120 and 1124, the circuit being completed through conductors 1276 and 1228 to the ground lead 1148. Thus, the daily price wheels 1124 and 1120 will indicate the price at which the variator has been set for station 72, as has already been described in said Patent 2,323,374. Current passing through conductor 1220 will also pass through type switch 1224, contact 1236, and conductors 1238 and 1240 to the Third Grade type solenoids 1242 and 1244, energizing said solenoids to cause the type signs 1116 and 1112 to indicate Third Grade gasoline. The circuit will be completed through conductors 1246 and 1228.

Should another customer drive into the station for Ethyl gasoline (for example), he cannot be served on "this side," as the selector switch 1292 cannot be moved to engage contacts 1308, 1510 and 1320. He can, however, drive to the "other side" whereupon the switch 1292 can be moved so that the switch arm 1296 engages contacts 1306 and 1528, at which time switch arm 1312 will engage contact 1318. At this time the cam 1544 will rock the lever 1550 to cause the dispensing motor switch 1556 to be closed, whereupon current is supplied from the lead 1128 through switch 1556, contact 1562, conductor 1568, to the dispensing motor 1574, energizing said motor, the circuit being completed to the ground lead 1148 through conductor 1580.

Station 76 can then dispense gasoline in the usual manner. Movement of the switch 1292 to close contacts 1306 and 1528 causes current to be supplied to contact 1528 and to conductor 1516 through conductor 1522, energizing the register power drive motors 1494 and 1496, the circuits being completed to the ground lead 1148 through conductors 1530 and 1532. Current will also be supplied through contact 1306 to conductor 1466, and solenoid 1462, energizing said solenoid, but the switch already having been closed will not be affected by operation of this solenoid, and the current will pass through conductor 1466, to solenoid 1458, energizing said solenoid as it is grounded through conductor 1470, whereupon station 74 will be inoperative as both interlocking solenoids 1458 and 1460 will be energized.

Current will also pass through conductor 1474, conductor 1164, conductor 1282, to solenoid 1278, energizing said solenoid as it is grounded through the conductor 1286, whereupon station 72 cannot be reoperated to dispense liquid on the "other side." Current will also pass through conductor 1348 and contact 1306 to the distributor represented by ring 1328. It will then pass from the distributor through conductor 1352 to the type switch 1360. It will pass through the type switch, contact 1372, and conductors 1384 and 1194 to the Ethyl solenoids 1202 and 1200, energizing said solenoids to cause the type signs 1114 and 1118 to indicate that Ethyl is being dispensed from the "other side," the circuit from said solenoids being completed through conductors 1206 and 1340, contact 1318, switch arm 1312, and conductors 1344 and 1148. Current will also pass through conductor 1388 to the daily price switch of the variator of station 76, represented by ring 1392. It will pass from the daily price switch 1392 to conductor 1214 through conductor 1396, causing the solenoids of the daily price means indicated at 1122 and 1126 to be energized, causing said daily price means to indicate the price at which the variator of station 76 is set. The circuit is completed through conductors 1216 and 1340. Dispensing operation causes the distributor to supply current through conductors 1336 and 1158 to energize the proper solenoids of the numeral wheels indicated at 1106 and 1110 of registers 58 and 62, the circuit being completed through conductors 1160 and 1340.

Opening of the selector switches breaks the circuits described, rendering the stations inoperative, but permitting the interlock solenoids of the registers to become operative to indicate the last sale; and the registers will not be cleared or zeroized until one of the selector switches is operated, it being understood that the operation of a selector switch for dispensing operation for one side as the "other side" will zeroize only the registers 58 and 62, while the operation of one of the selector switches for dispensing operation on "this side" zeroizes only the registers 56 and 60.

Operation of any one of the stations, or any pair of the stations for dispensing on opposite sides of the island (Figure 1) will be in a manner similar to that already described. It is also to be noted that, for example, in the illustrations above given, when the distributors are zeroized, no current passes through them so that when station 74 is inoperative, the circuit through either station 72 or 76 from the interlock solenoids of stations 72 or 76 will not in any way cause operation of the type or daily price switches of station 74. This, of course, applies to all stations when any station is being operated.

*Registering mechanism (Figures 4 to 20 inclusive)*

Referring now more particularly to the registering mechanism illustrated in Figures 4 to 20 inclusive, said mechanism may be suitably encased, and consists essentially of the spaced end plates or supports 2000 and 2002, in which the shaft 2004 is journaled as at 2006 and 2008. The shaft 2004 is provided with the pulley 2010 non-rotatably mounted thereon and adapted to be driven through the belt 2012 by the motor pulley 2014, which in turn is driven by the reduction gearing 2016 from the register power drive motor 2018, the pulley 2014 being mounted on the shaft 2020. The shaft 2020 is also provided with the pulley 2022 adapted to drive the belt 2024, rotating the pulley 2026 mounted on the shaft 2028.

The shaft 2004 is provided with the units money numeral wheel 2030, the tens money numeral wheel 2032, and the hundreds money numeral wheel 2034, and is also provided with the fraction amount numeral wheel 2036, the units amount numeral wheel 2038, and the tens amount numeral wheel 2040. The money and amount banks of numeral wheels are of similar construction and are similarly mounted on the shaft 2004. It will therefore only be necessary to particularly describe the mounting of the fractions, units and tens amount numeral wheels, such as illustrated in Figure 8. The fractions numeral wheel 2036 is secured as at 2042 to the sleeve 2044 rotatably and frictionally mounted on the shaft 2004 spaced from the bearing 2006 by the bushing 2046. Spaced supporting plates 2048, 2050 and 2052 are provided adjacent the fractions, units and tens numeral wheels, supporting plate 2048 being disposed between the fraction numeral wheel and the end plate 2000; the supporting plates and the end plates 2000 and 2002 being maintained in assembled position by means of the tie rods 2054. The plate 2048 is preferably dished as at 2056 and is provided with calibrating solenoids 2058 mounted between said plate and the plate 2060.

In the embodiment shown there are ten calibrating solenoids 2058 for the money units numeral wheel and the gallons fraction wheel, and one interlock solenoid 2062 for each of said numeral wheels, said calibrating solenoids being mounted on a common circle, and the interlock solenoid preferably being mounted in a position spaced from said circle. The calibrating solenoids 2058 are each provided with a plunger 2064, the plungers being in the position illustrated in Figure 8 when deenergized, that is, the plungers will be in retracted position and will abut the stop plate 2066, being urged toward said plate by means of the spring 2068. When energized said plungers will move toward the left as viewed in Figure 8, against the spring.

The interlock solenoid 2062 (Figure 7A) is provided with the plunger 2070 which is projected when deenergized by means of the spring 2072. When the interlock solenoid is deenergized it is adapted to be received in suitable apertures, such as the apertures 2074 provided in the numeral wheel 2036, said apertures being suitably placed so that the numeral indicating the last dispensing operation will be locked in the window of the dial. In the embodiment shown, the number of said apertures is ten. When the register is in operation to indicate the amount (and cost) of gasoline dispensed, the interlock solenoid will be energized to retract the plunger 2070 out of engagement with the aperture 2074. The calibrating solenoids 2058 will be serially actuated by the distributor, as will more fully hereinafter appear, to project their respective plungers into a position to be engaged by the stop mechanism 2076 (Figures 9–11) provided on the numeral wheels 2036 and 2030.

The stop mechanism 2076 consists essentially of the fixed stop member 2078, said stop member being provided with the stop shoulder 2080 adapted to be engaged by the projected plunger of the actuated calibrating solenoid. The stop member 2078 is also provided with the bearing 2082 which forms a support for one end of the locking pawl or movable stop member 2084, said pawl being pivoted as at 2086 to the fixed stop member 2078, and being urged in a counterclockwise direction about the pivot, as viewed in Figure 9, by means of the spring 2088. The stop 2080 projects above the pawl 2084 (Figure 11) so that the counterclockwise movement of said pawl is limited by said stop. The clockwise movement of said pawl is limited by means of the upstanding pin 2090, and when the pawl is in engagement with the pin 2090, the end of said pawl is of sufficient width so that it is still in engagement with the support 2082. Adjacent the plunger engaging the edge of the stop 2080, the pawl 2084 is notched as at 2092 and so shaped that the sloping plunger engaging face 2094 is provided adapted, with the shoulder 2080, to embrace the projected plunger 2064 of the actuated solenoid.

By referring to Figures 9 and 10 it will be seen that when the stop 2080 of the numeral wheel 2036 (and 2030) is approaching the projected plunger 2064 of the energized calibrating solenoid, that is, rotating counterclockwise, said plunger will cause a clockwise movement of the locking pawl (Figure 10) to permit the stop 2080 to engage said projected plunger. When said plunger moves past the apex formed by face 2094, spring 2088 will cause a counterclockwise movement of the pawl 2084 to the position indicated in Figure 9, preventing the numeral wheel from bouncing back from its proper registration position. When said plunger is retracted by the solenoid being deenergized during the normal dispensing operation, said numeral wheel will be free to continue its movement (counterclockwise) so that the stop will move toward the next projected plunger of the next energized calibrating solenoid.

Numeral wheels 2038 and 2040 are mounted on the shaft 2004 by means of the hubs 2096 and 2098 similar to the hub 2044, but secured thereto as at 2100. The hubs 2044 and 2096, and 2096 and 2098 are spaced from each other by means of the cam supports 2102 and 2104, and the hub 2098 is positioned against longitudinal movement on the shaft 2004 by means of a similar cam support 2106. The cam supports 2102, 2104 and 2106 are provided with the similar cams (cam ratchets or ratchets) 2108, 2110 and 2112, it being understood that the money, hundreds, tens and units wheels are provided with similar cams (and spacing members) which are similarly designated, cam 2112 of the money hundreds wheel being particularly shown in Figure 6. The numeral wheels 2030, 2032, 2034, 2036, 2038 and 2040 are provided with the pawls 2114, 2116 and 2118 similar to the pawl 2118 shown on numeral wheel 2034 (Figure 6), the pawls being pivoted to the respective wheels as at 2120, preferably acting through the center line of the shaft 2004, and being urged toward the cam ratchets by means of the springs 2122. The number of faces of the cam is chosen as has already been described with respect to the cam 170, and the action between the cams 2108, 2110 and 2112 in their respective pawls is the same as that between the cam 170 and the pawl 172, thus insuring proper release between the stops (Figures 9—11) and the projected solenoid plungers.

As has already been pointed out, a similar mounting is provided for both money and gallons numeral wheels, and the stop and solenoid control mechanism for the fraction gallons numeral wheel 2036 is the same as that of the units money numeral wheel 2030. In order to effect calibration transfer of the gallons units numeral wheel (and the money tens numeral wheel), the support 2124 is secured as at 2126 to the support 2050. The numeral wheel 2038 is provided with the fixed plate index member 2128 mounted thereon as at 2100, said fixed plate index member being provided with a relatively movable plate index member 2130 of smaller diameter than that of the fixed index member and loosely mounted thereon as at 2132 (Figures 15 and 19) for a slight relative movement (Figures 19 and 20). The movable plate index members are urged in a counterclockwise direction as viewed in Figure 19 by means of the springs 2134 secured to the fixed index member as at 2136, and to the movable index member as at 2138, the spring urging said index members toward the position such as shown in Figure 20. Each of said members is provided with spaced notches 2140 corresponding to the number of numerals on the numeral wheel, in the present instance ten, it being seen that the zero notches 2142 are deeper than the other notches, for the purpose to be later described.

The plate 2124 is provided with the arresting and zeroizing solenoid 2144, said solenoid being provided with the plunger 2146 normally urged outwardly by means of the spring 2148 to pass through the plates 2150 and 2124. The indexing carriage 2152 is slidably mounted as at 2154 and 2156 on the plate 2124, said carriage being urged toward the left as viewed in Figure 15 by means of the spring 2158. The carriage is connected as at 2160 to the plunger 2162 of the indexing solenoid 2164 fixed to plate 2124, the plunger of said solenoid being adapted to move toward the right as viewed in Figure 15 when said solenoid is energized. The indexing carriage is provided with the upwardly extending shoulder or lug 2166 adapted to slide between the plates 2150 and 2124, but it will be seen that when the plunger 2146 is extended, the indexing carriage 2152 can only move part way of its travel, that is, until the shoulder 2166 abuts the plunger 2146.

The plate 2124 is apertured or slotted as at 2168, the length of the aperture being determined by the travel of the indexing carriage, and said indexing carriage is provided with the indexing pawl 2170 pivoted to said carriage as at 2172, said pawl extending through said aperture and being urged in a clockwise direction as viewed in Figure 18 by means of the spring 2174. The pawl 2170 has a shoulder 2173 which extends into the path of the fixed and movable plate index members and is adapted to be received in the notches formed therein, said shoulder being limited in its clockwise direction as viewed in Figure 18 by means of shoulder 2175 engaging the indexing carriage. It will be understood that the gallons, units and tens numeral wheels, and the money, tens and hundreds numeral wheels are provided with similar index members, carriage members and pawl members, as well as the zeroizing solenoids and the index solenoids, as has been described with respect to the numeral wheel 2038.

The units gallons numeral wheel 2038, and the tens money numeral wheels 2032 are adapted to be controlled from the distributor to be later described, and the indexing solenoid magnets 2164 of said numeral wheels are impulsed in accordance with the operation of the distributors. The hubs of the units gallons numeral wheel and the tens money numeral wheel are provided with the switch member 2176 adapted to form a connection between the switch fingers or brushes 2178 and 2180 of the transfer switch 2182, the member 2176 being so disposed that when the numeral wheels 2038 and 2032 reach zero position, the transfer switch is closed to energize the solenoids 2164 of the tens gallons numeral wheel 2040, and the hundreds money numeral wheel 2034. As far as the arresting solenoids 2144 for the numeral wheels 2038, 2040, 2032 and 2034 are concerned, said solenoids are adapted to be energized through the zero switch associated with the distributor and reset mechanism to be later described.

When the distributor and register have been zeroized this zero switch is closed, energizing the solenoids 2144 to retract the plungers thereof. Simultaneously, with the closing of the zero switch or slightly thereafter, the distributor in reaching zero position causes the solenoids 2164 of the numeral wheels 2038 and 2032 to be energized, moving the index carriage 2152 toward the right, as viewed in Figure 15 for its entire travel. Previous to the zeroizing operation, the pawl 2170 will have been moved to the position as shown in Figure 20, or a similar position, that is, it will be in engagement with the lug of the fixed plate index member, but the notch defining lug of the movable plate index member will have moved beneath said pawl but spaced slightly therefrom. Therefore, when the indexing carriage is moved toward the right, as viewed in Figure 15, for its complete travel, the pawl 2170 will be moved to a position to ride on the movable plate index member until it reaches the zero notch which is deeper than the other notches, at which time the pawl will enter said deeper notches to arrest the numeral wheels at the zero position and will avoid the other notches when they move past said pawl. At the time numeral wheels 2038 and 2032 reach their zero position, the transfer switch 2182 is closed to cause a similar operation to be effected at the numeral wheels 2040 and 2034, permitting said numeral wheels to be zeroized.

Upon operation of the distributor as in a dispensing operation, the solenoids 2164 and 2144 are deenergized after a predetermined movement of the distributor heads, permitting the spring 2158 to move the indexing carriage 2152 toward the left to the full line position as shown in Figure 15. In this position the pawl will move outwardly out of engagement with the notch of the movable plate member, but will still be in engagement in the notch in the fixed plate index member, thereby arresting the wheel at that position, but the wheel will be conditioned for its next counting movement. When the distributors have made a complete revolution and again reached their starting position, solenoids 2164 of numeral wheels 2038 and 2032 will be energized, causing the carriage 2152 to move toward the right as viewed in Figure 15. Inasmuch, however, as the zero switch will not have been energized (assuming the numeral wheel 2038, for example, is not passing to zero), the carriage will only move a portion of its distance, that is, until the lug 2166 engages the plunger 2146 of the zeroizing solenoid 2144. This movement, however, will cause the pawl 2170 to ride on the movable plate index member 2130 and rock on its pivot 2172 to disengage the pawl from the fixed index member to permit rotation of the numeral wheel. Thus the numeral wheels 2038 and 2032 will be rotated by the shaft 2004 until the pawl enters the next notch, again arresting movement of the numeral wheels 2038 and 2032, causing the pawl 2170 to be received in the notches of both the fixed and movable plate index members, such as shown in Figure 19.

Further operation of the distributor causes the solenoids 2164 of said numeral wheels to be deenergized to permit the spring 2158 to move the carriage 2152 toward the left as viewed in Figure 15, moving the pawl outwardly past the periphery of the movable plate index member, but engaging the rear lug forming the next notch of the fixed plate index member whereby the cycle of operation may be repeated. When the numeral wheels 2038 and 2032 have made a complete revolution, the transfer switch 2182 (Figure 17) will be energized, causing operation of the numeral wheels 2040 and 2034 in a manner similar to that described with respect to numeral wheels 2038 and 2032. It will thus be seen that while register interlock solenoids similar to the solenoids 2062 are provided on the lowest denominational numeral wheels, the transfer mechanism shown and described in the numeral wheels 2038, 2040, 2032 and 2034 provide their own interlock.

The power driven shaft 2028 is provided with the type indicating means 2184 rotatably but frictionally mounted on the shaft 2028 in a manner as has already been described. In the embodiment shown, the type indicating means is adapted to carry three legends, such as "Third Grade," "Regular," and "Ethyl." Therefore, three solenoids 2186 are provided disposed on the same periphery and adapted to be selectively energized, whereby the type indicating means 2184 indicates the type of gasoline dispensed. As before, the solenoids each are provided with a plunger 2188 adapted to be projected when the solenoids are energized to engage the stop 2190 (Figure 14) provided on the type indicating means 2184. The type indicating means is also provided with the spaced apertures 2192 adapted to receive the plunger 2194 of the locking solenoid 2196, the solenoid being of the same construction as the solenoid 2062 and being provided with a spring 2198 adapted to urge the plunger outwardly. Solenoids 2186 are also provided with a spring 2199 similar to spring 2068 for urging the plungers 2188 toward inoperative positions. When the solenoids 2186 are energized, the locking solenoid 2196 is deenergized, and conversely.

The daily price numeral wheels 2200, 2202 and 2204 are also rotatably but frictionally mounted on the shaft 2028, said numeral wheels indicating the price at which the associated variator is set, that is, the prevailing price of the commodity, the numeral wheel 2200 indicating fractions, the numeral wheel 2202 indicating units, and the numeral wheel 2204 indicating tens. In the embodiment shown, this indication is in United States currency. The numeral wheel 2200 is provided with the backing plate 2206 adapted to form a stop for the plungers 2208 of the calibrating solenoids 2210 suitably supported in the numeral wheel in a manner similar to solenoids 2058. Support 2048 is extended below numeral wheel 2036 and is provided with a locking solenoid 2212 of construction similar to the solenoid 2062 where the plunger 2214 is urged outwardly by means of a spring 2216 (Figure 7). The solenoids 2210 are disposed on the same periphery and the plungers 2208 thereof are projected when the solenoids are energized, whereby the projected plunger will be engaged by a stop 2218 (Figure 12) to arrest the numeral wheel 2200 at the proper position. When the calibrating solenoids 2210 are deenergized, the plunger 2214 of the locking solenoid 2212 is adapted to be received in an aperture 2220 corresponding to the selected price. It will be seen that the number of calibrating solenoids corresponds to the number of numerals disposed on the numeral wheel. Numeral wheels 2202 and 2204 are also provided with stop plates 2224 and 2226 for the plungers of the calibrating solenoids 2228 and 2230 of said numeral wheels, it being understood that they are also provided with locking solenoids similar to the solenoid 2212, and are similarly operated.

*Distributor mechanism (Figures 21 to 39 inclusive)*

In order to effect operation of the registering mechanism, distributor mechanism is provided, indicated generally at 2232 in Figure 22. As before pointed out, liquid to be measured is supplied to a meter, the meter being provided with a meter shaft rotating in proportion to the amount of liquid passing through said meter. In the embodiment shown, rotation of said meter shaft 2234 (Figure 21), drives the variator indicated generally at 2236, and more particularly shown and described in said Patent 2,323,374. The meter shaft drives the gear train, shown as the 42 tooth gears 2238, which train drives the 21 tooth gear 2240, the 21 tooth driving gear 2242 rotating with gear 2240, and in turn driving the 28 tooth clutch gear 2244 for the gallons distributor. The variator drives the 25 tooth gear 2245, which drives the 42 tooth gears 2246, which gears in turn drive the 20 tooth gear 2248. The 20 tooth driving gear 2250 turns with gear 2248 and drives the 25 tooth clutch gear 2252 of the money distributor. The distributor is disposed within a housing 2254 disposed on the support 2256.

The gears 2244 and 2252 are similar and are provided with the inwardly projecting lugs 2258 (Figure 28), receivable in the slot 2260 (Figure 27) provided in the clutch sleeve 2262, the slot 2260 being provided with an offset portion 2264 into which the lugs may be rotated and locked therein by means of the screw 2266. An expansion spring 2268 is disposed between the gear 2252 and the male clutch member 2270, urging said member upwardly into clutched position with the female clutch member 2272 provided in the rotatable distributor head 2274. The clutch sleeve 2262 is closed by means of the closure cap 2276 disposed flush with the top of the rotatable distributor member, and the closure member 2278 is provided with the spaced arcuate apertures 2278, through which the spaced clutch legs 2280 of the male clutch member 2270 project.

Vertically extending distributor head mounting and reset shaft 2282 extends through the member 2276 and into a socket 2284 provided in the base 2256 (Figure 27). In order to prevent rotation of the shaft 2282, but to permit vertical longitudinal movement thereof, the shaft is provided with oppositely extending lugs 2286 receivable in slots 2288 disposed in the base 2256 adjacent the sockets 2284. The shaft is secured against longitudinal movement with respect to the gear 2252, and the clutch sleeve 2262, by means of the C-washers 2290 and 2292, provided in suitable slots formed in the shaft 2282.

The clutch and distributor head assembly is urged downwardly by means of the spring 2294 (Figure 27) seated against the C-washer 2292 and extending upwardly into a recess 2296 (Figure 22) provided in the setback heads 2298 and 2300. The setback heads 2298 and 2300 are provided with recesses 2302 and 2304 (Figures 37—39), the recesses being so constructed and arranged as to accommodate the wind-up pawls 2306 and 2308 pivoted to the setback heads as at 2310 and 2312, being urged in a clockwise direction as viewed in Figures 37 and 39 by suitable springs 2313. The pawls are provided with limiting shoulders 2314 and 2316 and are also provided with the downwardly projecting operating lugs 2318 and 2320, said lugs 2318 and 2320 being adapted to be operated by means of the upwardly extending lugs 2322 and 2324 (Figures 25, 26, 22, 23) of the pawls 2325 pivoted to the movable distributor heads 2274 and 2326 as at 2328 and 2330. The pawls 2325 are resiliently urged in a counterclockwise direction as viewed in Figures 23 and 25 by means of the springs 2332 and 2334, the lugs being limited in their travel by means of the shoulders 2336, 2338, 2340 and 2342, formed in the recesses 2344 and 2346, in which the lug members are mounted in the distributor heads.

When the distributor heads are in zero position and the reset mechanism is unwound and unlocked, such as shown in Figure 39, rotation of the distributor head, as during a dispensing operation, in a clockwise direction as viewed in Figure 23, will cause the lugs 2322 and 2324 to engage the downwardly projecting lugs 2318 and 2320. Continued rotation of the distributor head thus causes rotation of the setback heads 2298 and 2300. The setback heads are provided with the gears 2348 and 2350 meshing with the quadrants 2352 and 2354 pivoted as at 2356 and 2358 to the supporting plate 2360, disposed in the housing 2254 and through which the shafts 2282 extend, said plate 2360 being supported in said housing by means of the spaced supports 2361. The quadrants 2352 and 2354 are urged in a clockwise direction, as viewed in Figures 37 and 39 by means of the springs 2362 and 2364 (Figures 37 and 39). The quadrants are provided with the depending lugs 2366 and 2368 adapted to engage the shoulders 2370 and 2372 of the pawls 2306 and 2308 (Figures 37 and 39) when the quadrants have been moved to fully wound and locked position, that is, through 90° from the position illustrated in Figure 39 to the position shown in Figure 37, at which time the said pawls 2306 and 2308 are moved slightly about their pivots to disengage lugs 2318 and 2320 from lugs 2322 and 2324 of pawls 2325, whereupon the distributor heads may continue rotation, but no further movement of the setback heads will be effected.

The setback heads 2298 and 2300 are provided with the upwardly projecting cams 2374 and 2376, and the quadrants are provided with the latching members 2378 and 2380 pivoted thereto as at 2382 and 2384, the portion of the latching member away from the setback heads being urged downwardly, as viewed in Figures 37 and 38, by means of the springs 2386 and 2388. When the setback heads are being rotated to a position where the lugs 2318, 2322 and 2320, 2324 are in released position (i. e. toward wound and locked position), the portions of the latch members toward the setback heads will ride up on the cams 2374 and 2376 and engage behind the shoulders formed by said cams, locking the setback heads in wound and locked position as shown in Figure 37. The setback heads are provided with plungers 2390 and 2392 normally in lowered, inoperative position such as shown in Figures 22 and 38.

In order then to reset the distributor heads to zero it is necessary to raise the shafts 2282, causing the clutch lugs 2280 to engage on the bearing surfaces 2393 and 2395 (Figure 38) of the setback heads, depressing said lugs to cause declutching of the male and female clutch members 2270 and 2272, thereby releasing the distributor heads 2274 and 2326 from the clutch sleeves 2262. Raising said distributor heads causes the closure members 2276 to engage the pins 2390 and 2392, raising said pins and causing the pins to engage and rock the latch members 2378 and 2380 about their pivots, releasing engagement between the clutch members and the shoulders formed by the cams 2374 and 2376 on the setback heads. Release of said latch members permits the springs 2362 and 2364 to return the quadrants 2352 and 2354 to the position illustrated in Figure 39, that is, in unwound and unlocked position. Rotation of said quadrants to said position, which corresponds to the zero positions of the distributor heads, causes the lugs 2318 and 2320 to engage the lugs 2322 and 2324 to rotate the distributor heads to their zero positions.

The distributor heads 2274 and 2326 are provided with the zero stop pawls 2394 and 2396, said pawls being pivoted as at 2398 and 2400 in a recess provided in the distributor head, being urged outwardly by means of the springs 2402 and 2404, the pawls extending outwardly away from the direction of registering rotation. The fixed stops 2406 and 2408 are disposed adjacent to distributor heads, and as the distributor heads are rotated in a counter-clockwise direction during resetting the pawls 2394 and 2396 will engage the stops 2406 and 2408 at the zero position of the distributor heads to arrest movement of said distributor heads. As the distributor heads rotate in a clockwise direction during registering operation, the pawls of course will merely pass the stops.

In order to reset the distributor heads, the shafts 2282 must be raised as has already been explained. Said shafts extend upwardly through the plate 2360 and through the fixed and rotatable cam members 2410, 2412, and 2414, 2416, the rotatable cam members being provided with the levers 2418 and 2420 (Figure 36) connected by means of the link 2422 pivoted thereto as at 2424 and 2426. The lever 2420 is sloted as at 2428 for reception of the pin 2430 provided on the crank 2432, said crank being fixed to the reset shaft 2434 provided with the operating reset handle 2436. Rotation of the reset handle 2436 causes rotation of the shaft 2434 in a counter-clockwise direction, rotating the levers 2418 and 2420 in a clockwise direction, causing the rotatable cams 2412 and 2416 to move upwardly. The shafts 2282 are secured as by the C-washers 2438 against longitudinal movement with respect to the rotatable cams so that upward movement of the rotatable cams will raise the shafts 2282 to cause resetting as has been described.

By referring to Figure 36 it will be seen that the slot 2428 has an entrance portion 2440 and a lever operating portion 2441. The crank 2432 is adapted to be moved from the dotted line position to the full line position prior to the actuation of the levers 2420 and 2418. Movement from the dotted line position to the full line position, as shown in Figure 36, will open the motor switch of the pump motor through connections not shown. The additional movement of the pin 2430 into the lever operating slot 2441 will open the switch 2442 of the lead line into the apparatus and will operate the reset mechanism to return the distributors to zero position, but no resetting operation of the registers will occur as the lead line switch is open, and no gasoline can be dispensed as the motor switch is open. Movement of the lever 2440 causes the lead switch 2442 to open, inasmuch as said switch is connected to the lever 2420 through the crank 2444, crank 2446 and the pin and slot connection 2448.

The switch 2442 is provided with terminals for connection to the daily price setting switches, the registering mechanism interlocks, and the general lead for the system, all as will be more particularly described. The type switch 2450 is also conveniently mounted on the plate 2360 in the distributor head casing, and is provided with the inlet lead shoe 2452 electrically connected to the general shoe 2454 of the switch 2442, the contacts 2456 being adapted to be connected to the conductors leading to the type indicating means. The type is selected by the rotatable switch member 2458 which is connected to the shaft 2460 (Figure 22) extending through the housing 2254 and being provided with the index 2462, showing the setting of said switch, movement of the index causing rotation of the shaft 2460 to selectively rotate the rotatable switch member 2458.

When the distributor heads are reset to zero, as has already been described, they are lifted and the set-back heads return the distributor heads to their zero positions. In the embodiment shown, particularly in Figures 23 and 24, when the money distributor head reaches its zero position, the pawl 2394 engages the stop 2406, and when it engages said stop, said pawl 2394 is in the full line position, as shown in Figure 24. After the distributor head has been zeroized and the cams 2412 and 2416 have been released, the distributor head will move downwardly and the pawl 2394 will move to the dotted line position as shown in Figure 24. In moving to the dotted line position, the pawl 2394 engages the pivoted switch actuating member 2464, causing downward movement of said member about its pivot 2466 to close the switch members of the zeroizing switch 2468, said zeroizing switch being for the units and tens of gallons, and tens and hundreds of the money part of the register.

As has already been pointed out, the distributors for both the money and gallons are similar so it will only be necessary to describe one distributor such as that comprising the rotatable distributor head 2274 (Figures 25–26), and the substantially relative stationary contact face member 2470 (Figures 29–35), a relative stationary distributor head 2472 similar to the member 2470 being provided for cooperation with the rotatable head 2326. The distributor head such as shown at 2274 (Figure 25) is preferably of insulating material and includes the spaced slots 2474 and 2476, the slots being disposed on opposite sides of the shaft 2282. Switch fingers 2478 are pivotally and electrically connected as at 2480 within the slots 2476 and are electrically connected to the conductor 2482 disposed in a suitable recess in the head. The switch fingers 2478 are for operation of the money lights 2484 (Figures 4 and 40), and gallon lights 2486 (Figures 4, 7 and 40), said lights being adapted to be serially lighted downwardly when the units and fractions numeral wheels 2030 and 2036 are approaching zero, and just prior to the time that said units and fractions numeral wheels move to the succeeding numeral, the bottom light being preferably of a different color than the lights immediately above to show the movement at which the numeral wheels move from one numeral to the other.

Slots 2474 are provided with switch fingers 2488, 2490, 2492 and 2494. All of the switch fingers are preferably of the shape indicated by 2498 in Figure 26, being pivoted to the head and electrically connected as at 2496, the pivot 2496 being connected to conductor 2482. The switch fingers are provided with the limiting shoulder 2498 and are urged downwardly by means of the spring 2500. Finger 2488 is adapted to control operation of the money tens and the gallons units indexing solenoid magnet. Switch member 2490 is adapted to control the fractions of gallons and the units of money contact shoes. Switch member 2492 is adapted to control the distributor correcting magnets to be later described, and is provided with the shoulder 2502 overlying and contacting the switch member 2490, whereby upward movement of the switch member 2490 moves the switch member 2492 upwardly. Switch member 2494 is adapted to engage the lead ring of the distributor contact face member for circuiting all of the said switch members.

The distributor contact face members 2470 and 2472 are preferably of insulating material and are mounted on base members 2504 and 2506 (Figures 22 and 23), said base members being mounted on pedestals 2508 provided on the base 2256, the base members being mounted on said pedestals as at 2510 (Figure 23) through a loose connection, permitting a slight rotative movement of the distributor face members about the shafts 2282, for a correcting or compensating operation in a direction opposite to that of rotation of the distributor heads while calibrating. In order to effect this correcting movement, solenoids 2512 and 2514 are mounted on the base 2256, the plungers of said solenoids being pivoted as at 2516 and 2518 to the base members 2504 and 2506. Springs 2520 and 2522 are interposed between the solenoids and the adjacent base members for returning the base members to initial position after the solenoids have been deenergized. The base members are pivotally connected as at 2524 and 2526 to the link 2528 whereby the base members are caused to be moved together by operation of either solenoid 2512 or 2514, and by springs 2520 and 2522.

Each contact face member (Figures 29–35) is provided with a lead ring 2530, the lead ring being provided with downwardly extending positioning lugs 2532, one of said lugs being adapted to be connected to a suitable source of energy.

Spaced from said lead ring, the distributor correcting magnet ring 2534 is provided, likewise having the depending positioning lugs 2536, one of said lugs being adapted to be connected to a conductor which in turn is connected to the distributor correcting magnet and to the lowermost light 2760 or 2902, which is operated at the intance of transfer. The ring 2534 is provided with the equally spaced contact points 2538, ten in number. The face member is provided with the fractions of gallons or units of money contact shoes 2540, each of said shoes being provided with the raised contact point 2542 and each having positioning lugs 2544, the contact shoes 2540 being ten in number and connected to suitable conductors, which in turn are connected to the respective calibrating solenoids of the fractional gallons numeral wheels or the units of money numeral wheels.

The money tens or gallons unit indexing ring 2546 is provided, having positioning lugs 2548 extending through the distributor face, one of said lugs being connected to a suitable conductor, which in turn is connected to the indexing solenoid magnet of the money tens or gallons units numeral wheel. The ring 2546 as shown extends for substantially 180°, and the contact member 2488 travels on the insulated face member for the remainder of the travel. The reason that the ring 2546 extends for 180° is to provide ample period of contact between the contact (switch) member 2488 and the member 2546 to thereby insure energization of the indexing solenoid magnets of the money tens and gallon units numeral wheels so that said magnets will complete their operation particularly at high speeds. In this connection the ring 2546 preferably is used in the distributor for the operation of the second numeral wheels rather than a brush similar to brush 2178 (Fig. 15), and commutator arrangement being used on the lowest wheel for operation of the second wheel because of the danger at high speed of failure of the brush and commutator to adequately operate (though a wider commutator might be used), whereas the brush and commutator can be used on the second wheel for operation of the highest wheel because of the relatively lower speeds of operation of the second and highest wheels. It will be seen that the entrance to said ring 2546 is preferably radially slightly past the entrance to the zero shoe 2556 so that when the indexing magnets are energized when the money units and the gallon fractions reach zero after a revolution the money tens and gallon units control means are energized through correcting movement of the distributor faces. This pocitioning of the contact ring with respect to the zero shoe insures that the zero shoe will be contacted at least as early as the contact ring regardless of switch arm wear or manufacturing inaccuracies, thus insuring correct registering operation. The contact member 2488 travels up the incline 2550 before dropping into engagement with the ring 2546, and similarly, in leaving the ring 2546 it travels up an inclined portion 2522 of said ring, sharply leaving said inclined portion for the inclined portion 2554 of the insulated face member. By providing said inclines 2550 and 2554 the contact member 2488 is kept in engagement with the ring 2546 at the entrance and is prevented from re-engaging said ring at the end 2552 thereof having once left said ring. For example, if the contact member 2488 has entered into engagement with the ring at the entrance thereof and then one of the distributor correcting magnets is operated, the raised portion adjacent the incline 2550 would prevent the contact member leaving the ring (toward the right as viewed in Figure 31), and then remaking contact with a consequent (erroneous) registration of the money tens or gallons units numeral wheels. The same is true at the end 2552.

The zero shoe for the fractions of gallons and units of money shoes 2540 is shown at 2556, and the entrance to said zero shoe is so disposed that the switch member 2480 will contact the shoe 2556 just prior to the time that the contact member 2488 falls from the incline 2550 to engage the ring 2546. The contact points 2538 of the ring 2534 are so disposed that they project slightly further in a peripheral direction than the points 2542 so as to insure that they are engaged by the contact member 2492. The ring 2534 is at a lower level than the shoes 2540, and the contact points 2538 are lower than the contact points 2542, so that when the contact member 2490 falls to the succeeding contact shoe and the contact member 2490 has passed from the contact point 2542, contact member 2492 will be inoperative, that is, it will be held out of engagement with the ring 2534 until the contact member 2490 has passed over the succeeding contact point 2542, permitting the contact member 2492 to engage the succeeding contact point 2538.

When the contact member 2492 engages the points 2538, one of the correcting magnets 2512 or 2514 is energized to move the distributor base 2504 (or 2506) and the distributor face member 2470 (or 2472) the slight distance as determined at 2510, insuring that all the contact members in the movable distributor heads will engage their respective rings and shoes. Inasmuch as the contact base members are connected by the link 2528, each face member will be corrected so that the proper registrations of both money and gallons appear in the dial openings, that is, the contact members of both the money and gallon distributors are in their exact positions to correctly record the amount and value of the gasoline dispensed. It is of course understood that the calibrating movement of the distributor head and the corresponding registration is mechanically correct, but due to manufacturing tolerances, a condition may arise where all of the contact members 2488, 2490, 2492 and 2494 of the money distributor head have made contact with their proper shoes, but the corresponding contact members of the gallons distributing head may be short of falling to their proper positions by an infinitesimal amount. Operation of one of the correcting magnets, therefore, to move the distributor face members in a direction opposite to the direction of rotation of the distributor heads will cause said contact members of the gallon distributing head to fall to their proper positions to cause proper registration of the amount numeral wheels. Of course, a similar correction is made from gallons to money. It will be seen that at the zero transfer the contact member 2488 will be assured of falling from the inclined portion 2550 to the contact ring 2546 by this action of the correcting magnets. Of course when the contact member 2490 has dropped from the contact point 2542 and the contact member 2492 has dropped from the contact point 2538, the correcting magnets are deenergized to permit the springs 2520 and 2522 to return the contact face members to initial position.

The distributor face members are provided with contact rings 2557, 2558, 2560 and 2562 disposed on the bottom side thereof and being provided with the upstanding contact lugs 2563, 2564, 2566 and 2568. It will be seen that these lugs are so disposed that the contact lugs 2564 are engaged by the proper contact member 2478 first, and said contact ring is connected to the top light of the gallons group 2486 or the money group 2484. The contact member 2568 is the second member to be engaged by the proper contact member 2478 to light the second light of either of the groups 2486 or 2484. The contact member 2563 is the third member to be engaged by the proper contact member 2478, and finally, the contact member 2566 is engaged by the proper contact member 2478. All of the contact members 2478 are disengaged from the contact members 2563, 2564, 2566 and 2568 at the same time.

*Wiring diagram (Figure 40) of registering mechanism (Figures 4–20)*

Referring first of all more particularly to the wiring diagram for the register shown in Figure 40, the money numeral wheels are indicated generally at 2030, 2032 and 2034. The amount or gallons numeral wheels are indicated generally at 2036, 2038 and 2040. The lights for the money side of the register are indicated generally at 2484, while the gallons lights are indicated generally at 2486. The daily price indicating numeral wheels are indicated generally at 2200, 2202 and 2204, while the type indicating means is indicated generally at 2184, all as previously described. For the sake of clearness, the numerals of the general indications are framed.

As before described, the money units numeral wheel 2030 is provided with indexing solenoids and an interlock solenoid. Said numeral wheel is provided with the zero indexing solenoid 2600, and the one-to-nine solenoids 2602, 2604, 2606, 2608, 2610, 2612, 2614, 2616 and 2618, and the interlock solenoid 2620, said solenoids being respectively grounded as through the conductors 2622. The hot sides of said indexing solenoids are respectively connected to terminals 2624, 2626, 2628, 2630, 2632, 2634, 2636, 2638, 2640 and 2642, and the hot side of the interlock solenoid is connected to the terminal 2644, said terminals being conveniently disposed on the terminal board 2646. The said solenoids are connected to said terminals through conductors 2648, 2650, 2652, 2654, 2656, 2658, 2660, 2662, 2664, 2668 and 2670 respectively.

The money tens numeral wheel 2032 is provided with the indexing solenoid 2674 grounded through the conductor 2676, the hot side of said solenoid being connected through the conductor 2678 to the terminal 2680 provided on the terminal board 2682. The terminal board is also provided with two brush terminals 2684 and 2686, the terminal 2684 being connected through the conductor 2688 to the brush 2690 corresponding to the brush 2180 shown in Figure 17. The terminal board 2682 is also provided with the zeroizing or set-back terminal 2692, connected through conductors 2693 and 2694 to one side of the set-back magnet 2696, corresponding to the magnet 2144, shown in Figure 16, the other side of said set-back magnet being grounded as at 2698. The brush 2700, corresponding to the brush 2178, shown in Figure 17, is connected through the conductor 2702 to brush terminal 2686, and said terminal 2686 is connected through the conductor 2704 to the terminal 2706 provided on the terminal board 2708 for the hundreds numeral wheel 2034.

The conductor 2704 is connected through the conductor 2710 to the indexing solenoid 2712, corresponding to the solenoid 2164 (Figure 15) for the hundreds numeral wheel, said solenoid being grounded as at 2714. The terminal board 2708 is provided with a zeroizing or set-back terminal 2716 connected through the conductor 2718 to the set-back magnet 2720 corresponding to the set-back magnet 2144 (Figure 15), the other side of said set-back magnet being grounded as at 2722.

The conductor 2694 and the terminal 2716 are connected to the conductor 2724 through conductors 2726 and 2728 respectively. The money light terminal board 2730 is provided with the contacts 2732, 2734, 2736, 2738 and 2740, said contacts being respectively connected through conductors 2742, 2744, 2746, 2748 and 2750, to the lights 2752, 2754, 2756, 2758 and 2760 of the light group 2484, each of said lights being grounded as at 2762.

The fractions gallon numeral wheel 2036 is provided with the zero calibrating solenoid 2764, and the one-to-nine solenoids 2766, 2768, 2770, 2772, 2774, 2776, 2778, 2780 and 2782, and the interlock solenoid 2786, said solenoids being grounded as at 2788. The solenoids are connected to the terminals 2790, 2792, 2794, 2796, 2800, 2802, 2804, 2806, 2808 and 2810, provided on the terminal board 2812 through conductors 2814, 2816, 2818, 2820, 2822, 2824, 2826, 2828, 2830, 2832 and 2834.

The interlock terminal 2810 is electrically connected through the conductors 2836 and 2842 to the brush terminal 2838 of the units gallons terminal board 2840. The terminal board 2840 is provided with the index terminal 2844 connected through conductor 2846 to one side of the indexing magnet 2848, corresponding to the indexing magnet 2164 (Figure 15) for the gallons units registering wheel, the other side of said magnet being grounded as at 2850. The brush terminal 2838 is connected through the conductor 2852 to the brush 2854 corresponding to brush 2180 (Figure 17). The zeroizing or set-back terminal 2856 is connected through conductor 2858 to the conductor 2860, said conductor being connected to the conductor 2724 and to one side of the set-back magnet 2862 corresponding to set-back magnet 2144 (Figure 15) for the units gallons numeral wheel, the other side of said magnet being grounded as at 2864. The brush corresponding to brush 2178 (Figure 17) for the units gallons numeral wheel, is connected through the conductor 2868 to the conductor 2870, conductors 2868 and 2870 being connected to the brush terminal 2872 of the board 2840, the conductor 2870 being connected to the index terminal 2874 provided on the terminal board 2876 for the ten gallons numeral wheel.

The conductor 2870 is connected to the conductor 2878 which is also connected to terminal 2874, said conductor 2878 being connected to one side of the index solenoid 2880 corresponding to the index solenoid 2164 (Figure 15) for the tens gallon numeral wheel, the other side of said solenoid being grounded as at 2882. The terminal board 2876 is provided with the set-back terminal 2884 connected through the conductor 2886 to the set-back magnet 2888, corresponding to the set-back magnet 2144 (Figure 15) and said magnet is grounded as at 2890. The set-back terminal 2884 is connected through the conductor 2892 to the conductor 2724, as is conductor 2860.

The light group 2486 for the gallons side of the register includes lights 2894, 2896, 2898, 2900 and 2902, grounded as at 2904, said lights being electrically connected through the conductors 2906, 2908, 2910, 2912 and 2914, to terminals 2916, 2918, 2920, 2922 and 2924 of the gallons light terminal board 2926.

The daily price numeral wheel 2200 is provided with the zero solenoid 2928 and the one-to-nine solenoids 2930, 2932, 2934, 2936, 2938, 2940, 2942, 2944 and 2946, and the interlock solenoid 2948, said solenoids being grounded as at 2950. The solenoids are respectively connected through conductors 2952, 2954, 2956, 2958, 2960, 2962, 2964, 2966, 2968, 2970, and 2972 to the terminals 2974, 2976, 2978, 2980, 2982, 2984, 2986, 2988, 2990, 2992, and 2994 of the terminal board 2996. The terminal 2994 is connected through the conductor 2998 to the conductor 2836.

The daily price units numeral wheel 2202 is provided with the zero solenoid 3000 and the one-to-nine solenoids 3002, 3004, 3006, 3008, 3010, 3012, 3014, 3016, and 3018, and the interlock solenoid 3020, said solenoids being grounded as at 3022. The solenoids are respectively connected through the conductors 3024, 3026, 3028, 3030, 3032, 3034, 3036, 3038, 3040, 3044 and 3046 to corresponding terminals 3048, 3050, 3052, 3054, 3056, 3058, 3060, 3062, 3064, 3066 and 3068, provided on the terminal board 3070, the interlock terminal 3068 being connected through the conductor 3072 to the conductor 2998.

The tens daily price wheel 2204 is provided with the zero solenoid 3074, and the one-to-four solenoids (10¢, 20¢, 30¢ and 40¢) 3076, 3078, 3080 and 3082, and the interlock solenoid 3084, said solenoids being grounded as at 3086. The solenoids are respectively connected through conductors 3088, 3090, 3092, 3094, 3096 and 3098 to the respective terminals 3100, 3102, 3104, 3106, 3108 and 3110 of the terminal board 3112, and the interlock terminal 3110 is connected through the conductor 3114 to the conductor 2998 which in turn is connected to conductor 2836.

The type indicating means 2184 is provided with the Ethyl solenoid 3116, the Regular solenoid 3118, and the Third Grade solenoid 3120, and is also provided with the interlock solenoid 3122, said solenoids being grounded as at 3124. The solenoids are respectively connected through conductors 3126, 3128, 3130 and 3132 to the respective terminals 3134, 3136, 3138 and 3140 of the terminal board 3142, the interlock terminal 3140 being connected through the conductor 3144 to the conductor 2836.

*Wiring diagram (Figures 41A—B—C) for distributors and switches for registering mechnism (Figures 4-20 and 40)*

Referring now to the wiring diagram illustrated in Figures 41A—B—C, certain of the parts have two designations, one of which is framed. This framed designation refers to parts either similarly designated as in Figure 36, or parts with which the unframed designations cooperate, as in Figure 40. A suitable source of current supply is connected to the conductor 3146, in the embodiment shown being through the transformer 3145, and said conductor is connected to the movable switch element 3148 of the lead switch for the entire system represented generally at 2442 (Figure 36). Said switch is provided with the contact shoe 3149 for supplying current to said movable switch element and is provided with the contact shoes 3150, 3152, 3154, 3156 and 3158 adapted to receive current from the corresponding contacts on the contact ring 3148. The contact shoe 3150 is connected through the conductor 3160 to the conductor 3162, said conductor being electrically connected to the lead ring 3164, corresponding to the lead ring 2530 (Figure 29) of the gallons distributor face member. Rotation of the distributor head of the gallons distributor, such head being shown in detail at 2274 (Figure 25) causes connection between the lead ring and the elements of the distributor face. The ring 3166 represents the contacts for the third light 2898 (Figure 40) and corresponds to the contact members 2563 shown in Figure 29. Ring 3168 represents the correcting magnet ring, corresponding to ring 2534, shown in Figure 29. Ring 3170 represents the contact shoes for the first light 2894 (Figure 40) and corresponds to the shoes 2564 shown in Figure 29. The shoes 3172 correspond to the shoes 2548 for the fractions of gallons. Ring 3174 corresponds to the shoes 2566 and is for operating the fourth light 2900 (Figure 40). Ring 3176 corresponds to the ring 2546 (Figure 29) and is for the units gallons indexing solenoid magnets 2848 (Figure 40). Ring 3178 corresponds to the shoes 2568 in Figure 29, and is for operation of the second light 2896 (Figure 40).

Ring 3166 (Figure 41A) is connected through the conductor 3180 to the terminal 3182 (Figure 41C) adapted to be connected to terminal 2920 (Figure 40), numeral 2920 being shown framed in Figure 41C. Ring 3168 (Figure 41A) is connected through the conductor 3184 to the terminal 3186 (Figure 41C) adapted to be connected to the terminal 2924 (Figure 40), and said ring is connected through the conductor 3188 to the correcting magnet 2512 (Figures 23 and 41A) and said correcting magnet 2512 is grounded through the conductor 3190 (Figure 41B). Ring 3170 is connected through the conductor 3242 to the terminal 3194 adapted to be connected to the terminal 2916 (Figure 40).

The zero shoe of the fractions shoes 3172 is connected through the conductor 3196 to the terminal 3198 which in turn is adapted to be electrically connected to the terminal 2790 of the terminal board 2812 (Figure 40). The number one (or $\frac{1}{10}$) shoe is connected through the conductor 3200 to the terminal 3202, which is adapted to be connected to the terminal 2792 of the terminal board 2812 (Figure 40). The number 2 (or $\frac{2}{10}$) shoe is adapted to be connected through the conductor 3204 to the terminal 3206, which is adapted to be connected to the terminal 2794 on the terminal board 2812 (Figure 40).

The number 3 (or $\frac{3}{10}$) shoe is connected through the conductor 3208 to the terminal 3210 which in turn is adapted to be connected to the terminal 2796 on the terminal board 2812 (Figure 40). The number 4 (or $\frac{4}{10}$) shoe is connected through the conductor 3212 to the terminal 3214 which is adapted to be connected to the terminal 2798 on the terminal board 2812 (Figure 40). The number 5 (or $\frac{5}{10}$) shoe is connected through the conductor 3216 to the terminal 3218 which in turn is adapted to be connected to the terminal 2800 on the terminal board 2812 (Figure 40).

The number 6 (or $\frac{6}{10}$) shoe is connected through the conductor 3220 to the terminal 3222 which is adapted to be connected to the terminal 2802 on the terminal board 2812 (Figure 40). The number 7 (or $\frac{7}{10}$) shoe is connected through the conductor 3224 to the terminal 3226 which is adapted to be connected to the terminal 2804 on the terminal board 2812 (Figure 40). The number 8 (or 8/16) shoe is adapted to be connected through the conductor 3228 to the terminal 3230 which is adapted to be connected to the terminal 2806 on the terminal board 2812 (Figure 40).

The number 9 (or 9/16) shoe is adapted to be connected through the conductor 3232 to the terminal 3234 which is adapted to be connected to the terminal 2808 on the terminal board 2812 (Figure 40).

The fourth light ring 3174 is connected through the conductor 3236 to the terminal 3238 which is adapted to be connected to the terminal 2922 on the terminal board 2926 (Figure 40).

The gallons units ring 3176 is connected through the conductor 3240 to the gallons units terminal 3242 which is adapted to be connected to the terminal 2844 on the terminal board 2840 (Figure 40).

The second light ring 3178 is connected through the conductor 3244 to the terminal 3246 which is adapted to be connected to the terminal 2918 on the terminal board 2926 (Figure 40).

The conductor 3162 of lead ring 3164 is connected to the conductor 3248 which is electrically connected to the lead ring 3250 of the money distributor face member 3252, similar to that shown at 2530 (Figure 29). The face member 3252 is also provided with the third light ring 3254 connected through the conductor 3256 to the terminal 3258 which in turn is adapted to be connected to the terminal 2736 on the terminal board 2730 (Figure 40). The distributor face member is provided with the distributor correcting magnet ring 3260 connected through the conductor 3262 to the terminal 3264, which is adapted to be connected to the terminal 2740 on the terminal board 2730 (Figure 40). The ring 3260 is also connected through the conductor 3266 to the correcting magnet 2514 (Figures 23 and 40), said magnet being grounded through the conductor 3190.

The number one light ring 3268 is connected through the conductor 3270 to the terminal 3276 adapted to be connected to the terminal 2732 on the terminal board 2730 (Figure 40). The shoes 3278 corresponding to the shoes 2540 (Figure 29) are for the units of money calibrating solenoids, and the zero shoe is connected through the conductor 3280 to the terminal 3282 adapted to be connected to the terminal 2624 on the terminal board 2646 (Figure 40).

The number one shoe is connected through the conductor 3284 to the terminal 3286, which is adapted to be connected to the terminal 2626 on the terminal board 2646 (Figure 40). The number two shoe is connected through the conductor 3288 to the terminal 3290 which is adapted to be connected to the terminal 2628 on the terminal board 2646 (Figure 40). The number three shoe is connected through the conductor 3292 to the terminal 3294, which is adapted to be connected to the terminal 2630 on the terminal board 2646 (Figure 40).

The number four shoe is connected through the conductor 3296 to the terminal 3298 which is adapted to be connected to the terminal 2632 on the terminal board 2646 (Figure 40). The number five shoe is connected through the conductor 3300 to the terminal 3302 which is adapted to be connected to the terminal 2634 on the terminal board 2646 (Figure 40). The number six shoe is connected through the conductor 3304 to the terminal 3306 which is adapted to be connected to the terminal 2636 on the terminal board 2646 (Figure 40).

The number seven shoe is connected through the conductor 3308 to the terminal 3310 which is adapted to be connected to the terminal 2638 on the terminal board 2646 (Figure 40). The number eight shoe is connected through the conductor 3312 to the terminal 3314 which is adapted to be connected to the terminal 2640 on the terminal board 2646 (Figure 40). The number nine shoe is connected through the conductor 3316 to the terminal 3318 which is adapted to be connected to the terminal 2642 on the terminal board 2646 (Figure 40).

The number four light ring 3320 is connected through the conductor 3322 to the terminal 3324, which is adapted to be connected to the terminal 2738 on the terminal board 2730 (Figure 40). The money tens ring 3326 is connected through the conductor 3328 to the terminal 3330, which is adapted to be connected to the terminal 2680 on the terminal board 2682 (Figure 40). The second light ring 3332 is connected through the conductor 3334 to the second light terminal 3336 adapted to be connected to the terminal 2734 on the terminal board 2730 (Figure 40).

The fractions shoe of the switch 2442 is connected through the conductor 3338 to the movable contactor ring 3340 of the fractions daily price switch. The fractions daily price switch is provided with ten contact shoes adapted to be selectively energized from the contact ring 3340, the switch being shown in zero position. The zero shoe is connected through the conductor 3342 to the terminal 3344 adapted to be connected to the terminal 2974 on the terminal board 2996 (Figure 40).

The number one shoe is connected through the conductor 3346 to the terminal 3348 adapted to be connected to the terminal 2976 on the terminal board 2996 (Figure 40). The number two shoe is adapted to be connected through the conductor 3350 to the terminal 3352, which is adapted to be connected to the terminal 2978 on the terminal board 2996 (Figure 40). The number three shoe is connected through the conductor 3354 to the terminal 3356 which is adapted to be connected to the terminal 2980 on the terminal board 2996 (Figure 40).

The number four shoe is connected through the conductor 3358 to the terminal 3360, which is adapted to be connected to the terminal 2982 on the terminal board 2996 (Figure 40). The number five shoe is connected through the conductor 3362 to the terminal 3364 adapted to be connected to the terminal 2984 on the terminal board 2996 (Figure 40). The number six shoe is connected through the conductor 3366 to the terminal 3368, said terminal being adapted to be connected to the terminal 2986 on the terminal board 2996 (Figure 40).

The number seven shoe is connected through the conductor 3370 to the terminal 3372 adapted to be connected to the terminal 2988 on the terminal board 2996 (Figure 40). The number eight shoe is connected through the conductor 3372 to the terminal 3374 adapted to be connected to the terminal 2990 on the terminal board 2996 (Figure 40). The number nine shoe is connected through the conductor 3376 to the terminal 3378 adapted to be connected to the terminal 2992 on the terminal board 2996 (Figure 40).

Current from the units shoe 3156 of the switch 2442 is connected through the conductor 3380 to the movable switch contact ring 3382 of the units daily price switch. Said switch is provided with ten contact shoes. The zero contact shoe is connected through the conductor 3384 to the terminal 3386 adapted to be connected to the terminal 3048 on the terminal board 3070 (Figure 40).

The number one shoe is adapted to be connected through the conductor 3388 to the terminal 3390 adapted to be connected to the terminal 3050 on the terminal board 3070 (Figure 40). The number two shoe is connected through the conductor 3392 to the terminal 3394 which is adapted to be connected to the terminal 3052 on the terminal board 3070 (Figure 40). The number three shoe is connected through the conductor 3396 to the terminal 3398 adapted to be connected to the terminal 3054 on the terminal board 3070 (Figure 40).

The number four shoe is connected through the conductor 3400 to the terminal 3402 adapted to be connected to the terminal 3056 on the terminal board 3070 (Figure 40). The number five shoe is connected through the conductor 3404 to the terminal 3406 which is adapted to be connected to the terminal 3058 on the terminal board 3070 (Figure 40). The number six shoe is connected through the conductor 3408 to the terminal 3410 which is adapted to be connected to the terminal 3060 on the terminal board 3070 (Figure 40).

The number seven shoe is connected through the conductor 3412 to the terminal 3414 adapted to be connected to the terminal 3062 on the terminal board 3070 (Figure 40). The number eight shoe is connected through the conductor 3416 to the terminal 3418 adapted to be connected to the terminal 3064 on the terminal board 3070 (Figure 40). The number nine shoe is connected through the conductor 3420 to the terminal 3422 adapted to be connected to the terminal 3066 on the terminal board 3070 (Figure 40).

Current is supplied from the tens shoe 3154 of the switch 2442 through the conductor 3424 to the movable conductor ring 3426 of the tens daily price switch. The tens daily price switch is provided with five contact shoes. The zero contact shoe is connected through the conductor 3428 to the terminal 3430 adapted to be connected to the terminal 3100 on the terminal board 3112 (Figure 40).

The tens shoe is connected through the conductor 3432 to the terminal 3434 adapted to be connected to the terminal 3102 on the terminal board 3112 (Figure 40). The twenty contact shoe is connected through the conductor 3436 to the terminal 3438 adapted to be connected to the terminal 3104 on the terminal board 3112 (Figure 40). The thirty contact shoe is connected through the conductor 3440 to the terminal 3442 adapted to be connected to the terminal 3106 on the terminal board 3112 (Figure 40). The forty contact shoe is connected through the conductor 3444 to the terminal 3446 adapted to be connected to the terminal 3108 on the terminal board 3112 (Figure 40).

The conductor 3152 is connected to the movable contact ring 3448 of the type switch 2450. The type switch is provided with three contact shoes as for Third Grade, Regular and Ethyl gasoline. The Third Grade shoe is connected through the conductor 3450 to the terminal 3452 adapted to be connected to the terminal 3138 on the terminal board 3142 (Figure 40). The Regular shoe is connected through the conductor 3454 to the terminal 3456 adapted to be connected to the terminal 3136 on the terminal board 3142 (Figure 40). The Ethyl shoe is connected through the conductor 3458 to the terminal 3460 adapted to be connected to the terminal 3134 on the terminal board 3142 (Figure 40).

The interlock shoe 3152 (of switch 2442) is connected through the conductor 3462 to the terminal 3464 adapted to be connected to the terminal 2810 on the terminal board 2812, terminal 2838 on the terminal board 2840, terminal 2644 on the terminal board 2646, terminal 2684 on the terminal board 2682, terminal 2994 on the terminal board 2996, terminal 3068 on the terminal board 3070, terminal 3110 on the terminal board 3112, and terminal 3140 on the terminal board 3142 (Figure 40).

Conductor 3462 is also connected through the conductor 3466 to the power drive motor 2018 (Figures 5 and 41C), said motor being grounded as at 3468 (Figure 41C). Conductor 3248 is connected to the conductor 3470 in which is disposed the zero switch 2468 (Figures 24 and 41B), said conductor being connected to the terminal 3472 adapted to be connected to the terminal 2856 on the terminal board 2840, terminal 2884 on the terminal board 2876, terminal 2692 on the terminal board 2682, and to terminal 2716 on the terminal board 2708 (Figure 40).

*Multiple station connections using three stations with two registering mechanisms (Figure 42)*

While the system has been described which illustrates the connection between one distributing mechanism and one registering mechanism, it of course will be understood that a similar system to that shown in Figures 1 and 2 is contemplated.

In the arrangement of the island it is preferred that the three dispensing stations similar to those illustrated at 72, 74 and 76 are provided adjacent the center of the island. At each end of said island there is provided a registering mechanism. Thus, when a purchaser drives into the station he can remain in his vehicle and readily see one registering mechanism, while the attendant filling the tank of the vehicle with gasoline can watch the operation by means of the other registering mechanism. These registering mechanisms are of course operated simultaneously from the same distributor, that is, the distributor of the station in use. Each of the stations of course is provided with separate distributors, each having reset mechanism comprising the handle 2438 which operates the arm 2432 (as shown in Figures 22 and 36), said arm in turn operating the associated mechanism in a manner already described.

In order to prevent an attempt to dispense from other stations than that in use, each station is provided with a solenoid 3474 disposed adjacent the lever 2432 and provided with a normally retracted plunger 3476. The interlock terminal 3464 (Figures 41C and 42) of each station is connected through conductors 3478 to the respective solenoids of that station, each of said solenoids being grounded as through conductors 3480.

Assuming that the station at the left in Figure 42 dispenses Ethyl gasoline, that the center station dispenses Regular gasoline, and the station at the right of said figure dispenses Third Grade gasoline, the solenoids between stations are connected by means of conductors 3482 and 3484. It will thus be seen that movement of the lever 2432 (of the Ethyl station for example) to the dotted line position as shown in Figures 36 and 42 not only closes switch 2442 (and the motor switch), but it also disposes the lever 2432 of the selected station in way of the adjacent plunger 3476, while the levers 2432 of the other two stations are in the full line positions as shown in Figure 42. Current will then be supplied from the interlock terminal 3464 of the selected station to energize the three solenoids 3474. The plunger 3476 of the solenoid of the selected station will be inoperative as the lever 2432 of that station will be in the path of said plunger. However, the plungers of the other solenoids will be projected to prevent movement of the levers 2432 of those stations from the full line position whereby the motor switches of those stations cannot be closed.

In order to circuit the three stations to the two registering mechanisms it is only necessary to connect the corresponding terminals such as shown in Figure 40 of the three stations disposing said connections in parallel.

*Operation of stations (Figures 4 to 42)*

Let it be assumed that the gasoline station is arranged substantially as illustrated in Figures 1 and 2, that is, there are three stations for dispensing gasoline arranged adjacent the center of the island, and a registering mechanism is disposed at each end of the island. The stations being in inoperative condition, the distributors thereof will be in zero position, that is, the stops 2394 and 2396 of the distributor heads will be in engagement with the fixed stops 2406 and 2408, in which position the cranks 2432 will be in a position where the pins 2430 have entered the slot 2441, and the lead switches 2442 will be open. In this position the zeroizing switch 2468 will also be open as the stop 2394 will be in the full line position, as shown in Figure 24.

Each of the stations will be properly set for the different types of gasoline, that is, the station to the left as viewed in Figure 42 wi l be set for Ethyl and will have the type switch 2450 thereof so set that said switch will engage the Ethyl contact shoe whereby current will be supplied to the conductor 3458 when the switch is energized. The switch 2450 of the middle station will be so disposed that the conductor 3454 will be energized whereby it is set for Regular gasoline, while the switch of the station at the right of Figure 42 will be so disposed that the conductor 3450 will be energized when current is supplied to said switch whereby it is set for Third Grade gasoline.

Should it then be desired to dispense gasoline from the station at the left as viewed in Figure 42, that is, the Ethyl station, the nozzle is removed from its support and the switch operating and zeroizing means of said station is moved so that the pin 2430 of the crank 2432 is moved toward the left as viewed in Figure 36. Movement of the pin 2430 along the slot 2441 to the slot 2440 will move the switch 2442 to closed position, and additional movement of the crank 2432 to the dotted line position as shown in Figures 36 and 42 will dispose the lever 2432 in the path of movement of the plunger 3476 of the adjacent solenoid 3474, and will close the motor switch of the Ethyl station.

Current will then be supplied to the pump motor of that station and through the conductor 3146 (Figures 41A—B—C) to the switch 2442; and from said switch will be supplied to the distributor rings 3250 and 3164 through the conductors 3248 and 3162. Current will also be supplied to the interlock terminal 3464 through the conductor 3462 to energize the solenoids 3474 of the Regular and Third Grade stations, causing the plungers thereof to move to a position to prevent movement of the levers 2432 of said stations.

Movement of the lever 2432 to the full line position shown in Figure 36 will also move the cams 2416 and 2412 to the position shown in Figure 22, which will permit the springs 2294 to move the distributor heads 2274 and 2326 to their lowermost positons, in which positions the stop 2394 will move to the dotted line position as shown in Figure 24, closing the zeroizing switch 2468, whereupon current will be supplied (Figures 41A—B—C) through conductor 3162, conductor 3248, conductor 3470, zero switch 2468 to the setback terminal 3472, and through said terminal 3472 to terminal 2856 of board 2840 (Figure 40). Therefore, current will be supplied through conductors 2858 and 2860 to the set-back solenoid 2862 of the units gallons numeral wheel 2038 and thence to the ground through the conductor 2864. Current will also be supplied through conductor 2724 and conductors 2892 and 2886 to the setback solenoid 2888 of the tens gallon numeral wheel 2040, and thence to the ground through the conductor 2890. Current will likewise be supplied through conductors 2724, 2726 and 2694 to the set-back solenoid 2696 of the tens money numeral wheel 2032 and thence to the ground through conductor 2698; and current will be supplied to the set-back solenoid 2720 of the hundreds money numeral wheel 2034 through conductors 2724, 2726 and 2718 and thence to the ground through conductor 2722.

Energizing the zero solenoids will cause the plungers 2146 (Figure 16) to be retracted. In the meantime, current will have been supplied to the power drive motor 2018 of the register through conductor 3462, causing rotation of said motor which frictionally urges rotation of the numeral wheels of the register. Current will be supplied through the rings 3164 and 3250 through the respective switch members 2494 and 2490 (Figure 25) to the zero shoes of the distributor face member such as shown at 2540 (Figures 29 and 33), passing from said shoes through conductors 3196 and 3280 to the terminals 3198 and 3282, respectively. Terminals 3198 and 3282 are respectively connected to the terminals 2790 and 2624 (Figure 40), and current thus passes through conductors 2814 and 2648 to the zero solenoids 2764 and 2666 of the gallons fraction numeral wheel 2036, and the units money numeral wheel 2030. Said solenoids being energized will cause the plungers thereof to engage the stops 2080 of said fractions gallons numeral wheel, and the money units numeral wheel, such as shown in Figure 9.

Downward movement of the distributing head to its zero position causes current to be supplied from the ring 3164 and ring 3250 through the switch members 2494 and 2490 to the rings 3168 and 3260, which corresponds to the correcting magnet rings 2534 (Figures 29 and 34), thus causing operation of the correcting magnets 2512 and 2514 (Figures 23 and 40) to move the distributor face members in a counterclockwise direction as viewed in Figure 23, thus insuring that the switch members 2494, 2492, 2490 and 2488 are in their proper zero position. This is very important, as otherwise said switch members may not have been quite in their zero position, that is, they may have been just ready to transfer as above described, in which case the numeral wheels of the register could not assume their zero position.

At the zero position current will be supplied from the rings 3164 and 3250 through the switch members 2494 and 2488 to the rings 3176 and 3326, whereupon current will be supplied through the conductors 3240 and 3328 to the terminals 3242 and 3330. As said terminals are electrically connected to the terminals 2844 and 2680, current will then be supplied through the conductors 2846 and 2678 to the indexing magnets 2848 and 2674 of the gallons units and money tens numeral wheels 2038 and 2032 respectively. Said magnets being energized will cause the plungers 2162 (Figure 15) of the said magnets to move toward the right as viewed in Figure 15, causing the carriage 2152 to move the indexing pawl 2170 (Figure 18) toward the right fully into the slot 2168 as the plunger 2146 of the zeroizing magnets has been retracted. Rotation of the numeral wheels 2038 and 2032 will then permit the indexing pawls to enter the zero notches 2142 (Figure 19) of the respective numeral wheels in a manner already described, arresting said numeral wheels at their respective zero positions.

As before pointed out, the zero switch 2468 is closed prior to the time the contact is made between the switch members of the distributor head and the respective rings of the distributor face members, so that the zero magnets 2862 and 2696 are energized to retract their respective plungers prior to the time that the indexing magnets 2848 and 2674 are energized. This full movement of the carriages 2152 is insured so that indexing pawls 2170 will be in a position to enter the zero notches 2142.

When the units gallons numeral wheel 2038 and the tens money numeral wheel 2032 reach their zero position, the contacts 2176 on the hubs of said wheels engage the respective brushes 2854 and 2866, and 2690 and 2700. Current will then be supplied from the interlock terminal 2810 and conductor 2836 to terminals 2838 and 2684 through conductors 2842 and 2685 respectively, and will be supplied to the brushes 2854 and 2690 through conductors 2852 and 2688, respectively. The brushes at the respective numeral wheels being connected through the members 2176, current will pass through brushes 2866 and 2700, and through conductors 2868 and 2702 respectively, to the terminals 2872 and 2686 respectively, and will pass through conductors 2870 and 2704 to terminals 2874 and 2706, respectively. Thus the solenoids 2880 and 2712 are energized through conductors 2878 and 2710, respectively. Inasmuch as solenoids 2888 and 2720 have already been energized to retract the plungers 2146 (Figures 15 and 16), the solenoids 2880 and 2712 of the numeral wheels 2040 and 2034 will be permitted to move the carriages 2152 of the respective numeral wheels for their full travel toward the right as viewed in Figure 15, whereby the indexing pawls 2170 will be moved to their full distance in the slot 2168 so that they will engage in the zero notches 2142 of the wheels 2040 and 2034, respectively.

When current is supplied to the interlock terminal 3464 (Figure 41C), it of course energizes the interlock magnets 2786 and 2620 of the fractions gallons numeral wheel and the units money numeral wheel. Energization of the interlock magnet 2786 is through conductor 2834, and energization of magnet 2620 is through conductors 2836, 2646 and 2670, thus retracting the plungers of said interlock solenoids to permit free rotation of the fractions gallon numeral wheel 2033 and the units money numeral wheel 2030, whereby they can be zeroized as above pointed out. Thus the registering mechanism will be fully zeroized and will be in condition for registering operation.

It is of course understood that the variators of the respective dispensing stations have been properly set, all as particularly shown and described in said Patent 2,323,374, and thus the fractions, units and tens switches 3340, 3382 and 3426 will have been properly set, and it is also of course understood that the type switches 2450 of the stations will have been set for the types of gasoline at said stations. Current will be supplied from the switch 2442 to the fractions, units and tens switches through conductors 3338, 3380 and 3424. Current will thus pass from said fractions, units and tens switches through the selected conductors thereof to the corresponding terminals. For example, if the fractions, units and tens switches are set for 12 1/10 ¢, current will pass through conductors 3354, 3392 and 3432 to terminals 3356, 3394 and 3434 and in turn to terminals 2980, 3052 and 3102 (Figure 40). Inasmuch as current has been supplied through the interlock terminal 2810 to the conductor 2836, it will be supplied to the interlock terminals 2994, 3066 and 3110 through conductors 2998, 3072 and 3114, energizing the interlock solenoids 2946, 3020 and 3084, permitting the numeral wheels 2200, 2202 and 2204 to spin freely until current is supplied through terminals 2980, 3052 and 3102. Current thus supplied will energize solenoids 2934, 3004 and 3076 through conductors 2958, 3028 and 3090, thus arresting movement of said numeral wheels, thereby indicating 12 1/10 ¢.

Type switches 2450 having been set and current supplied thereto through conductor 3162, current will be supplied through the selected conductors 3450, 3454 and 3458 to the terminals 3452, 3456 and 3460, and in turn to terminals 3138, 3136 and 3134. Again current will be supplied from the conductor 2836 to conductor 3144, causing the interlock solenoid 3122 to be energized through terminal 3140 and conductor 3132, permitting the type numeral wheels to spin freely until solenoids 3120, 3118 and 3116 are energized through terminals 3138, 3136 and 3134, and conductors 3130, 3128 and 3126, to arrest movement thereof showing that Third Grade gasoline is being dispensed from the station to the left, Regular gasoline is being dispensed from the center station, and Ethyl gasoline is being dispensed from the station to the right.

Operation of the nozzle of the selected station in the usual way causes gasoline to be dispensed, operating the variator through the usual meter. Operation of the meter will rotate the distributor heads 2274 and 2326 (Figure 22), and said heads will rotate in proportion to the amount of liquid passing through the meter as controlled by the variator and meter. Rotation of the heads 2274 and 2326 causes movement of the switch members over the rings and contacts of the distributor face members as shown in Figure 29, and thus causing operation of the register.

Specifically, as gasoline is dispensed operation of the meter causes rotation of the gallon distributor head 2326, moving the switch members of the head (Figure 25) over the rings and shoes of the distributor face (Figure 29). In order to cause the fractions of a gallon numeral wheel 2036 to move between the 1/10 gallon positions, the switch member 2490 must move between adjacent shoes 2540, causing current to be supplied from the ring 3164 through the switch members 2494 and 2490 to the number one shoe 2556, passing through the conductor 3200 to the terminal 3202 (Figure 41C) connected to the terminal 2792 (Figure 40). Current has already been supplied through the interlock terminals 3464 and 2810 and conductor 3462 to the conductor 2834, energizing the interlock solenoid 2788 of the fractions gallon numeral wheel 2036 to permit rotation of the fractions numeral wheel 2036. Thus current passes to the 1/16 solenoid 2766 through conductor 2816, energizing said solenoid to arrest movement of the numeral wheel 2036 at the 1/16 indication. The switch member 2490 moving progressively over the shoes 2540 successively supplies current to the contacts 2792, 2794, 2796, 2798, 2800, 2802, 2804, 2806, 2808 and 2790, successively energizing the solenoids 2766, 2768, 2770, 2772, 2774, 2776, 2778, 2780, 2782 and 2764, causing said solenoids to move their respective plungers outwardly to engage the stop 2078 in a manner already described whereby the numeral wheel 2036 is arrested at the proper calibration.

Similarly, the rotation of the money distributor head 2274 causes the switch member 2490 thereof to move successively over the shoes 2540 of the money distributor face member 3252, successively supplying current to terminals 3286, 3290, 3294, 3298, 3302, 3306, 3310, 3314, 3318 and 3282 through conductors 3284, 3288, 3292, 3296, 3300, 3304, 3308, 3312, 3316 and 3280. These terminals being connected to terminals 2626, 2628, 2630, 2632, 2634, 2636, 2638, 2640, 2642 and 2624, current will be supplied successively to solenoids 2602, 2604, 2606, 2608, 2610, 2612, 2614, 2616, 2618 and 2600 of numeral wheel 2030, causing said wheel to be properly arrested by engagement of the plungers of the respective calibrating solenoids with the stop 2078. As before, the interlock solenoid 2620 has been released as the interlock terminal 2644 has been supplied with current through conductors 2836 and 2645, thus energizing the interlock solenoid 2620 through conductor 2670 to permit rotation of said numeral wheel under control of the calibrating solenoids.

As before described, the contact members 2538 (Figures 29, 30 and 34) of the distributor correcting magnet ring 2534 are disposed below the contact members 2542 of the shoes 2540. As the switch members 2490, therefore, drop from the contact members 2542 of one shoe to the succeeding shoe, the switch member 2492 will be permitted to engage the contact member 2538 of ring 2534. Referring to said ring in Figure 41A, it will be seen that the corresponding ring is indicated at 3168 and 3260 so that when the switch member 2492 engages the contact member 2538, the correcting solenoid 2512 (or 2514) will be energized, causing movement of the distributor face members. The movement of the distributor face members in a counterclockwise direction as viewed in Figure 23 will thus insure that the switch members of the movable distributor head engage their proper contacts on the distributor face member, whereby there will always be a proper registration (as well as calibration). Thus this rearward movement of the distributor face members insures that the distributor switch members will always be in contact with their proper shoes or rings at the moment of calibration and transfer at zero.

Similarly, the correcting magnet 2514 for the gallons distributor is operated from the money distributor, that is, when the switch member 2492 of the rotatable money distributor head 2274 engages the contact member 2538 of the money distributor face member, the magnet 2514 will be energized through switch members 2494 and 2492, and contact rings 3258 and 3260.

The transfer rings 3176 and 3326 (Figure 41A) for the gallons units numeral wheel 2038 and the money tens numeral wheel 2032 extend for substantially 180°, the entrance of the rings as shown in Figure 31 being adapted to be reached by the contact member 2488 just after the contact member 2490 has reached the zero shoe 2540. Inasmuch as the contact face members move in unison by virtue of connection of the link 2528 (Figure 22), the contact members 2488 will always engage the ring 2546 by virtue of the operation of the correcting solenoids 2512 and 2514 at the moment of transfer of the fractions of a gallon numeral wheel and units of money numeral wheel from nine to zero.

When the contact member 2488 engages the contact ring 2546, that is, when said contact members engage the rings 3176 and 3326 (Figure 41A), current is supplied to the conductors 3240 and 3328, which are provided with the terminals 3242 and 3330. Said terminals engage terminals 2844 and 2680, respectively (Figure 40) energizing the indexing magnets 2848 and 2674 through conductors 2846 and 2678, causing the carriages 2152 to move toward the right as viewed in Figure 15. Inasmuch as the solenoids 2862 and 2696 (corresponding to solenoid 2146 (Figures 15 and 16)) have not been energized, the carriages 2152 will only move until the upstanding lug 2166 (Figure 15) engages the plungers of said solenoids 2146 (Figure 15), i. e., of solenoids 2862 and 2696 (Figure 40). This will cause the numeral wheels 2038 and 2032 to be operated through the fixed and movable index members 2128 and 2130 (Figures 19 and 20) in a manner already described.

When the numeral wheels 2038 and 2032 reach their zero position, current is supplied through conductors 2836, 2842, 2852, brushes 2854 and 2866, through the member 2176 (Figure 17), conductors 2868, 2870, 2878 to the tens gallons indexing magnet 2880. Current will similarly be supplied through conductors 2685, 2688, brushes 2690, 2700, through the member 2176 (Figure 17), and conductors 2702, 2704 and 2710 to energize the hundreds money indexing magnet 2712. Thus the tens gallon numeral and hundreds money numeral wheel will be actuated through the fixed and movable index plate members 2128 and 2130 (Figures 19 and 20) in the manner already described.

The lights 2894, 2896, 2898, 2900, 2902 for the gallons side of the register, and lights 2752, 2754, 2756, 2758 and 2760 for the money side of the register, respectively, are adapted to be operated serially between every change of calibration of the fractions numeral wheel 2036 and the units money numeral wheel 2030. The shoe 2564 for ring 2558 (Figure 29) corresponds to ring 3170 (Figure 41A), and the similar shoe for ring 3268 (Figure 41A) is adapted to be engaged by the contact member 2478A prior to the engagement of the contact members 2478B—C—D with the other shoes 2568, 2563 and 2566, and current is supplied from the rings 3164 and 3250 through the conductor 2432 (Figure 25). Thus current will be supplied from said rings 3170 and 3268 through conductors 3242 and 3270 to terminals 3194 and 3276, whereby current is supplied to terminals 2916 and 2732, and from said terminals to lights 2894 and 2752 through conductors 2906 and 2742.

The contact member 2478B (Figure 25) next contacts shoe 2568 (Figure 29) to supply current through rings 3178 and 3332 (Figure 41A), whereby current is supplied through conductors 3244 and 3334 to terminals 3246 and 3336, supplying current to terminals 2918 and 2734, whereby current is supplied to the second lights 2896 and 2754 through conductors 2908 and 2744.

Contact member 2478C (Figure 25) next contacts shoe 2563 (Figure 29) of rings 3166 and 3254 (Figure 41A) whereby current is supplied through conductors 3180 and 3256 to terminals 3182 and 3258. Current is thus supplied through terminals 2920 and 2736 to the third lights 2898 and 2756 through conductors 2910 and 2746.

Contact member 2478D (Figure 25) next engages shoe 2566 (Figure 29) of rings 3174 and 3320 (Figure 41A), thus supplying current through conductors 3236 and 3322 to terminals 3238 and 3324. Current thus supplied to said terminals is supplied to terminals 2922 and 2738 and thence to lights 2900 and 2758 through conductors 2912 and 2748.

At the time the switch member 2492 (Figure 25) engages the contact 2538 (Figure 29) of the correcting magnet rings 3168 and 3260 (Figure 41A), current is supplied not only to said correcting magnets 2512 and 2514 but also through conductors 3184 and 3262 to terminals 3186 and 3264. Current thus supplied will also be supplied to terminals 2924 and 2740 to energize the last (red preferably) lights 2902 and 2760 through conductors 2914 and 2750.

As the correcting magnets operate to move the distributor face members they cause the switch members 2478 to be disengaged from the shoes 2564, 2568, 2563 and 2566, and the lights, of course, are deenergized when the switch member 2490 (Figure 25) holds the switch member 2492 from contacting the distributing ring 2534 (Figure 34), that is, at the time the switch member 2492 is disengaged from the contact 2538. The cycle of operation of the lights then continues for each fraction of the gallons wheel and each unit of the money wheel.

During dispensing operation the reset mechanism is conditioned for resetting of the distributor heads, as has already been described, and the stop 2394 has moved away from the zero switch 2468 (Figures 24 and 41A) to permit said switch to open.

After dispensing operation has been effected, the motor switch is opened. At the time the pump motor switch is moved to open position, the switch 2442 is also moved to open position by means of the crank 2432 (Figure 36), the pin 2430 moving completely within the slot 2441, thus rendering the clock motors 2018 inoperative, it being seen that the switch 2442 is open after the pump motor switch is open. Movement of the crank 2432 within the slot 2441 causes the cams 2416 and 2412 (Figure 22) to be raised through contact with cams 2414 and 2410, lifting the shafts 2282 (Figure 27), permitting the distributor reset mechanism (Figures 37, 38 and 39) to return the distributor heads to zero in the manner already described.

At the time the switches were moved to open position, the interlock solenoids 2786, 2620, 2948, 3026, 3084 and 3122 (Figure 40) have been deenergized to cause the numeral wheels of the register to be locked in the position of last registration, where they will remain until a new dispensing operation is effected. The system is thus conditioned to reset the registering mechanisms to zero, and the cycle may again take place as has already been described.

As before described, when the distributor mechanisms are being operated, the power storing means shown in Figures 37, 38 and 39 are moved to power storing position. Operation of the reset mechanism as movement of the handle 2436 (Figure 22) in the manner already described will separate the heads from the face members, that is move them to inoperative position, and will permit operation of the power storing means to move the heads to zero position. Upon movement of the handle 2436 in a counterclockwise direction as viewed in Figure 36, the levers 3570 and 3572 will likewise be moved in a counterclockwise direction, whereupon when the handle is moved in a clockwise direction, the levers 3570 and 3572 will be moved correspondingly, causing the plungers 3582 to engage pins 3558 and 3560 to move the pawls 3546 and 3548 in a counterclockwise direction sufficiently to permit the ratchets to be moved to a position where they can be engaged by said pins.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

What I claim is:

1. In combination, a plurality of dispensing stations disposed in a group adjacent each other, registering mechanisms disposed in pairs and spaced from said stations, a pair of said registering mechanisms being on each side of said group, selective means for operatively connecting a registering mechanism of each pair whereby spaced registering mechanisms are operatively connected to cause registering mechanism on "this side" to operate simultaneously and to cause registering mechanisms on the "other side" to operate simultaneously, and operative means at each station to selectively connect a station to the registering mechanisms on "this side" or the "other side."

2. In combination, a plurality of dispensing stations disposed in a group adjacent each other, registering mechanisms disposed in pairs and spaced from said stations, a pair of said registering mechanisms being on each side of said group, selective means for operatively connecting a registering mechanism of each pair whereby spaced registering mechanisms are operatively connected to cause registering mechanisms on "this side" to operate simultaneously and to cause registering mechanisms on the "other side" to operate simultaneously, operative means at each station to selectively connect a station to the registering mechanisms on "this side" or the "other side," and means at each station for preventing operation of that station if any other station is conditioned for operation.

3. In liquid dispensing apparatus, the combination of a pump the suction side of which is adapted to be connected to a source of liquid supply, a motor for operating said pump, a switch for controlling said motor, a meter the inlet side of which is connected to the outlet side of said pump, dispensing means connected to the outlet side of said meter, said meter having a meter shaft rotated in proportion to the liquid passing through said meter, an adjustably settable variator operated by said meter shaft, a distributor operated by said variator, and registering means adapted to continuously register and operated in accordance with the operation of said distributor.

4. In liquid dispensing apparatus, the combination of a pump the suction side of which is adapted to be connected to a source of liquid supply, a motor for operating said pump, a switch for controlling said motor, a meter the inlet side of which is connected to the outlet side of said pump, dispensing means connected to the outlet side of said meter, said meter having a meter shaft rotated in proportion to the liquid passing through said meter, an adjustably settable variator operated by said meter shaft, an electrical distributor operated by said variator, and registering means adapted to continuously register for registering the amount of liquid dispensed and the cost of said liquid, said registering means being controlled by said distributor.

5. In liquid dispensing apparatus, the combination of a pump, the suction side of which is adapted to be connected to a source of liquid supply, a motor for operating said pump, a switch for controlling said motor, a meter the inlet side of which is connected to the outlet side of said pump, dispensing means connected to the outlet side of said meter, said meter having a meter shaft rotated in proportion to the liquid passing through said meter, an adjustably settable variator operated by said meter shaft, a distributor operated by said variator, registering means adapted to continuously register operated in accordance with the operation of said distributor, and reset mechanism connected to the distributor, operation of said reset mechanism returning said distributor to a predetermined position.

6. In liquid dispensing apparatus, the combination of a pump the suction side of which is adapted to be connected to a source of liquid supply, a motor for operating said pump, a switch for controlling said motor, a meter, the inlet side of which is connected to the outlet side of said pump, dispensing means connected to the outlet side of said meter, said meter having a meter shaft rotated in proportion to the liquid passing through said meter, an adjustably settable variator operated by said meter shaft, a distributor operated by said variator, registering means adapted to continuously register operated in accordance with the operation of said distributor, and reset mechanism connected to the distributor, operation of said reset mechanism returning said distributor to a predetermined position, said registering means having a switch connected in the circuit of said motor switch and adapted to be opened when the distributor is being returned to said predetermined position to render the motor inoperative until the distributor has been returned to said predetermined position.

7. In liquid dispensing apparatus, the combination of a pump, the suction side of which is adapted to be connected to a source of liquid supply, a motor for operating said pump, a motor circuit for controlling said motor, a meter the inlet side of which is connected to the outlet side of said pump, dispensing means connected to the outlet side of said meter, said meter having a meter shaft rotated in proportion to the liquid passing through said meter, an adjustably settable variator operated by said meter shaft, a distributor operated by said variator, registering means adapted to continuously register operated in accordance with the operation of said distributor, reset mechanism connected to the distributor, operation of said reset mechanism returning said distributor to a predetermined position, a switch in said motor circuit adapted to permit operation of said motor when said switch is closed, means for opening said switch when said distributor is being returned to said predetermined position, means for locking said switch in opened position, and means for rendering said last named means inoperative to close said switch.

8. In liquid dispensing apparatus, the combination of liquid forcing means adapted to be connected to a source of liquid supply, a meter the inlet side of which is connected to said liquid forcing means, said meter having an outlet adapted to be connected to dispensing means, said meter having a meter shaft rotated in proportion to the liquid passing through said meter, an adjustably settable variator operated by said meter shaft, a distributor operated by said variator, indicating means adapted to continuously register operated in accordance with the operation of said distributor, and driving means for driving said indicating means.

9. In liquid dispensing apparatus, the combination of liquid forcing means adapted to be connected to a source of liquid supply, a meter the inlet side of which is connected to said liquid forcing means, said meter having an outlet adapted to be connected to dispensing means, said meter having a meter shaft rotated in proportion to the liquid passing through said meter, an adjustably settable variator operated by said meter shaft, an electrical distributor operated by said variator, indicating means adapted to continuously register for indicating the amount of liquid dispensed and the cost of said liquid, said indicating means being controlled by said distributor, and driving means for driving said indicating means.

10. In liquid dispensing apparatus, the combination of liquid forcing means adapted to be connected to a source of liquid supply, a meter the inlet side of which is connected to said liquid forcing means, said meter having an outlet adapted to be connected to dispensing means, said meter having a meter shaft rotated in proportion to the liquid passing through said meter, an adjustably settable variator operated by said meter shaft, a distributor operated by said variator, indicating means adapted to continuously register operated in accordance with the operation of said distributor, driving means for driving said indicating means, and reset mechanism connected to the distributor, operation of said reset mechanism returning said distributor to a predetermined position and initiation of operation of the liquid forcing means thereafter causing said driving means to return said indicating means to a predetermined position.

11. In liquid dispensing apparatus, the combination of liquid forcing means adapted to be connected to a source of liquid supply, a meter the inlet side of which is connected to said liquid forcing means, said meter having an outlet adapted to be connected to dispensing means, said meter having a meter shaft rotated in proportion to the liquid passing through said meter, an adjustably settable variator operated by said meter shaft, distributing means operated by said variator, another distributing means operated by said meter shaft, and registering means adapted to continuously register having indicating means operated by said first named distributing means and other indicating means operated by said second named distributing means, and compensating means operated by said distributing means for maintaining the same relation between said distributing means as is maintained between the operation of the meter shaft and variator.

12. In liquid dispensing apparatus, the combination of liquid forcing means adapted to be connected to a source of liquid supply a meter the inlet side of which is connected to said liquid forcing means, said meter having an outlet adapted to be connected to dispensing means, said meter having a meter shaft rotated in proportion to the liquid passing through said meter, an adjustably settable variator operated by said meter shaft, distributing means operated by said variator, another distributing means operated by said meter shaft, registering means having indicating means operated by said first named distributing means and other indicating means operated by said second named distributing means, driving means for driving said indicating means, and compensating means operated by said distributing means for maintaining the same relation between said distributing means as is maintained between the operation of the meter shaft and variator.

13. In liquid dispensing apparatus, the combination of a pump adapted to be connected to a source of liquid supply, a motor for operating said pump, a switch for controlling said motor, a meter for measuring liquid dispensed by said pump, dispensing means for dispensing the liquid measured by said meter, said meter having a meter shaft rotated in proportion to the liquid passing through said meter, a variator operably connected to said meter shaft for operation thereby, an electrical distributor having a portion operated in accordance with the operation of said variator and a portion operated in accordance with the operation of said meter shaft, and registering means having cost indicating means for showing the cost of the liquid dispensed, and amount indicating means for showing the amount of the liquid dispensed, said indicating means being power driven in a registering direction, the power drive being ineffective until permitted to operate by the distributor, electrical cost arresting means electrically connected to said first named portion of the distributor and associated with said cost indicating means for controlling the movement of the cost indicating means, and electrical amount arresting means electrically connected to said second named portion of the distributor and associated with said amount indicating means for controlling the movement of the amount indicating means.

14. In combination, a pair of liquid dispensing apparatus, each having liquid forcing means, a meter, variating means driven by the meter, switch mechanism driven by the meter in accordance with the amount of liquid passing through the meter, switch mechanism driven by the variating means in accordance with the setting of the variator, a register, means for selectively connecting the register to the switch mechanism of one of said liquid dispensing apparatus and means for preventing dispensing from the liquid dispensing apparatus not connected to the register.

15. In combination, a pair of liquid dispensing apparatus, each having liquid forcing means, a meter, switch mechanism driven by the meter in accordance with the amount of liquid passing through the meter, a register, means for selectively connecting the register to the switch mechanism of one of said liquid dispensing apparatus and means for preventing operation of the liquid forcing means of the liquid dispensing apparatus not connected to the register.

16. In combination, dispensing stations, each station comprising liquid forcing and measuring means adapted to be connected to a source of liquid supply for each station, a dispensing outlet for each of said first named means, actuating means operable to control operation of said first named means, a plurality of registers, switch means operably connected to the respective first named means and operable in accordance with liquid dispensed from the respective outlet, control means for connecting a station to a selected register, means for preventing operation of said actuating means of a station until the control means of that station is connected to a register, and means for preventing connection of more than one control means to a register.

17. In combination, dispensing stations, each station comprising liquid forcing and measuring means adapted to be connected to a source of liquid supply for each station, a dispensing outlet for each of said first named means, actuating means operable to control operation of said first named means, a plurality of registers, switch means operably connected to the respective first named means and operable in accordance with liquid dispensed from the respective outlet, control means for connecting a station to a selected register, and means for preventing operation of said actuating means of a station until the control means of that station is connected to a register.

KENLY C. BUGG.

REFERENCES CITED

The following references are of record in the file of this patent:

UNITED STATES PATENTS

| Number | Name | Date |
| --- | --- | --- |
| 795,361 | McDonnell | July 25, 1905 |
| 1,005,555 | Kettering | Oct. 10, 1911 |
| 2,060,674 | Hicks | Nov. 10, 1936 |
| 2,049,634 | Troutman | Aug. 4, 1936 |
| 2,111,996 | Slye | Mar. 22, 1938 |
| 2,116,777 | Brayer | May 10, 1938 |
| 2,319,444 | Crosby | May 18, 1943 |
| 2,323,374 | Bugg | July 6, 1943 |
| 2,379,785 | Bugg | July 3, 1945 |

Certificate of Correction

Patent No. 2,530,113                                  November 14, 1950

KENLY C. BUGG

It is hereby certified that error appears in the printed specification of the above numbered patent requiring correction as follows:

Column 19, line 4, for the word "cam" read *cams*; column 22, line 74, for "legs" read *lugs*; column 24, line 69, for "sloted" read *slotted*; column 27, lines 7 and 8, for "intance" read *instance*; line 65, for the numeral "2522" read *2552*; column 30, line 29, after "2794," insert *2796,*; line 59, for "ten" read *tens*; column 39, line 26, for "This" read *Thus*; column 45, lines 25, 42, 66, and column 46, lines 14, 43, and 64, after "register" insert *and*;

and that the said Letters Patent should be read as corrected above, so that the same may conform to the record of the case in the Patent Office.

Signed and sealed this 6th day of February, A. D. 1951.

[SEAL]

THOMAS F. MURPHY,
*Assistant Commissioner of Patents.*